US012804237B2

(12) United States Patent
Doken

(10) Patent No.: US 12,804,237 B2
(45) Date of Patent: Nov. 17, 2026

(54) SYSTEMS AND METHODS FOR VIRTUAL WATCHING ASSISTANT

(71) Applicant: Adeia Guides Inc., San Jose, CA (US)

(72) Inventor: Serhad Doken, Bryn Mawr, PA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 19/059,667

(22) Filed: Feb. 21, 2025

(65) Prior Publication Data

US 2026/0255025 A1 Aug. 27, 2026

(51) Int. Cl.

| | |
|---|---|
| ***H04N 21/4788*** | (2011.01) |
| ***G10L 15/18*** | (2013.01) |
| ***G10L 15/183*** | (2013.01) |
| ***H04N 21/431*** | (2011.01) |
| ***H04N 21/44*** | (2011.01) |
| ***H04N 21/442*** | (2011.01) |

(52) U.S. Cl.

CPC ..... *H04N 21/4788* (2013.01); *G10L 15/1807* (2013.01); *G10L 15/183* (2013.01); *H04N 21/4312* (2013.01); *H04N 21/44008* (2013.01); *H04N 21/44218* (2013.01); *H04N 21/44222* (2013.01)

(58) Field of Classification Search

CPC ........... H04N 21/4788; H04N 21/4312; H04N 21/44008; H04N 21/44218; H04N 21/44222; G10L 15/1807; G10L 15/183

See application file for complete search history.

(56) References Cited

U.S. PATENT DOCUMENTS

| | | | |
|---|---|---|---|
| 10,194,203 | B2 | 1/2019 | Avila et al. |
| 10,395,118 | B2 | 8/2019 | Yu et al. |
| 10,893,318 | B2 | 1/2021 | Couleaud et al. |
| 10,963,702 | B1 | 3/2021 | Li et al. |
| 11,412,023 | B2 | 8/2022 | Wang et al. |
| 11,443,731 | B2 | 9/2022 | Aher et al. |
| 11,450,306 | B2 | 9/2022 | Aher et al. |

(Continued)

FOREIGN PATENT DOCUMENTS

| | | | |
|---|---|---|---|
| WO | 2021/092631 | A9 | 7/2021 |
| WO | 2023/134088 | A1 | 7/2023 |

(Continued)

OTHER PUBLICATIONS

U.S. Appl. No. 19/059,712, filed Feb. 21, 2025, Serhad Doken.

(Continued)

*Primary Examiner* — Nnenna N Ekpo

(74) *Attorney, Agent, or Firm* — HG Law LLP

(57) ABSTRACT

Methods and systems are described herein for the provision of a co-watching companion bot for a media platform. The media platform comprises at least a co-watch bot and a selection of media content. During the play of a media content, a trained multi-modal generative model for the media content is accessed to generate an inferred conversational output. The trained multi-modal generative model is trained on a plurality of indicators, each representing a respective aspect of a respective portion of the media content and uses a context window indicating a portion of the media content provided for playback to generate inferences. The inference is output by way of the co-watch bot upon the media content reaching an initiation point.

20 Claims, 19 Drawing Sheets

(56) References Cited

U.S. PATENT DOCUMENTS

| | | | |
|---|---|---|---|
| 11,533,495 B2 | 12/2022 | Jain et al. | |
| 11,663,268 B2 | 5/2023 | Hsiao et al. | |
| 11,670,085 B2 | 6/2023 | Verma et al. | |
| 11,677,991 B1 | 6/2023 | Balannik | |
| 11,776,267 B2 | 10/2023 | Yu et al. | |
| 11,836,181 B2 | 12/2023 | Saggi et al. | |
| 11,989,941 B2 | 5/2024 | Li et al. | |
| 12,142,047 B1 | 11/2024 | Schwartz et al. | |
| 12,147,771 B2 | 11/2024 | Cho et al. | |
| 12,153,627 B1 | 11/2024 | Lee | |
| 2002/0093591 A1 | 7/2002 | Gong et al. | |
| 2007/0214418 A1 | 9/2007 | Wang et al. | |
| 2015/0279390 A1 | 10/2015 | Mani | |
| 2018/0225519 A1 | 8/2018 | Chen et al. | |
| 2019/0027188 A1 | 1/2019 | Akolkar et al. | |
| 2020/0186852 A1 | 6/2020 | Ramamurthy et al. | |
| 2020/0195983 A1 | 6/2020 | Chao | |
| 2020/0196028 A1 | 6/2020 | Kuehne et al. | |
| 2020/0334468 A1 | 10/2020 | Agarwal et al. | |
| 2021/0109966 A1 | 4/2021 | Ayush et al. | |
| 2021/0110166 A1 | 4/2021 | Gunawardena | |
| 2021/0142115 A1 | 5/2021 | Chen et al. | |
| 2021/0286484 A1* | 9/2021 | Geller | G06F 3/04817 |
| 2021/0319779 A1 | 10/2021 | Aher et al. | |
| 2021/0319780 A1 | 10/2021 | Aher et al. | |
| 2022/0129679 A1 | 4/2022 | Panda et al. | |
| 2022/0215052 A1 | 7/2022 | Chalana et al. | |
| 2023/0046248 A1 | 2/2023 | Veyseh et al. | |
| 2023/0179839 A1 | 6/2023 | Yin et al. | |
| 2023/0208785 A1* | 6/2023 | Bae | H04L 51/02 709/204 |
| 2023/0386208 A1 | 11/2023 | Jin et al. | |
| 2024/0020337 A1 | 1/2024 | Maharana et al. | |
| 2024/0020977 A1 | 1/2024 | Wu et al. | |
| 2024/0037316 A1 | 2/2024 | Mohanty et al. | |
| 2024/0037948 A1 | 2/2024 | Chen et al. | |
| 2024/0048821 A1 | 2/2024 | Cain et al. | |
| 2024/0129602 A1 | 4/2024 | Hamsa et al. | |
| 2024/0169726 A1 | 5/2024 | Zhang et al. | |
| 2024/0205520 A1 | 6/2024 | Carbajo et al. | |
| 2024/0290345 A1 | 8/2024 | Wang et al. | |
| 2024/0298076 A1* | 9/2024 | Kang | H04N 21/43 |
| 2024/0355119 A1 | 10/2024 | Croitoru et al. | |
| 2024/0362272 A1 | 10/2024 | Lee et al. | |
| 2024/0370493 A1 | 11/2024 | Lee | |
| 2024/0370661 A1 | 11/2024 | Hirshberg et al. | |
| 2024/0386189 A1 | 11/2024 | Malladi et al. | |

FOREIGN PATENT DOCUMENTS

| | | |
|---|---|---|
| WO | 2023/137913 A1 | 7/2023 |
| WO | 2024/120245 A1 | 6/2024 |
| WO | 2024/228896 A1 | 11/2024 |

OTHER PUBLICATIONS

"Aloys "open world" dialogue," Reddit, Retrieved from https://www.reddit.com/r/horizon/comments/uolhw6/aloys_open_world_dialogue/, Retrieved on Mar. 24, 2025, 7 pages.

"Her (2013 film)," Wikipedia, Retrieved from https://en.wikipedia.org/wiki/Her_(2013_film), 2013, 16 pages.

"How does Oura Ring work: Smart Ring Health Tracking," Oura, Retrieved from https://ouraring.com/how-it-works?srsltid=AfmBOooivu_CAX5gcSLy5mKjUfnHKtqy9u5jYpcGSsQz8Cw7prLLPuJm, Retrieved on Mar. 24, 2025, 7 pages.

"How To Create an AI Podcast with Google's NotebookLM," MARQO, Retrieved from https://www.marqo.ai/blog/how-to-create-an-ai-podcast-with-googles-notebooklm, Oct. 5, 2024, 6 pages.

"Personalized AI for every moment of your day," character.ai , Retrieved from https://character.ai/, Retrieved on Mar. 24, 2025, 2 pages.

"YouTube is testing a new AI chatbot that lets you ask questions about a video while watching it," Chrome unboxed, Retrieved from https://chromeunboxed.com/youtube-youchat-ai-experiment/, Nov. 7, 2023, 10 pages.

Arden C., "Introducing AI-Powered Friends for TrueTime Watch Party: A Revolutionary Enhancement," Red5, Retrieved from https://www.red5.net/blog/introducing-ai-powered-friends-for-truetime-watch-party-a-revolutionary-enhancement/, Apr. 1, 2024, 13 pages.

General, US Surgeon., "Our epidemic of loneliness and isolation," The US Surgeon General's Advisory on the Healing Effects of Social Connection and Community, 2023, 82 pages.

Karpathy. A., "The killer app of LLMs is Scarlett Johansson. You all thought it was math or something," X, Retrieved from https://x.com/karpathy/status/1790373216537502106, May 14, 2024, 1 page.

Song. Z et al., "Moviellm: Enhancing long video understanding with ai-generated movies," arXiv preprint, 2024, 19 pages.

U.S. Appl. No. 18/901,362, Title; Personalized Digital Humans, filed Sep. 30, 2024, Dhananjay Lal., U.S. Appl. No. 18/901,362.

* cited by examiner

SYSTEMS AND METHODS FOR VIRTUAL WATCHING ASSISTANT

BACKGROUND

This disclosure relates to systems and methods for training and implementing a model for co-watching media content.

SUMMARY

In 2023, the U.S. Surgeon General released an advisory reporting that approximately half of U.S. adults are experiencing loneliness. One way people combat loneliness is through co-watching media content. Co-watching media content allows people to better express their emotions about, and reactions to the media content, as well as have thoughtful discussions and generate shared memories about the media content. However, sometimes good friends are hard to find, and it can sometimes be difficult to coordinate schedules with good friends. Sometimes a person may end up watching media content with people they do not particularly like and other times there may be disagreements over which media content to watch; thus, despite the socialization offered, the overall experience has been dulled. When a person is fortunate enough to coordinate a co-watch event with a friend or group and everyone agrees on the media content, current multi-party conferencing solutions may fall short for a seamless experience of watching and discussing media content.

Current multi-party conferencing solutions often have technical limitations that hinder the co-watching experience. For example, multi-party conferencing solutions may have limited hosting capability (e.g., limited to three people or limited to 30 minutes), may be limited to certain compatible devices, and/or may require troubleshooting to connect multiple devices. The current multi-party conferencing solutions involve a host device sharing media content through a screen share mechanism. Often, there is a clash between the device's microphone audio and the media content audio that prevents the media content audio from playing for the connected devices. If the media content audio does get transmitted, the format is still not ideal for watching and conversing. For example, the media content audio and voices play at the same volume, making both unintelligible, or the co-watching people must type into a chat interface that could delay conversations, mute emotions, and otherwise distract from watching the media content.

Certain artificial intelligence (AI) chat services have become available to enable users to ask questions while watching media content; however, these solutions do not provide human-like conversational companionship. For example, current AI chat services require the user to initiate input. In the context of co-watching a movie, the viewer is inconvenienced and delayed, having to divert their attention to opening, typing, and waiting for a response (often lengthy and in text) from an AI chat service while either the media content continues or the user is forced to pause and interrupt the flow of the experience due to the latency of the service computing a response.

These AI chat services may answer questions through video descriptions and internet searching. However, given the nature of this training, AI chat services are not adequately adapted to provide human-like conversation relative to the co-watching experience.

For example, a person watching "The Lion King" for the first time could reasonably suspect the character Scar of being nefarious and ask the question, "Is Scar a good guy?" Utilizing generative AI (e.g., ChatGPT's GPT-40, or the like) the response includes, among other major spoilers, "Scar orchestrates Mufasa's death by pushing him off a cliff into a stampede and manipulates Simba into thinking it was his fault." While correct, this response ruins the emotional arc that sets the stage for the rest of the movie. In another example, the AI chat service may provide undue responses to rhetorical questions or statements often made while a person watches media content with others. For example, a person could have stated, "I don't know if Scar is a good guy," and receive a similar spoiler-filled response.

In another example, the AI chat services do not have visual or audio context when a viewer has a specific scene question. For example, if something in the media content takes a viewer by surprise, and the viewer is looking for assurance by asking "What was that?", the AI chat services cannot provide a contextual answer and will, at best, try to clarify the last response the bot had provided to the user (processing "that" as the previous response). Long video understanding models may provide increased understanding performance; however, current models are computationally demanding, requiring substantial resources and time and are not flexible or easily scalable.

To help address these problems, systems and methods are provided herein for a co-watch bot for human-like conversational companionship while viewing media content that is personalized (e.g., for a user device associated with a user account, profile, or the like) and is also available whether online or offline. For example, the methods and systems comprise a model for co-watching media content (referred to herein as a "co-watch bot"). Also, for example, the co-watch bot is available for media content prior to consumption of the media content. Further, for example, the co-watch bot may be integrated with a media content platform to minimize resources and maximize scalability.

In one approach, the co-watch bot is a trained multi-modal generative model of a media platform for co-watching media content that is specifically trained for a given media content item. For example, the trained multi-modal generative model may generate latent space tokens that have been mapped from multiple machine learning models to a latent space by an encoder during the AI model training. In some embodiments, a pre-trained language model is used to generate a plurality of indicators (e.g., token embeddings) from at least one media content supplemental source either from the media platform (e.g., transcript, closed caption, or the like) or from external sources (e.g., review websites, articles, or the like). In some embodiments, a vision model is used to generate a plurality of indicators (e.g., token embeddings) from the long-form video of the media content item. For example, to build a vision model with a lower computational load, data from the language model may be used for weighting the visual model (e.g., dialogue section or silence periods indicative of co-watching conversation points). Also, for example, selective or emphasized tokenization of elements most likely to be relevant to an anticipated conversation are provided, which save computational resources otherwise required for a standard vision model. In some embodiments, the vision model may break the media content item into many mini chapters, and frames from those chapters may be extracted for the vision model to extract tokens. The vision model may detect high and low complexity sections (for example, using methods described in detail hereinbelow) and, based on the complexity, extract more tokens from high complexity sections, thus focusing resources on areas of conversational interest. The vision model may compute tokens for each mini chapter and associated frames and tag the tokens with a frame identifier (e.g., number) or a timestamp. In some embodiments, the vision model may identify aspects of the media content including characters, actors, objects, locations, or the like. In some embodiments, an audio model may be used to generate a plurality of indicators (e.g., token embeddings) for aspects of the media content including the tone, pitch, and volume of the movie audio recording, and any lyrics, soundtracks, or scores. In some embodiments, the plurality of indicators from each of the modal models may be mapped into a plurality of latent space indicators. The latent space mapping transforms data into a lower-dimensional representation of data that allows the model to determine features, patterns, and relationships within and between the modal inputs.

In another embodiment, the co-watch bot is a trained multi-modal generative model a given media content item or media content type (e.g., sports, cooking, science, education, engineering, music, or the like). For example, the trained multi-modal generative model may be trained by inputting text, video, and audio inputs that are used to generate a plurality of indicators (e.g., token embeddings) for use in inferencing. For example, a language portion of the model is used to generate a plurality of indicators (e.g., token embeddings) from at least one media content supplemental source either from the media platform (e.g., transcript, closed caption, or the like) or from external sources (e.g., review websites, articles, or the like). In some embodiments, a vision model portion of the model is used to generate a plurality of indicators (e.g., token embeddings) from the long-form video of one or more media content items. For example, to build a vision portion of the model with a lower computational load, data from the language portion of the model may be used for weighting the visual model portion (e.g., dialogue section or silence periods indicative of co-watching conversation points). Also, for example, selective or emphasized tokenization of elements most likely to be relevant to an anticipated conversation are provided, which save computational resources otherwise required for a standard vision model. In some embodiments, the vision portion of the model may break the media content item into many mini chapters, and frames from those chapters may be extracted for the vision model portion to extract tokens. The vision portion of the model may detect high and low complexity sections (for example, using methods described in detail hereinbelow) and, based on the complexity, extract more tokens from high complexity sections, thus focusing resources on areas of conversational interest. The vision model portion may compute tokens for each mini chapter and associated frames and tag the tokens with a frame identifier (e.g., number) or a timestamp. In some embodiments, the vision portion of the model may identify aspects of the media content including characters, actors, objects, locations, or the like. In some embodiments, the model includes an audio portion of the model to be used to generate a plurality of indicators (e.g., token embeddings) for aspects of the media content including the tone, pitch, and volume of the movie audio recording, and any lyrics, soundtracks, or scores. In some embodiments, the plurality of indicators generated by each portion of the multi-modal model may be mapped into a plurality of latent space indicators. The latent space mapping transforms data into a lower-dimensional representation of data that allows the model to determine features, patterns, and relationships within and between the modal inputs.

For example, the co-watch bot may be represented by a user interface (UI) (e.g., animated avatar, image, chat box, or the like) and may initiate or respond to discourse with the viewer during the media content watch session. To initiate or respond to discourse, the co-watch bot accesses the multi-modal generative model trained on the media content to generate an inference. An inference refers to the process in which the trained multi-modal generative model uses the learned patterns from training to make predictions, classifications, and/or decisions for output. For example, during inferencing, the trained multi-modal generative model utilizes data (e.g., indicators generated from training, user data, user input, media content data, or the like), and processes the data through the model's learned parameters (weights, biases, or the like) to generate an output.

In some embodiments, to make the plurality of co-watch bots scalable, the platform may implement additional resource allocation rules. For example, the platform may implement a slow training approach wherein an iterative training approach is used to extract additional indicators (e.g., token embeddings) based on certain criteria of the media content item associated with a co-watch bot (e.g., popularity of the media content item, user history, co-watch bot history, ratings, or the like) over time. In addition, resources may be focused on extracting embeddings from anticipated windows of conversation (e.g., with a device associated with a user account), and the resources may be assigned according to model computational load requirements. The language model, vision model, and audio model may tag the plurality of indicators (e.g., token embeddings) with metadata including, but not limited to, a frame identifier, a timestamp, complexity of the content area of the plurality of indicators (e.g., token embeddings), an identifier of an actor, an identifier of a character, an identifier of objects, an identifier of a location, information associated with a soundtrack, or a media dialogue.

In some embodiments, the trained co-watch bots are part of a media platform or integrated as a third-party service. This integrated service mitigates the compatibility issues with current hosting platforms. The media platform may have a selection of media content items and a selection of co-watch bot personalities to watch the content with. The media platform may use the user's profile (e.g., watch history, conversation history, recommendation list, or the like) and co-watch bot personality selection to style inferences generated by the trained co-watch bot to provide both personalized and low-latency responses.

In some embodiments, the co-watch bot may have a sliding context window. For example, as the media platform generates for display the media content item, the media platform provides the co-watch bot with the progress point of the media. The co-watch bot may use the progress point or play position to generate a sliding context window comprising a range of token embeddings, from the start of the media content to the current location, made available for generating the inferred conversational output. The sliding context window, for example, configures the co-watch bot for relatively human-like conversations (e.g., without spoilers). Additionally, this context window may reduce latency to make an inference output by limiting the number of embeddings assessed to generate the inference. In some embodiments, the co-watch bot may use conversation histories to anticipate and start a discourse without user input.

In some embodiments, the co-watch bot may be downloaded with a selected media content item. The media platform may provide a compressed, distilled, and quantized co-watch bot that may work without the help of cloud system communication. The co-watch bot may prioritize one-way commentary to maximize the accuracy and timeliness of the inference from the model. The co-watch bot may record inference failures and, upon restoration of cloud connectivity to the main model, upload the data to fine-tune the downloadable model.

Using the methods described herein, a scalable solution (e.g., cheaper to operate and less resource intensive) for human-like conversational companionship with fluency and low latency may be provided through the training and provisioning of a co-watch bot.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

Figure 1:
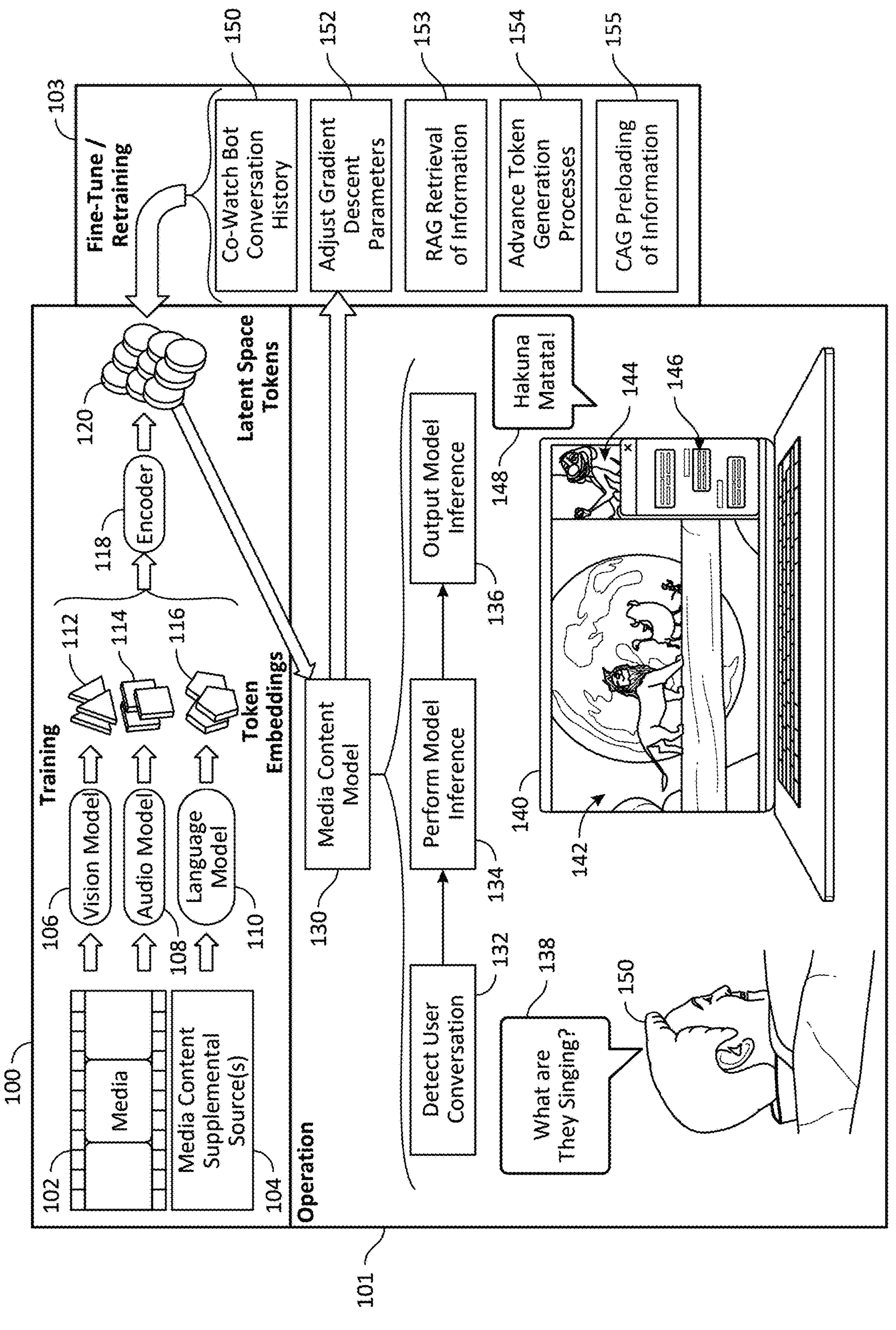
FIG. 1 depicts a schematic illustration of training and operation of a model for co-watching media content, in accordance with some embodiments of the disclosure.

The drawings are intended to depict only typical aspects of the subject matter disclosed herein, and therefore should not be considered as limiting the scope of the disclosure. Those skilled in the art will understand that the structures, systems, devices, and methods specifically described herein and illustrated in the accompanying drawings are non-limiting embodiments and that the scope of the present invention is defined solely by the claims.

DETAILED DESCRIPTION OF THE DRAWINGS

A media platform is provided with one or more AI co-watching buddies. For example, a co-watching bot is provided that is configured with information about favorite shows and movies associated with a user profile. Also, the co-watching bot is configured to be ready to chat upon demand. Further, for example, the bot uses AI inferencing bound by a sliding context window of the media content item, learns user preferences, and improves conversations. In addition, for example, the bot starts a conversation when, e.g., the bot determines whether a user (e.g., via user device) has a determinable interest in talking or chatting (and, e.g., stays quiet when the bot determines the user is not likely to want to talk or chat). In some implementations, the co-watching buddy takes the form of a likeness of one or more friends or characters. In others, the buddy is embodied as a voice assistant or text-based display, with or without a corresponding representative picture of the buddy. The co-watching bot helps some people who might be feeling lonely, having trouble finding others to hang out with, or not having a good way to watch shows together.

As referred to herein, the phrase "co-watch bot" refers, for example, to the operation of a multi-modal generative model for a media content item. As referred to herein, the phrase "co-watch bot model" refers, for example, to the pre-trained multi-modal generative model. In some embodiments, the co-watch bot UI may be a chat-based AI agent, a voice-based AI agent, or a full-fledged personalized digital human or character.

As referred to herein, the term "discourse" refers to any suitable form of communication (e.g., visual, audible, text, or the like). For example, "user discourse input" may be a received user communication in the form of speaking, typing/texting, gestures, or the like. As provided herein, any reference to a "user" is understood to be performed via a user device or service associated with a user account or user profile, unless otherwise stated or implied by context.

As referred to herein, the word "match" and any of its derivatives (e.g., matching, matches, matched, or the like) may refer to an exact match or a match of a certain confidence threshold.

While this disclosure is focused on media platforms with a library of available media content items, similar methods and systems may be implemented for livestreams. For example, the system may generate domain-specific co-watch bots (e.g., only sports, only news, or the like) accurate for a livestreaming companionship by generating training data using past livestream media and available supplemental metadata of the specific domain for operation of the co-watch bot. For example, methods disclosed herein, such as user-specific personalization, retrieval augmented generation (RAG), cached augmented generation (CAG), and incremental fine-tuning or retraining, may be employed to reduce upfront resources required for the co-watch bot to operate.

Methods and systems are provided for training and implementing multi-modal generative models for co-watching media content available on a media platform. The system may comprise at least three components: data, models, and computing resource(s). The system may correspond with a media platform (e.g., subscription video on demand (SVOD), advertising video on demand (AVOD), transactional video on demand (TVOD), or the like) that hosts a library of media content items (e.g., movies, videos, audio, text, metadata, or the like).

In some embodiments, the system may allocate resources accordingly to generate data and train (or fine-tune or retrain) a multi-modal generative model for each media content item hosted on the media platform. For example, the system may initially generate models for media content meeting a certain threshold of watch hours, viewership, ratings, or the like. For example, the system may allocate more resources towards generating video token embeddings than text or audio token embeddings. For example, the system may implement a cold start learning curve and adjust to a user utilizing layered inputs or prompts based on stored user profile data (e.g., watch history, preferred genres, pause/rewind/fast-forward/binge histories, co-watch bot conversation history, recommendation lists, or the like) to personalize and reduce latency of the responses.

In some embodiments, the system may access the multi-modal generative model as a co-watch bot. For example, the co-watch bot may be a chat-based AI agent, or a full-fledged personalized digital human or character. The system may receive a co-watch bot personality selection from the user that may be used as a representation of the trained multi-modal generative model (e.g., as a skin for an animated avatar or picture for a chat box, or the like), as well as input into the multi-modal generative model to style the inference prior to output. While the media content is playing, the co-watch bot may interact with the user. For example, the user may initiate conversation, or the co-watch bot may initiate conversation. In some embodiments, the co-watch bot may determine an initiation point for outputting a model inference through determining that a likelihood of interest in an initiation of the conversation interaction satisfies a predetermined triggering threshold. For example, the likelihood of interest may be related to one of at least: a density of token embeddings of the trained multi-modal generative model indicating a low complexity area of content in the media content, a density of token embeddings indicating a high complexity area of content in the media content, user metadata associated with media content available from the media platform, a biometric response, or searching for corresponding token embeddings with a future timestamp of the trained multi-modal generative model of the media content based at least in part on previous user discourse during the playback of media content. The co-watch bot may reduce latency of interactions by making inferences based on the likelihood of interest being triggered. The co-watch bot may search token embeddings based on a sliding context window to generate inferences at a lower latency and to prevent outputting responses that would spoil the media content plot. In some embodiments, a compressed, distilled, and quantized co-watch bot model may be downloaded with the media content to be accessed while offline.

FIG. 1 depicts a schematic illustration of training 100 and operation 101 of a co-watch bot model for co-watching a media content, in accordance with some embodiments of this disclosure.

In some embodiments, the system may pre-train a multi-modal generative model for operation as a co-watch bot. For example, the system may generate latent space tokens 120 through a vision model 106, an audio model 108, and a language model 110 during training of the multi-modal generative model 130. In some embodiments, the vision model 106 and audio model 108 create token embeddings 112 and 114, respectively, from the media content. In some embodiments, the system encoder 118 may map the correlations between all the extracted tokens 112-116 into a shared latent space and transform the tokens into latent space tokens 120 of a unified format. For example, using the mapped latent space tokens, the media content model 130 may relate information across modalities. The system training process is discussed in further detail below. In some embodiments, the system may fine-tune or retrain 103 the multi-modal generative model. For example, the system may fine-tune or retrain based at least in part on one of a co-watch bot conversation history 150 (e.g., including user discourse, co-watch bot discourse, biometric response, feedback, success parameters, or the like), adjusting gradient descent parameters 152, RAG retrieval of information 153 (e.g., from additional media resources or from other co-watch bot models after failed inferences), advance token generation processes for the video content by the vision model 154 (e.g., neural radiance field (NeRF) and 3D temporal Gaussian splatting) or CAG preloading of information 155. For example, the system may fine-tune as an unsuccessful inference occurs and/or the system may fine-tune or retrain periodically (e.g., based on time or media content/co-watch bot popularity).

In some embodiments, the system may access the trained multi-modal generative model co-watch bot for a media content item. For example, the system may receive a selection of a media content item (e.g., 404 of FIG. 4) from the library of the media platform, and the system may receive a selection of a co-watch bot personality (e.g., 436 or 438 of FIG. 4). In some embodiments, the system may display the media content 142 and a representation of the trained multi-modal generative model (e.g., animated avatar 144, chat box 146, or the like). In some embodiments, the system may initialize a sliding context window (not shown) from the start of the media content and continue to adjust the context window according to the latest player position (e.g., timestamp, frame, chapter, or the like) to limit the token embeddings made available to the trained multi-modal generative model co-watch bot for generating inferences.

Figure 6A:
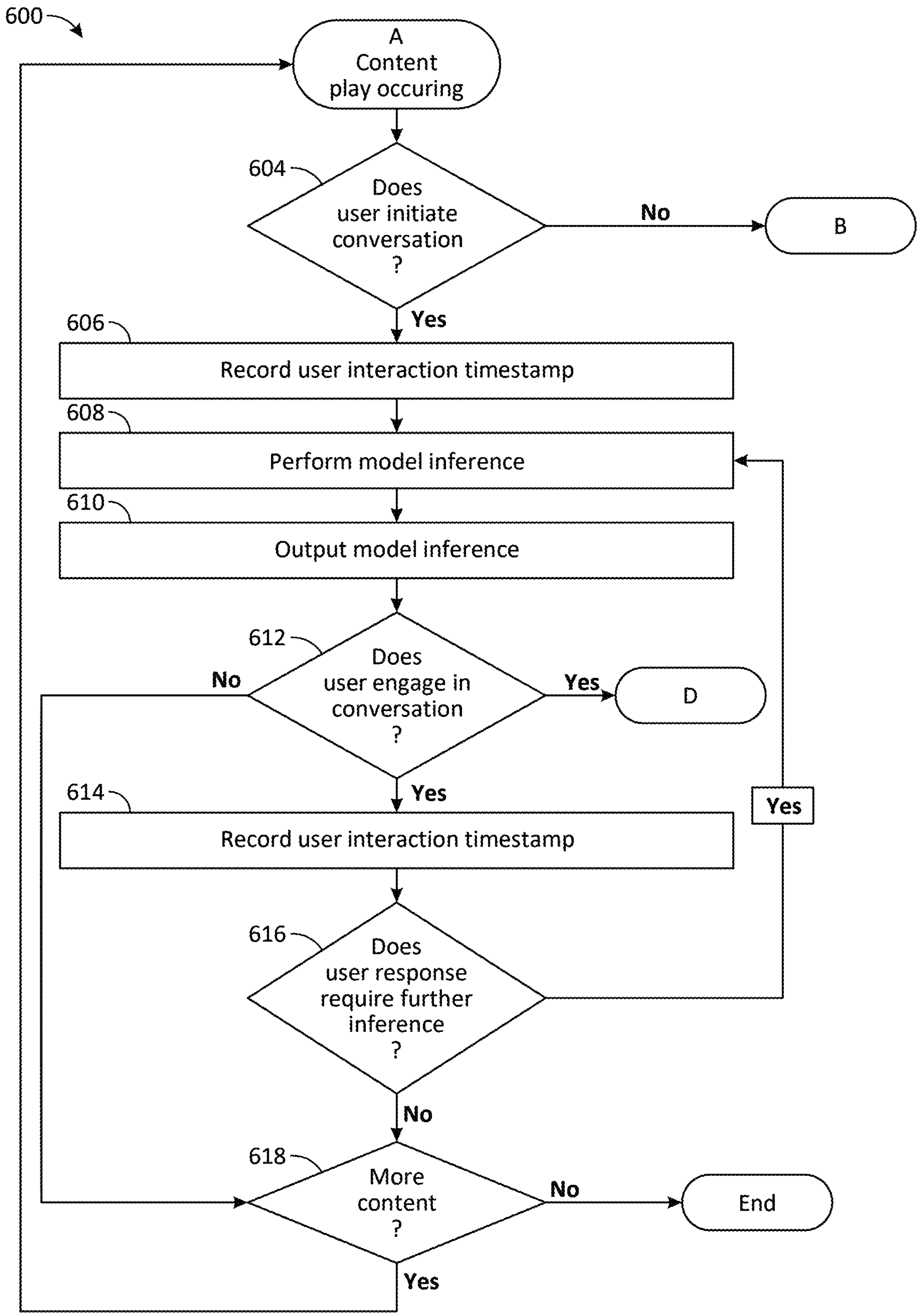
FIG. 6A depicts a flowchart of a process of the co-watch bot when a user via a user device initiates conversation, in accordance with some embodiments of the disclosure.

In some embodiments, the co-watch bot discourse may be initiated by the user (e.g., process 600 of FIG. 6A). For example, at 132, the system may detect an audible user discourse input 138. In another embodiment, the system may receive a text user discourse input. Based on the user discourse input 138 and the sliding context window, the co-watch bot may perform a model inference at 134. In some embodiments, the system may apply one or more personalization layers to style the inference prior to output. For example, the system may input the selected co-watch bot personality data into the co-watch bot to style the inference in a manner that represents the selected co-watch bot. For example, the system may input data from the user co-watch bot conversation history (e.g., 326 of FIG. 3) to update the inference based on the system determining user-preferred words or jargon. For example, the system may input personalization layers as additional prompts for the model to make an inference. In some embodiments, at 136, the co-watch bot generates for output the inference.

Figure 6B:
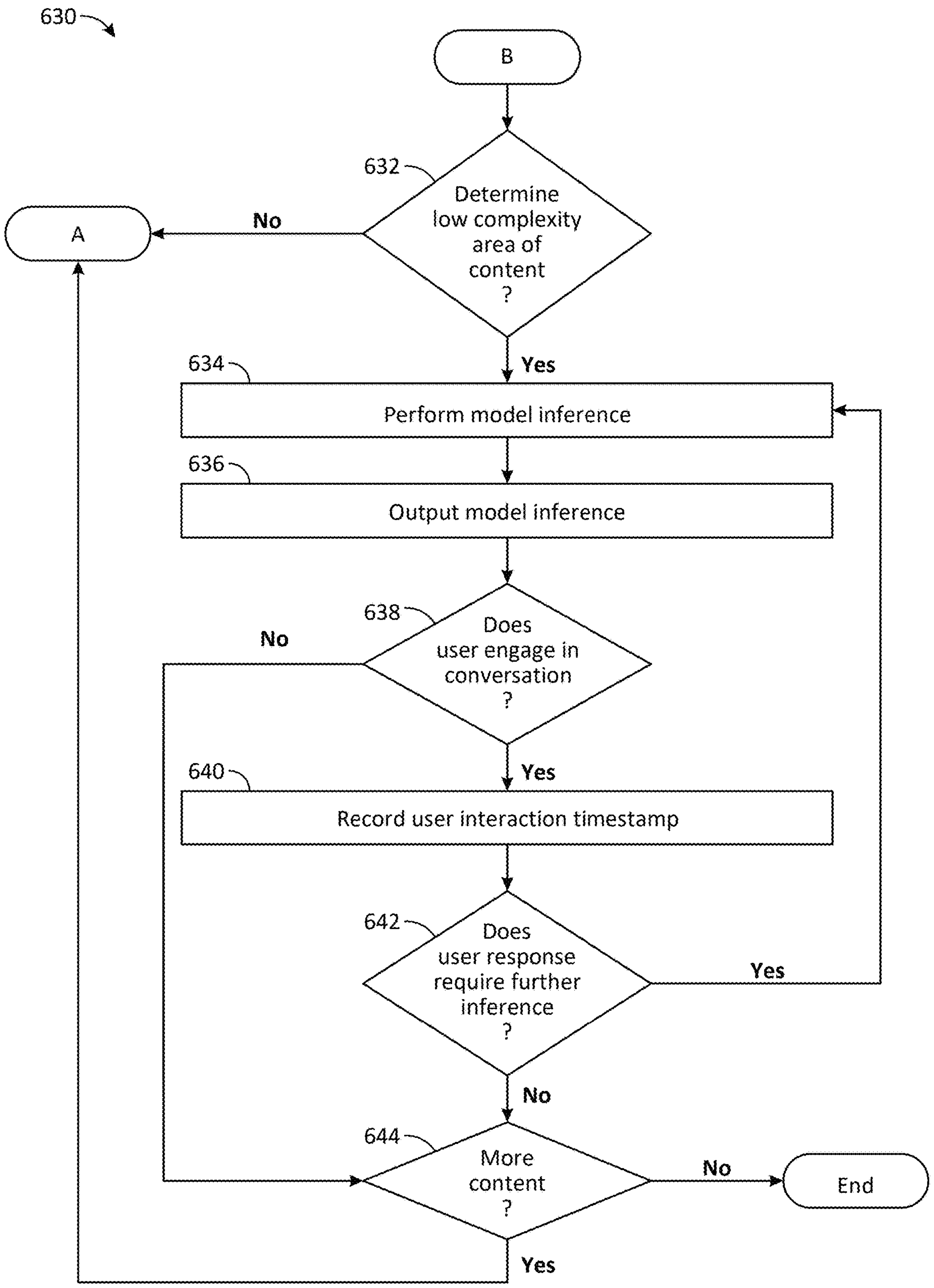
FIG. 6B depicts a flowchart of a process of the co-watch bot when the model performs an inference during a low complexity area of content, in accordance with some embodiments of the disclosure.

In some embodiments, the co-watch bot discourse may be initiated by the co-watch bot detecting a low complexity or low intensity area of content approaching in the media content (e.g., process 630 of FIG. 6B). For example, the system may determine areas of low and high complexity or intensity during training of the co-watch bot model. The system may encode these timepoints to determine the best windows to output a model inference (e.g., timepoints that do not disrupt the user's enjoyment of the media content). For example, the encoding configures the system to analyze peaks, valleys, and respective durations of the peaks and valleys to determine an adequate window for conversation. In some embodiments, the co-watch bot may generate an inference in advance of a timestamp associated with the area of media content that has a sustained low complexity or intensity for a threshold of time (e.g., 30 seconds or more) based on the sliding context window up to that timestamp. For example, the system may locally cache (e.g., in storage circuitry 908 of FIG. 9, storage circuitry 1014 of FIG. 10, or any other suitable storage) or timely transmit the co-watch bot inference output for playback at the determined timestamp. For example, upon the media reaching the timestamp, the co-watch bot may output the inference (e.g., without user initiation).

In some embodiments, determining areas of low and high complexity in the media content may be based at least in part on a complexity score for one or more portions of the media content. For example, the complexity of a portion of a media asset may be associated with a number of different factors related to visual and/or audio content contained in the portion of the media asset. In some examples, the complexity may be based on, for example, how many foreground objects are present in the video of a media asset and how the objects move. In some embodiments, complexity scores (for example, based on an amount of visual and/or audio content information, an amount of data, or an amount of encoded data) may be used to encode complexity of a portion of a media content and to determine whether that portion is considered high or low in complexity. In some embodiments, the complexity score may be associated with the plurality of portions of the media content. In some instances, the complexity score may be based on an amount of encoded data (expressed, for example, in bytes) corresponding to the amount of data corresponding to the amount of content information (e.g., audio and/or visual content information, language content information, or the like) associated with one or a plurality of portions of the media content. In some embodiments, determining the complexity score may be further based on at least one of object analysis, color analysis, camera angle analysis, motion analysis, audio analysis, or language analysis, or the like.

In some instances, a device (e.g., a server or a computing device of the one or more computing devices) may employ a computer vision algorithm to analyze each scene of a media asset (e.g., media content, closed captions, supplemental content, or the like) and determine a complexity score associated with each portion (e.g., scene, frame, or the like) of the media asset. This may allow for listing, for each portion of the media asset, each element (e.g., object, character, location, or the like) depicted in a frame and detected by the computer vision algorithm, and the evolution (e.g., movements, partial or full disappearances, appearance changes, or the like) of each depicted and detected element across frames. In some instances, the computer vision algorithm may determine a complexity score associated with a frame based on a number of elements depicted and detected in the frame and characteristics of the depicted and detected elements. In some instances, the computer vision algorithm may determine a complexity score associated with a plurality of frames based on a number of elements depicted and detected in each frame of the plurality of frames and characteristics of the depicted and detected elements, but also on the evolution of the depicted and detected elements across the plurality of frames and the evolution of the characteristics of the depicted and detected elements across the plurality of frames. In some instances, the computer vision algorithm may assign a respective weight to each depicted and detected element and/or one or more characteristics of each depicted and detected element in the determination of a complexity score associated with a frame of a media asset.

In some instances, a non-transitory, computer-readable medium may comprise instructions that, when executed by the control circuitry of a device (e.g., a server or a computing device of the one or more computing devices), cause the control circuitry to (1) identify elements (e.g., objects, characters, or the like) depicted in frames, (2) determine locations (e.g., foreground, background, or the like) of the identified elements within frames, (3) determine characteristics (e.g., feature vectors, color gamut including, e.g., contrast, brightness, hue and color range, or the like) of the identified elements, (4) determine the number of identified objects in each frame and whether the identified objects form clusters or not, and track the motions of the identified elements across frames, for example, of a same scene, so as to establish, for each frame, a list of the identified elements and information associated with the identified elements and determine, for each frame, a complexity score. As mentioned earlier, the numberings in parentheticals (e.g., (1), (2), (3), etc.) as used herein, and also hereinafter, are for identifying relevant or related examples, or aspects, and are not intended to be limiting or to specify a particular order, sequence, or quantity.

In some instances, a device (e.g., a server or a computing device of the one or more computing devices) may run a clustering algorithm to determine how close a plurality of elements (e.g., objects, characters, or the like) are to each other. Clustered elements may involve a lower perceptual load (and thus a lower complexity) than un-clustered elements (which are thus distributed within a frame). In some instances, a non-transitory, computer-readable medium may comprise instructions that, when executed by the control circuitry of a device (e.g., a server or a computing device of the one or more computing devices), cause the control circuitry to (1) determine features of frames excluding the identified elements such as color gamut (including, e.g., contrast, brightness, hue and color range, position of the colors in the frames excluding the identified elements), and (2) determine a complexity score for each frame.

In some instances, a non-transitory computer-readable medium may comprise instructions that, when executed by the control circuitry of a device (e.g., a server or a computing device of the one or more computing devices), cause the control circuitry to (1) access closed captions associated with the at least a portion of a media asset, (2) run a language analysis on the accessed closed captions and (3) determine a complexity score associated with part (e.g., closed captions) of the visual content of the at least a portion of the media asset based on the cognitive load, for the user, associated with the accessed closed captions. The cognitive load is in turn based on the language complexity of the accessed closed captions. In some instances, the control circuitry acts as a syntactic analyzer to assess the language complexity of the accessed closed captions and determine a complexity score associated with part of the visual content (e.g., closed captions) of the at least a portion of the media asset.

In some instances, a device (e.g., a server or a computing device of the one or more computing devices) may employ a virtual camera to analyze, in terms of camera angle changes, each scene of a media asset (e.g., media content, supplemental content, or the like). In some instances, a non-transitory, computer-readable medium comprises instructions that, when executed by the control circuitry of a device (e.g., a server or a computing device of the one or more computing devices), cause the control circuitry to (1) analyze scenes (comprising a plurality of frames) of a media asset (e.g., the content item, the supplemental content item, or the like) so as to classify the scenes based on the occurrence of a predominant respective camera angle change (such as zoom-in, zoom-out, panning, cut, gradual transitions (e.g., fade in, dissolve, or the like), visual effects (e.g., blur, distort, or the like) and temporary camera immobility) in each scene, and (2) determine, for each classified scene, a complexity score associated with the classified scene based on the predominant respective camera angle change. For instance, a zoom-out may be associated with a higher complexity score than a zoom-in, since the zoom-out results in encompassing more elements (e.g., objects, characters, locations, or the like) than the zoom-in. In some instances, the visual information associated with at least a portion of a media asset may comprise the classification, by the virtual camera, of scenes of a media asset: a complexity score associated with the at least a portion of a media asset comprises a component based on said classification. In some instances, the virtual camera may determine a complexity score associated with a plurality of frames by identifying and listing camera angle changes. In some instances, the virtual camera may determine a complexity score associated with a plurality of frames based on an amount of camera angle changes and characteristics of the camera angle changes across the plurality of frames. In some instances, the virtual camera may assign a respective weight to each identified camera angle change in the determination of a complexity score associated with a plurality of frames of a media asset. In some instances, the virtual camera may assign a respective weight to one or more characteristics of each identified camera angle change in the determination of a complexity score associated with a plurality of frames of a media asset.

In some instances, a device (e.g., a server or a computing device of the one or more computing devices) may employ a computer audio algorithm to analyze audio information associated with each frame or scene of a media asset (e.g., media content, supplemental content, or the like) and determine a complexity score associated with the audio information associated with each frame or scene of the media asset.

In some instances, a non-transitory, computer-readable medium may comprise instructions that, when executed by the control circuitry of a device (e.g., a server or a computing device of the one or more computing devices), cause the control circuitry to (1) determine, from audio information associated with frames, audio characteristics (e.g., volume, frequency or pitch, number of sound sources, speed of the speech or audio velocity, audio volatility, or the like) and (2) determine a complexity score for each portion of audio information associated with a frame. As referred to herein, the term “volatility” may mean the frequency at which the audio content associated with at least a portion of a media asset moves between a minimum value and a maximum value throughout the at least a portion of the media asset. In some instances, a non-transitory computer-readable medium may comprise instructions that, when executed by the control circuitry of a device (e.g., a server or a computing device of the one or more computing devices), cause the control circuitry to (1) transcribe speech from the audio content associated with at least a portion of a media asset, (2) run a language analysis on the transcribed speech and (3) determine a complexity score associated with part (e.g., speech) of the audio content of the at least a portion of the media asset based on the cognitive load, for the user, of the transcribed speech. The cognitive load is in turn based on the language complexity of the transcribed speech. In some instances, the control circuitry acts as a syntactic analyzer to assess the language complexity of the transcribed speech and determine a complexity score associated with part of the audio content (e.g., speech) of the at least a portion of the media asset.

In some instances, a device (e.g., a server or a computing device of the one or more computing devices) may employ a computer audio and vision algorithm to analyze visual and audio information associated with each frame or scene of a media asset (e.g., media content, supplemental content, or the like) and determine a complexity score associated with each frame or scene of the media asset. In some instances, the device may employ both a virtual camera and a computer audio and vision algorithm to analyze visual and audio information associated with each frame or scene of a media asset and determine a complexity score associated with each frame or scene of the media asset.

In some examples, a plurality of consecutive portions of the media content are associated with a complexity score relative to (e.g., above or below) a threshold complexity score. In some examples, a plurality of consecutive portions of the media content are associated with a single complexity score relative to (e.g., above or below) a threshold complexity score. In some examples, the system may determine that the sum of durations of the plurality of consecutive portions is above a threshold duration (e.g., 30 seconds, one minute, five minutes, etc.) to provide a discourse, or conversational, window. In some embodiments, the system is configured to provide a discourse, or conversational, window upon crossing thresholds for both complexity and duration.

In some examples, the threshold complexity score is based on a genre of the content item. A genre of the content item may be, for example, comedy, drama, fiction, science fiction, fantasy, action, horror, romance, thriller, historical, documentary, and the like. For instance, a content item of the comedy genre aims at making the largest amount of people laugh by presenting consecutive jokes and as such may be associated with a low complexity score. For example, a content item of the action genre aims at presenting, e.g., spectacular stunts, rapid movements of characters, fights, or explosions and may be associated with a high complexity score. In a content item of the fantasy genre or historical genre, costumes, makeup, languages and body movements of actors, as well as decor and music (e.g., soundtrack), are meant to immerse the user in an environment different from the user's daily environment. A content item of the fantasy genre may thus be associated with a high complexity score. For example, a content item of the thriller genre may typically exhibit a higher complexity score than a documentary. Genres of content items allow for ranking content items, as the genres of the content items are associated with given ranges of complexity scores. For example, knowing the genre of a content item provides a basis for weighting of the complexity score or adjustment of the complexity threshold.

In some embodiments, the co-watch bot discourse may be initiated by the co-watch bot detecting areas of content where a user is mostly likely to initiate conversation based on co-watch metadata. For example, the system may analyze the stored (e.g., co-watch bot conversation histories 326 and 346 of FIG. 3) user interaction timestamps recorded (e.g., in steps 606 and 614 of FIG. 6A, 640 of FIG. 6B, 660 of FIG. 6C, and 682 of FIG. 6D) across all viewings of a media content (e.g., user profile 1 320 through user profile N 340 of FIG. 3) to determine one or more favorable timepoints to generate and output an inference. In another example, the system may analyze the co-watch bot conversation history of a particular user profile to determine conversational behaviors of the particular user to determine one or more favorable timepoints to initiate and output an inference. In some embodiments, the inference is based on the sliding context window. In some embodiments, the inference is retrieved, generated, and/or adjusted based on the system-marked successful inferences of the user interaction timestamps used to select the inference output timing. In some embodiments, the system may locally cache (e.g., storage circuitry 908 of FIG. 9, storage circuitry 1014 of FIG. 10, or any other suitable storage) or timely transmit the co-watch bot inference output for playback at the determined timestamp.

Figure 6C:
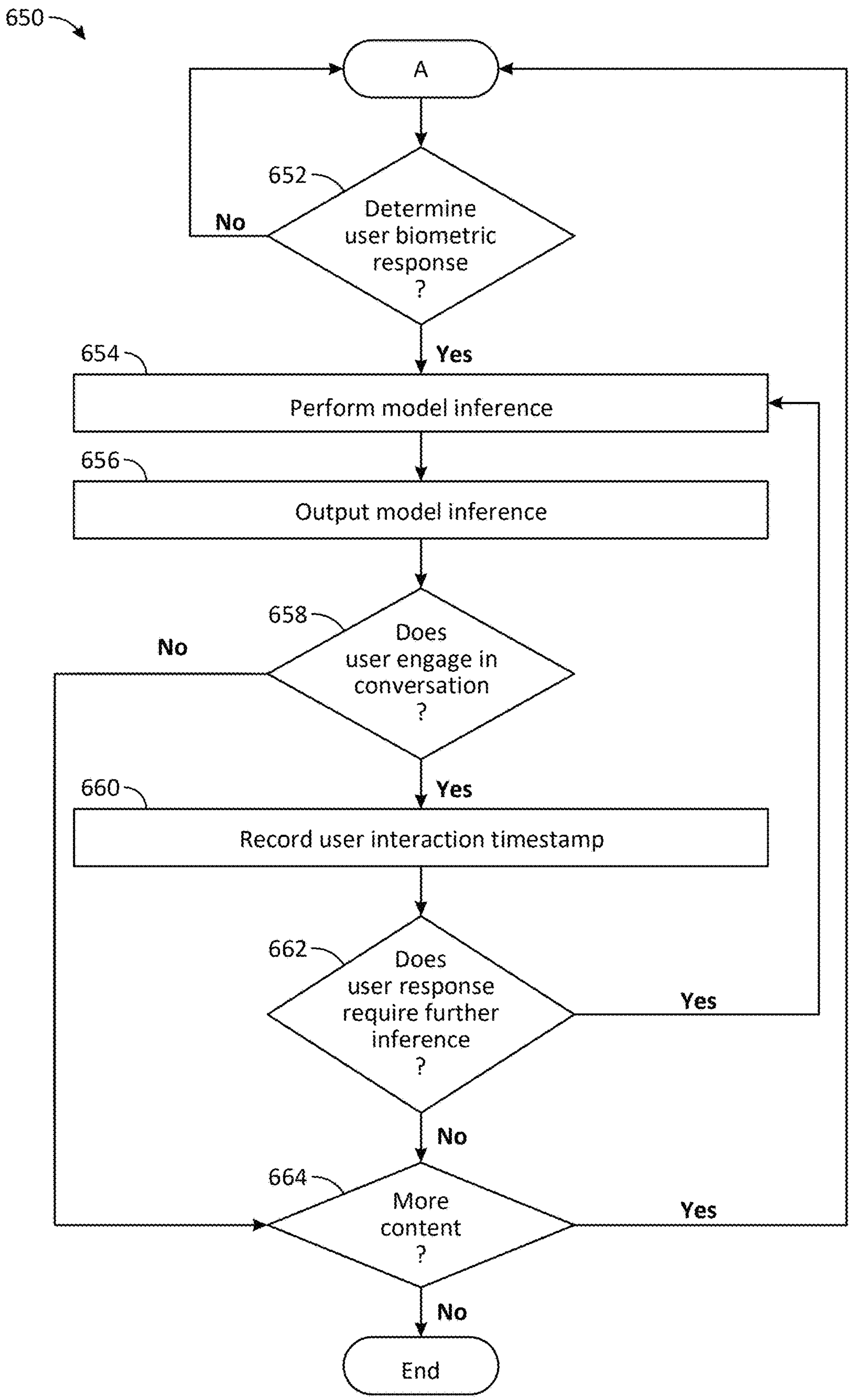
FIG. 6C depicts a flowchart of a process of the co-watch bot when the model performs an inference based on a biometric response, in accordance with some embodiments of the disclosure.

In some embodiments, the co-watch bot discourse may be initiated by the co-watch bot detecting a biometric response while watching the media content (e.g., process 650 of FIG. 6C). For example, the system may collect and store data recorded by available sensor devices (e.g., cameras, biometric sensors, or the like) that measure user behavior and/or reactions throughout the media play, or during/surrounding a co-watch bot conversation. The system may encode and store biometric/behavioral data as part of the user's co-watch bot conversation history (e.g., 326 of FIG. 3). For example, the system may analyze sensor data to detect an increase in heart rate, change in posture, perspiration, change of facial expression, movement of eye gaze toward the location of the co-watch bot representative UI or other direction of interest, a change in a shape of a pupil (e.g., pupil dilation), audible gasping or expressions, increased body temperature, hand gestures and/or the user falling asleep or being unconscious. In some embodiments, if the biometric response is the user falling asleep, the co-watch bot may save the progress point and co-watch session in the user profile (e.g., 320 of FIG. 3) and end the media content play. In some embodiments, the system may determine, using user-specific collected data, a distribution range for the user's normal (non-conversational) behavior and/or reactions. For example, the system may determine a sensor measurement beyond the distribution range that is indicative of a biometric response while watching the media content and generate an inference based on the current sliding context window. In some embodiments, the system may compound utilizing biometric responses and the determined window of low complexity media content to output a model inference based on the biometric response at a timestamp based on a determined window of low complexity media content, thus timing the output based on the biometric response such that the system does not disturb the viewing experience or emotional reaction of the user. For example, the system may locally cache (e.g., in storage circuitry 908 of FIG. 9, storage circuitry 1014 of FIG. 10, or any other suitable storage) or timely transmit the co-watch bot inference output for playback at the determined timestamp.

Figure 6D:
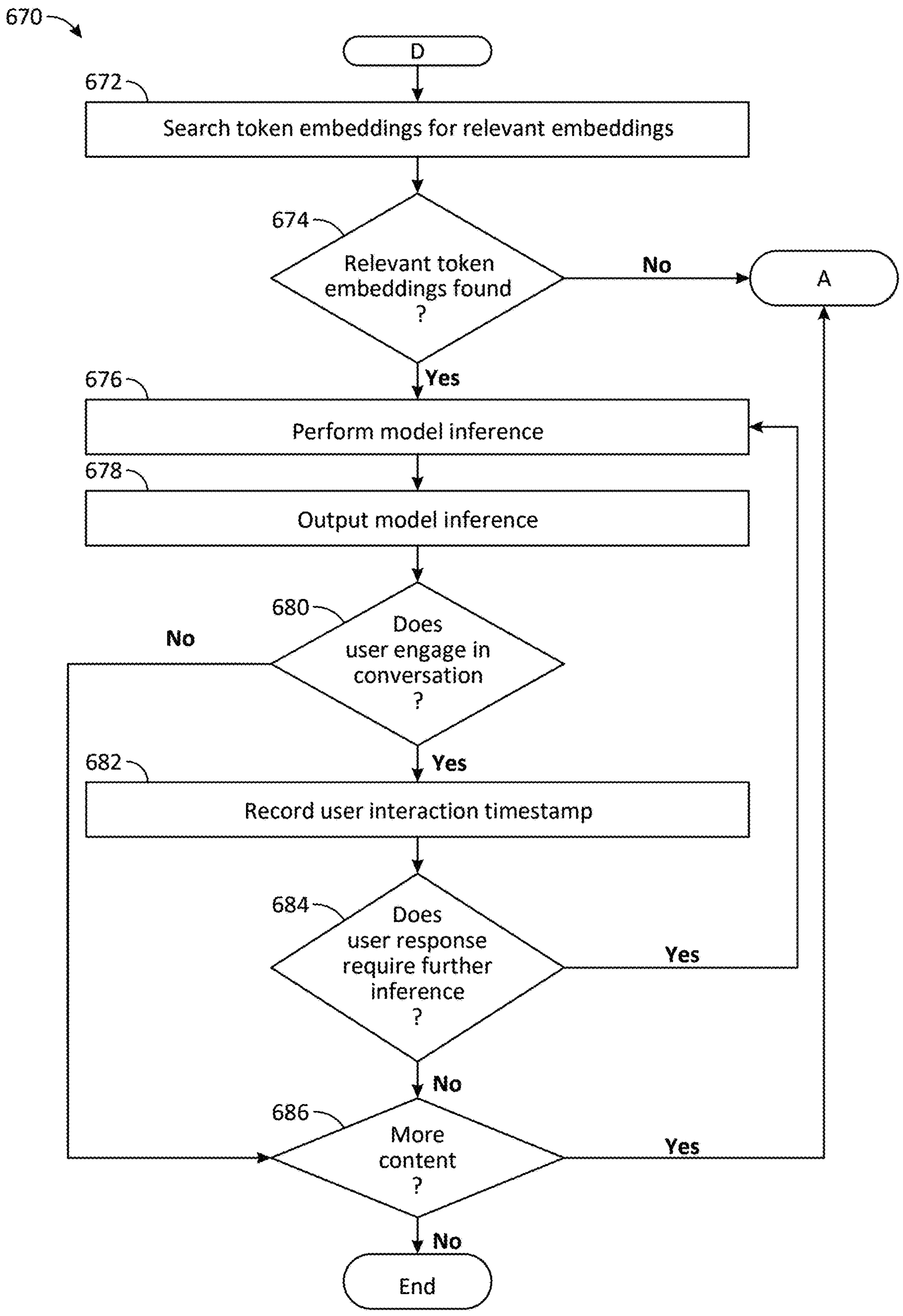
FIG. 6D depicts a flowchart of a process of the co-watch bot when the model performs an inference based on previous user input, in accordance with some embodiments of the disclosure.

In some embodiments, the co-watch bot discourse may be initiated by the co-watch bot based on previous user discourse (e.g., process 670 of FIG. 6D). For example, the system may analyze the user input discourse by encoding the words of the user input discourse and comparing the encoding to the latent token embeddings (e.g., representing character, actor, object, location, or the like) of the media content remaining. For example, the system may search for token embeddings related to a video frame, object, person, character, face, sound, and/or location to determine probable future discourse opportunities, thus reducing the latency or increasing the discourse window duration for inferencing to occur. For example, the system may mark matching latent token embeddings as relevant and store these with the user's co-watch bot conversation history (e.g., 326 of FIG. 3). For example, the system may use the matching latent token embedding to determine the timestamp for inference generation. The system may locally cache (e.g., storage circuitry 908 of FIG. 9, storage circuitry 1014 of FIG. 10, or any other suitable storage) or timely transmit the co-watch bot inference output for playback at the determined timestamp.

Figure 2:
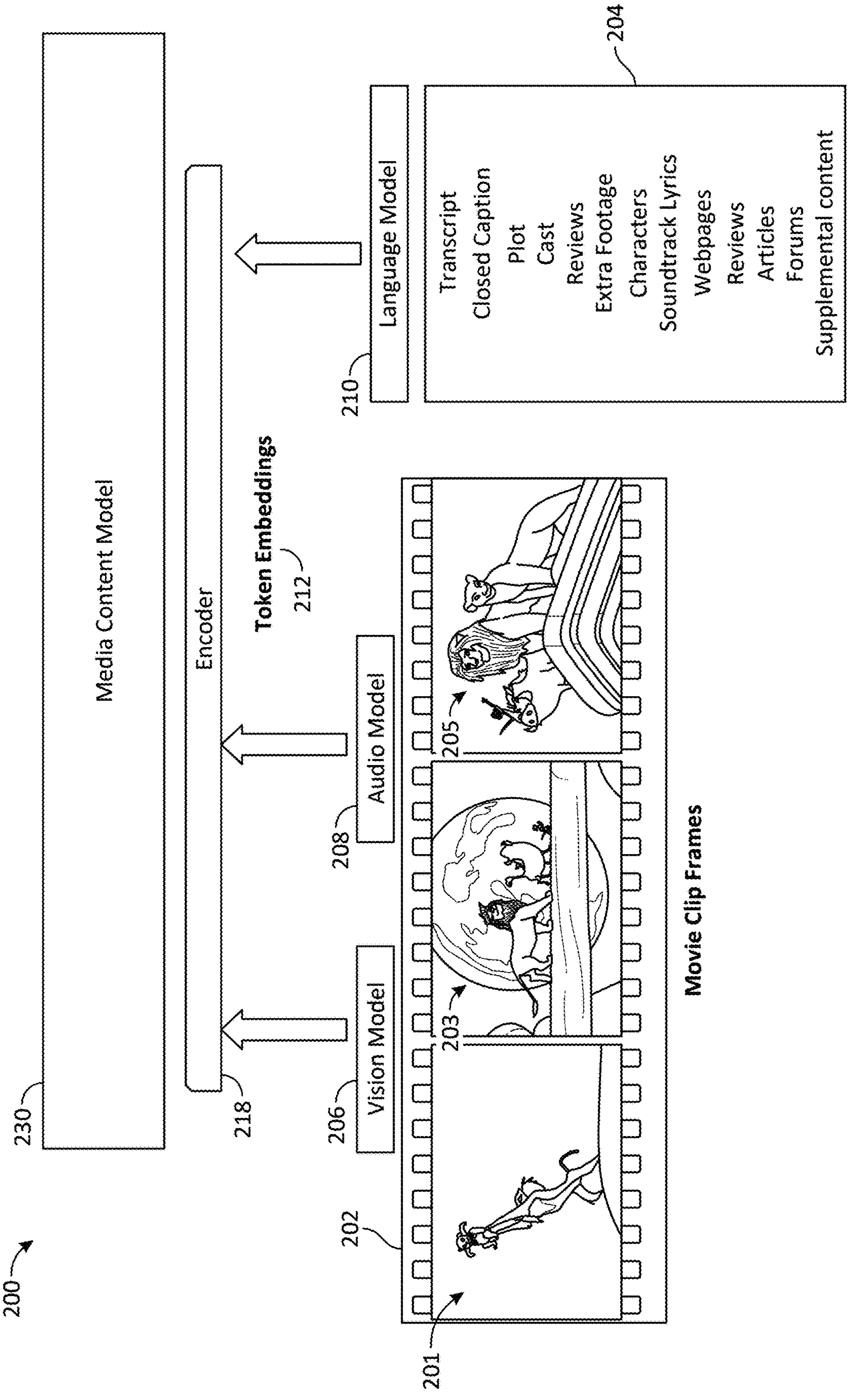
FIG. 2 depicts a schematic illustration of training a model for co-watching media content, in accordance with some embodiments of the disclosure.

FIG. 2 depicts a schematic illustration of training a model 230 for co-watching media content, in accordance with some embodiments of this disclosure.

In some embodiments, the system may implement a slow or cold start training to the multi-modal generative models. For example, the system may use one or more criteria (e.g., a certain threshold of watch hours, viewership, ratings, or the like) to determine which of the media content to select for training a corresponding multi-modal generative model. In some embodiments, the system may generate training data for the multi-modal generative media content model 230 by employing a vision model 206, an audio model 208, and a language model 210. In some embodiments, an encoder 218 may map or adapt the token embeddings 212 from the vision, audio, and language models into discrete relationships between the visual, audio and text embeddings to generate latent space tokens (e.g., 120 of FIG. 1) from training data for the media content model 230. In some embodiments, the system may extract a smaller number of embeddings through these models initially and monitor media content and/or co-watch bot performance (e.g., popularity, ratings, repeat viewership, complete viewership, feedback, or the like) to determine whether to iteratively refine the media content model 230. In some embodiments, the system may determine to implement additional or accelerated training, such as incremental runs for additional token generation, by increasing the number of parameters the model possesses, and/or implementing advance token generation processes for the video content by the vision model (e.g., neural radiance field (NeRF) and 3D temporal Gaussian splatting). In some embodiments, the system may employ retrieval augmented generation (RAG) initially (e.g., default RAG dataset) as additional media resources become available for periodic refreshing or fine-tuning of the media content models (e.g., 330 of FIG. 3). In some embodiments, the system may employ CAG preloading of information at an interval (e.g., prior to each co-watch bot session, daily, monthly, or the like) to cache relevant data (e.g., from media sources) for immediate use during the inferencing step (e.g., 134) of the media content models (e.g., 330 of FIG. 3).

In some embodiments, the multi-modal generative model training includes generating training data through a language model 210 processing one or more media content supplemental sources 204. For example, the media content supplemental source may include data from the media platform (e.g., a media content transcript, closed captioning, plot, soundtrack lyrics, cast and/or characters, or the like), data from external sources (e.g., metadata from webpages, media content review by critics, articles, forums, and/or supplemental content such as behind-the-scenes footage, making of documentaries, additional scenes, or the like), and/or any other media content metadata source or combination thereof. In some embodiments, the system may store the media platform media content supplemental source metadata at the media platform server (e.g., 1004 of FIG. 10).

In some embodiments, the multi-modal generative model training includes generating training data through a vision model 206 processing the media content 202. In some embodiments, the system may implement strategies to manage the computational burden to build a large vision model for a long-form media content item, particularly given a media platform that holds a relatively large number of long-form media content items. In some embodiments, the system may pre-train the computation server to build the model by providing a playout of the compressed video frames. In some embodiments, the system may employ the data generated during the language model training. For example, the system may apply corresponding language tokens extracted by the language model 210 as weighting for heavy dialogue sections and silent sections. For example, the system may determine the heavy dialogue sections or silent sections as potential timepoints in which the co-watch bot may receive or initiate discourse.

In some embodiments, the system may implement strategies to achieve the best inference performance. For example, the vision model 206 may section the media content into many chapters or scenes. From the sectioned media content, the vision model may extract video frames and extract tokens from the video frames. In some embodiments, the vision model encodes each section and associated frames in the respective section with the computed tokens. In some embodiments, the vision model may identify aspects of the media content including characters, actors, objects, locations, and/or other elements. For example, as the vision model processes the video frames, any characters, actors, objects, locations, or the like that appear in those frames are marked in the token embeddings. For example, the vision model may detect a male character in a frame and utilize other generated token embeddings (e.g., media content cast and character metadata) to enhance the male token with the name of the actor and his character's name. For example, the vision model may employ this same enhancement algorithm for any object, location, story-related actions (e.g., covered by the movie plot, closed captions, or the like) to enhance the vision model generated token embeddings with all the default RAG data and/or CAG data that is available and becomes available over the lifetime of the media content.

In some embodiments, the vision model may tag the computed tokens with frame numbers and/or timestamps.

In some embodiments, the system may bias the vision model to reduce the computational resources required to train the media content model 230 and achieve higher accuracy with fewer hallucinations. For example, system focus on managing vision model computational resources provides selective extraction of token embeddings from the highest density source of information. For example, the system may determine expected windows of co-watch bot discourse engagement and bias the vision model 206 to extract more embeddings from those expected windows. In some embodiments, the vision model may identify low- and high-complexity portions of a media content item based on the elements detected in a video frame. In some embodiments, the system may employ the vision model 206 to perform a second pass on video frames of high complexity temporal regions to contribute more embeddings. For example, additional token embeddings may be extracted proportionally to the complexity score of the media frames and/or sections. In some embodiments, the system may monitor the frequency at which token embeddings are utilized for inference generation. For example, the system may limit or reduce token embeddings extracted during fine-tuning of the media content model 230 (e.g., through process of FIG. 7).

In another embodiment, the system may employ advanced token generation processes while video frames are being processed to extract and assign video embeddings. In some embodiments, the system may utilize neural radiance field (NeRF) for scenes determined to have high complexity to reconstruct complex three-dimensional scenes from a partial set of the video frames. For example, the employed NeRF learns the scene geometry, objects, and angles of a particular scene. For example, the media content model 230 may use the NeRF output to assign cross frame or scene correlations in the form of linked video embeddings, thus enabling the media content model 230 to utilize a second derivative of relational data mapped into the video frame embeddings during inferencing. For example, the media content model would be able to make an inference from the location and/or movement of a person or object across multiple frames.

In some embodiments, the system may utilize 3D temporal Gaussian splatting for generation of visual token embedding in 3D media content. For example, the system may employ 3D temporal Gaussian splatting to provide direct rendering of volumetric data without converting the data into surface or line primitives. For example, 3D temporal Gaussian splatting integrates sparse points produced during camera calibration. In some embodiments, the system may access metadata associated with the media content (e.g., camera data that may be available from the content producer), to represent a scene with 3D Gaussians, which retain properties of continuous volumetric radiance fields.

In another embodiment, the system may assign more graphics processing units (GPUs) to extracting video embeddings compared to extracting text and audio embeddings. The system may also implement a GPU kernel code that may process all video frames in parallel, and the encoder may operate afterwards to map the correlations between all the extracted token embeddings. The system may have a shared memory for the different threads of the GPU kernel code to access the generated multi-modal embeddings. The platform may allow access based on the timestamp or frame metadata in terms of the correlation between the embeddings.

In some embodiments, the multi-modal generative model training includes generating training data through an audio model 208 processing the media content 202. For example, the audio model may extract the tone, pitch, and volume embeddings from the audio recording and soundtrack of the movie. For example, the system may apply these embeddings as weighting to the corresponding language tokens extracted by the language model 210. In some embodiments, the audio model 208 may generate token embeddings from the dialogue, lyrics, soundtrack, score, sound effects, background noise, audio transitions, silence, and/or spatial audio that are associated with the media content.

In some embodiments, the system may employ RAG upon determination that the co-watch bot inference generation failed to produce a result or the inference result was determined to be unsatisfactory (e.g., via feedback or success parameters, or the like). In some embodiments, the system may employ the RAG process for periodic refreshing or fine-tuning of the media content models (e.g., 330 of FIG. 3) as more media content supplemental sources are updated or published.

In some embodiments, the system may employ a CAG refresh upon determination that the co-watch bot inference generation failed to produce a result or the inference result was determined to be unsatisfactory (e.g., via feedback or success parameters, or the like). In some embodiments, the system may employ the CAG refresh for periodic refreshing or fine-tuning of the media content models (e.g., 330 of FIG. 3) as more media content supplemental sources are updated or published.

Figure 3:
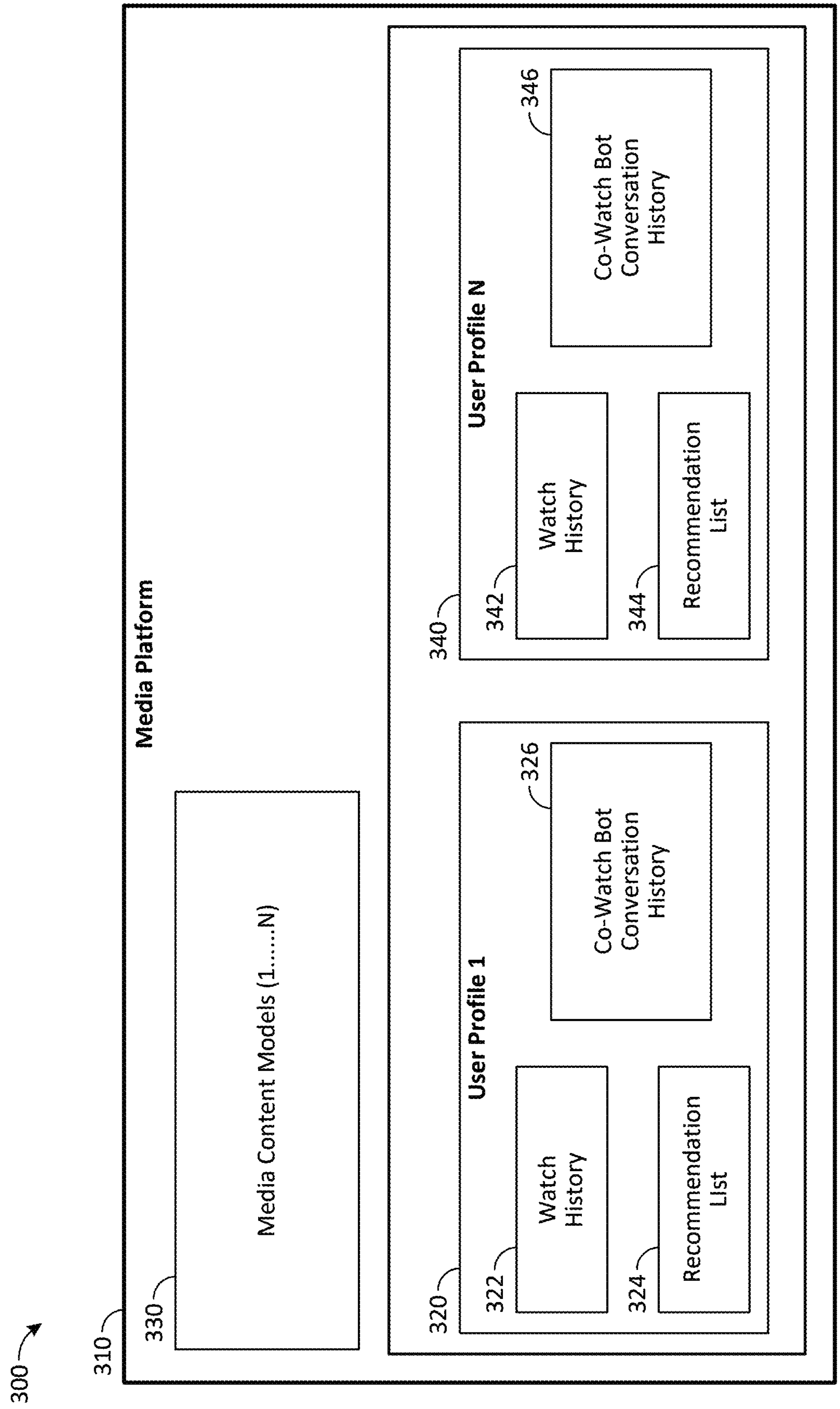
FIG. 3 depicts a schematic illustration of the media platform for co-watching media content, in accordance with some embodiments of the disclosure.

FIG. 3 depicts a schematic illustration of the media platform 310 for co-watching media content, in accordance with some embodiments of this disclosure.

In some embodiments, the media platform contains a number of media content models 330 and a number of user profiles (e.g., 320 and 340). For example, media content models 330 are the multi-modal generative models that are each trained (e.g., per process 200 of FIG. 2) on a media asset and are the inferencing mechanism of the co-watch bot (e.g., 144 of FIG. 1). For example, the system stores user profiles (e.g., 320 and 340) containing metadata information about the users to provide personalized discourse and reduced latency response for each user. In some embodiments, multiple user profiles may be associated with one media platform account. In some embodiments, the system may store a watch history (e.g., 322 and 342) in the user profile. In some embodiments, the system may store co-watch bot conversation history (e.g., 326 and 346) in the user profile. In some embodiments, the system may generate a recommendation list (e.g., 324 and 344) in the user profile. For example, the recommendation list may include media titles based on the watch history. In another example, the recommendation list may include co-watch bots based on the co-watch bot conversation history.

Figure 9:
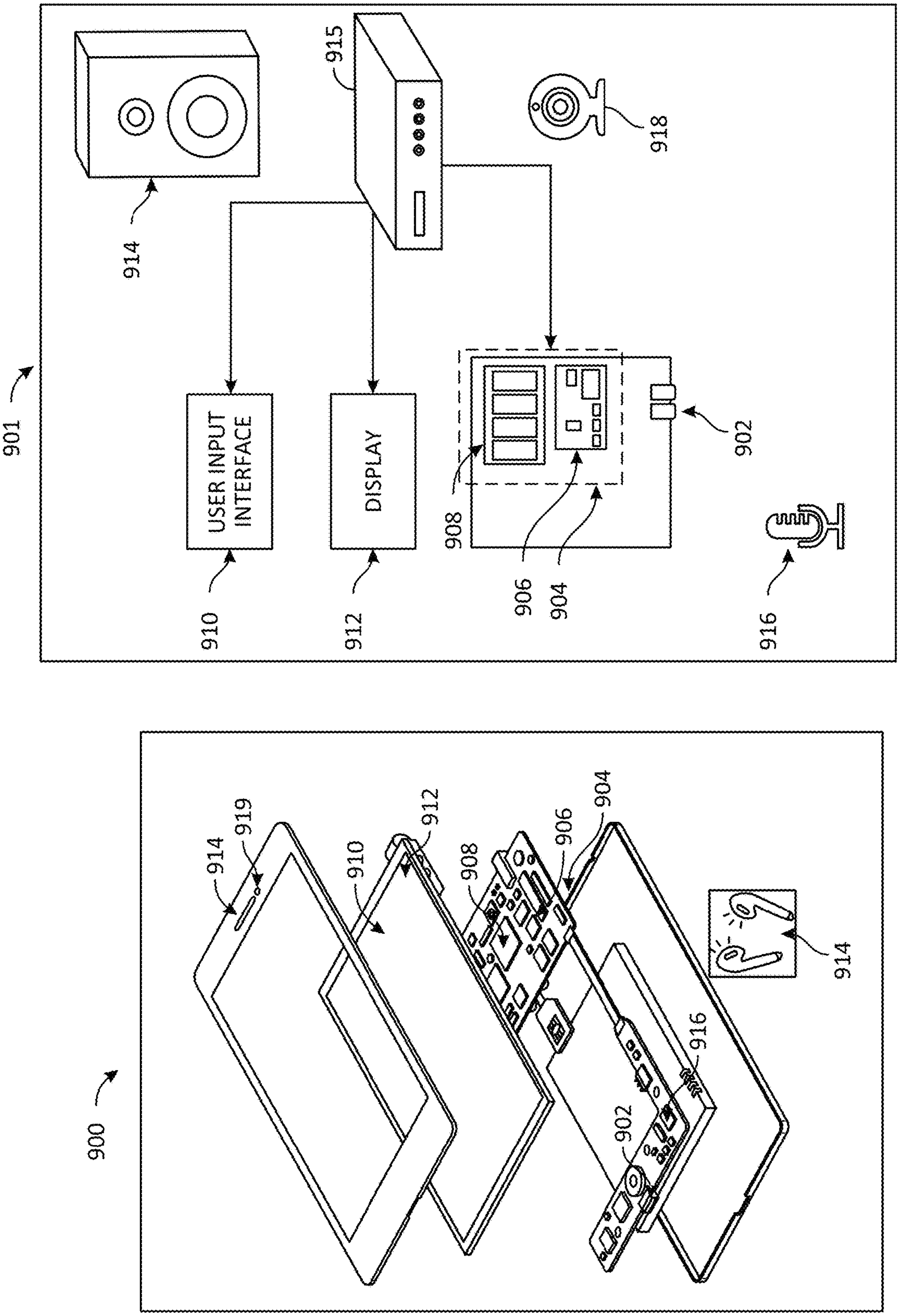
FIG. 9 depicts an illustrative user equipment, in accordance with some embodiments of the disclosure.
Figure 10:
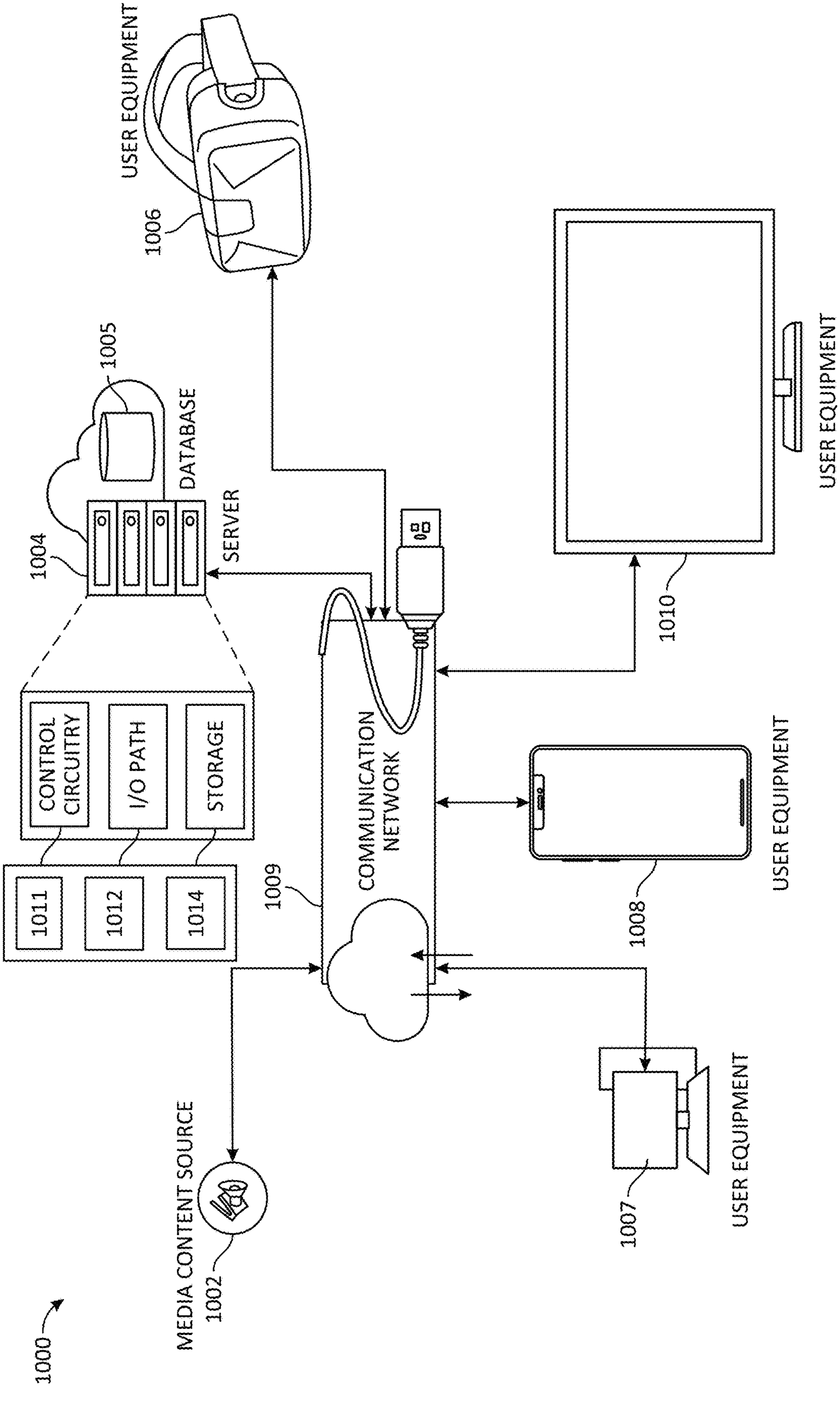
FIG. 10 depicts an illustrative user equipment system, in accordance with some embodiments of the disclosure.

In some embodiments, the co-watch bot conversation history 326 may include a recording of the media content session with the co-watch bot (e.g., in storage circuitry 908 of FIG. 9, storage circuitry 1014 of FIG. 10, or any other suitable storage). For example, the system provides viewing of past co-watch bot sessions (e.g., via a user device). In some embodiments, the co-watch bot conversation history 326 may include user and co-watch bot discourse entries and any feedback or success parameters that may be used as conversational context. For example, the co-watch bot may store these contexts at a uniform resource locator (URL) and may preserve inference results in terms of the path that the neural network had traversed. For example, success parameters may include threshold criteria for at least one of: confidence score of an inference (e.g., higher confidence score indicates better performance), level of engagement with the co-watch bot (e.g., higher level of engagement in terms of duration of a dialog or number of interaction indicates better performance), frequency of error handling (e.g., lower frequency indicates better performance), frequency of real-time RAG retrieval success (e.g., higher frequency indicates better performance), frequency of CAG data usage success (e.g., higher frequency indicates better performance), latency of user interaction (e.g., low latency indicates better performance), frequency of user abruptly ending a discourse (e.g., lower frequency indicates better performance), or the like. In some embodiments, the system may be configured to automatically delete recorded co-watch bot sessions upon reaching a threshold of memory storage. In some embodiments, the system may delete some or all recorded co-watch bot sessions based on user input. In some embodiments, the system may be configured to prompt a user, at the end of a co-watch bot session, to store the session history. For example, the system may only store a co-watch bot session if the user confirms. For example, the system may receive input from the user to emphasize a co-watch session to be used for co-watch bot model retraining, fine-tuning, or personalization. In some embodiments, the system may lock (e.g., requiring a password, passcode, PIN, or the like) a co-watch bot session. For example, the system prevents the data of a locked co-watch bot session from being available for co-watch bot retraining, fine-tuning, or personalization. For example, a user may have had a vulnerable or personal conversation with a co-watch bot and prefer that conversation not to be used for co-watch bot retraining, fine-tuning, or personalization.

In some embodiments, the system may limit the usage of co-watch bots (e.g., media content models 330) on the media platform 310. In some embodiments, the system may provide unlimited usage of co-watch bots. In some embodiments, particularly where resource constraints may preclude unlimited usage of the co-watch bots across the platform for multiple users, the system may implement one or more strategies for limiting the usage of co-watch bots. For example, access to co-watch bots may be limited based on number of media content items viewed with a co-watch bot, minutes of co-watch bot usage, computational burden (e.g., resources consumed) of the user interacting with the co-watch bot, genre, or based on a subscription plan. For example, the media platform 310 may include subscription levels, where the premium level includes unlimited co-watch bot sessions. For example, the media platform 310 may include free usage, where the free usage plan includes a hard limit of access to the co-watch bots. For example, the system may compute a resource burden of a particular user based on the complexity of the co-watch bots used (e.g., number of parameters used to build the model), selected personality layers, quantity and length of conversations with the co-watch bot, number of user initiations with the co-watch bot, number of tokens received and/or generated during co-watch bot sessions, and/or length of the context window, e.g., for generation by the co-watch bot. In some embodiments, when the system computes that a user has exceeded a threshold usage limit, the system may generate an alert message. For example, the system may display this alert message (e.g., on the screen of laptop 140 of FIG. 1) or send the alert via the user's indicated communication method configured in an associated user profile (e.g., 320). In some embodiments, the system-provided alert message may include an offer to upgrade a co-watch bot usage plan. For example, the system may recommend a level of subscription base on the computed resource burden. In some embodiments, once the usage limit is reached, the system may make selection of a co-watch bot unavailable. For example, features displaying co-watch bots, e.g., 434 of FIG. 4 and menu 500 of FIG. 5 may be replaced or grayed out. For example, the system may replace features displaying co-watch bots with a selectable option to upgrade co-watch bot service, advertisements, or other general content provided by the media platform. In some embodiments, the system may restore access to the co-watch bots upon reaching a reset period (e.g., once a month).

Figure 4:
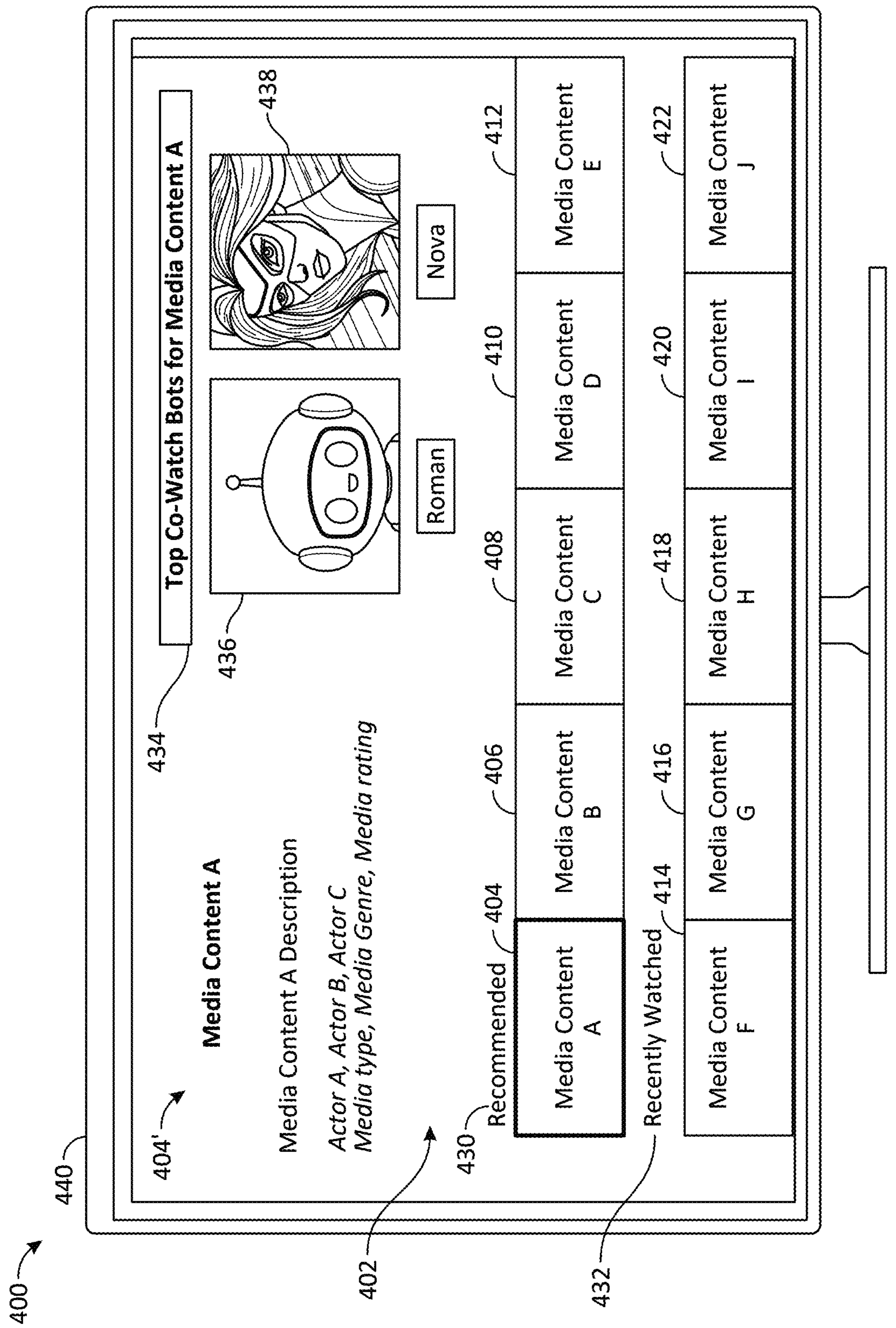
FIG. 4 depicts a schematic illustration of the media platform interface, in accordance with some embodiments of the disclosure.

FIG. 4 depicts a schematic illustration of the media platform interface 402, in accordance with some embodiments of this disclosure.

In some embodiments, the media platform may be accessed by television 440 or any other suitable display device (e.g., laptop 140 of FIG. 1, user equipment devices 1006, 1007, 1008, and 1010 of FIG. 10). The media platform may display available media content in any manner suitable for user search and selection. For example, media content items 404-412 are displayed under a "Recommended" category 430 and media content 414-422 are displayed under a "Recently Watched" category 432. In some embodiments, the system may highlight a media content item and provide additional media content information 404' for the media content item and provide suggested co-watch bots 436 and 438. For example, a co-watch bot may be displayed based on being popular for the particular media content (e.g., category 434), being previously selected by the user, being a character of the media content, being the default co-watch bot of the media content, or the like. As the system receives input to scroll, pan, or equivalent to a subsequent media content item (e.g., scrolling from media content 406 to media content 404), the system updates the additional media content information 404' and the suggested co-watch bots 436 and 438. In some embodiments, the system may be initiated by receiving a user selection of a media content item. For example, the system may subsequently display the suggested co-watch bots (or additional and/or alternative co-watch bots) for user selection, as depicted in FIG. 5.

Figure 5:
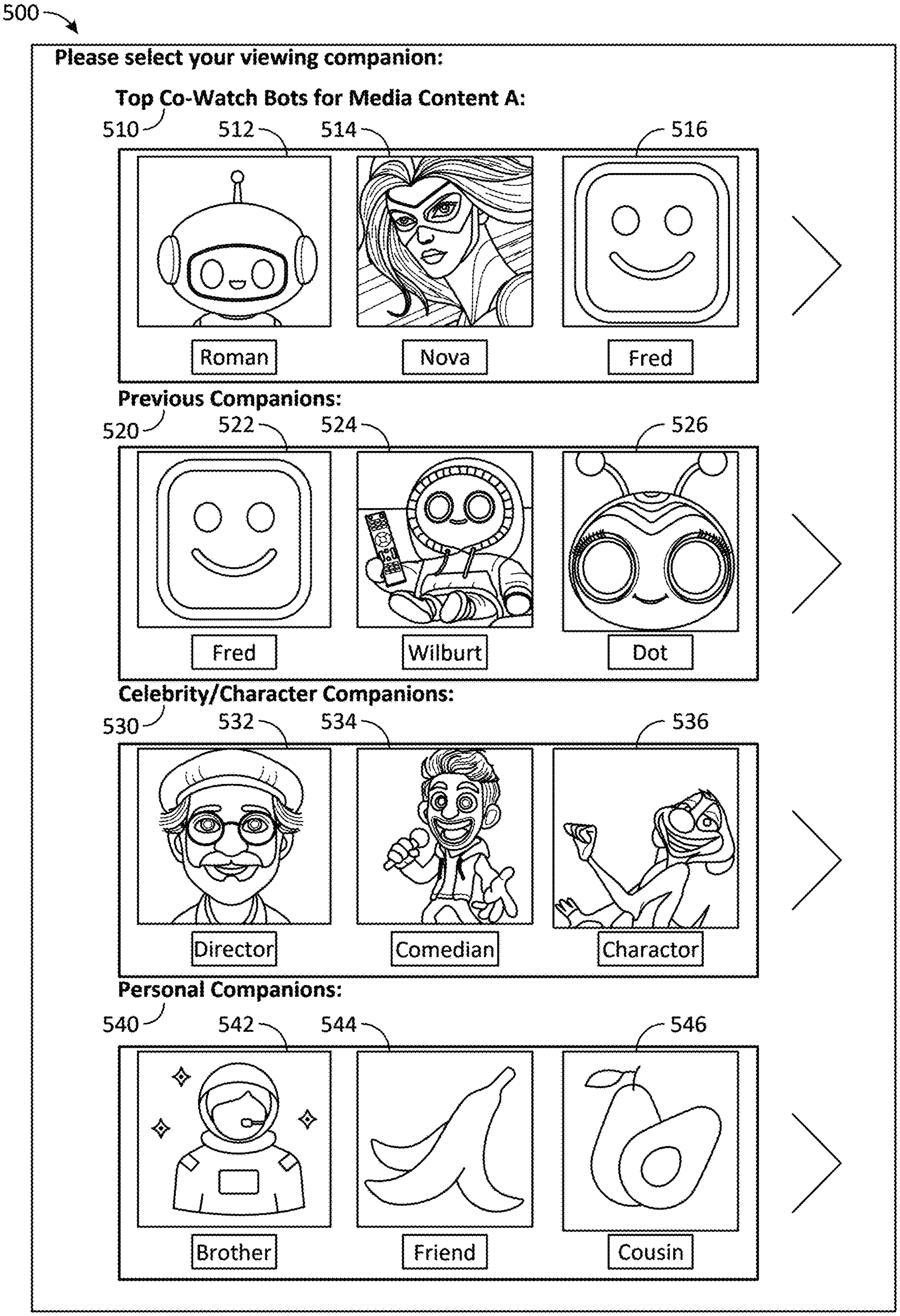
FIG. 5 depicts a schematic illustration of a menu for co-watch bot selection, in accordance with some embodiments of the disclosure.

FIG. 5 depicts a schematic illustration of a menu 500 for co-watch bot selection, in accordance with some embodiments of this disclosure. In some embodiments, the system may provide a variety of co-watch bot personalities (e.g., 512-516, 522-526, 532-536, and 542-546) for the user to select. The system may display the co-watch bot personalities based on category. For example, categories may include, but are not limited to, most popular co-watch bot for a media asset, most popular co-watch bot overall, previously or recently used, celebrity, character, personal, or the like. The system may implement the user-selected co-watch bot as a personality layer for the trained co-watch bot model. For example, the system may input data associated with this personality layer into the pre-trained co-watch bot model for the selected media content, resulting in an adjustment to the conversational style of any inferences generated by the co-watch bot.

In some embodiments, the system may provide co-watch bots representing celebrities, characters, or other popular personalities for selection. For example, the system may offer a co-watch bot modeled after a famous critic, such as Roger Ebert, or a famous director, such as Tarantino, Spielberg or Scorsese. In some embodiments, the system may import a personality layer from a third-party provider, such as character.ai, or the system may generate a personality layer based on extracted token embeddings of the media content.

In some embodiments, the system may use media platform accounts and profiles to generate a co-watch bot personality that may be personal to the user. For example, the system may use user profile information and co-watch bot conversation histories to generate a bot personality layer representing that profile. The system may utilize account-profile relationships (e.g., several profiles on one account) and profile-profile relationships (e.g., through mutually accepted connection) to provide access to and/or generation of a co-watch bot personality.

In some embodiments, the system may be configured for different language preferences. For example, a co-watch bot may output inferences in the language of the media content as the system default. For example, a co-watch bot may output inferences according to a user-selected subtitle language. For example, the system may receive a language selection for the co-watch bot discourse that is different from the media content or subtitle languages.

In some embodiments, multiple co-watch bots may attend a media content session. In some embodiments, the multiple co-watch bots utilize the same media content model. For example, the system fine-tunes the multiple co-watch bots through personality layers, different past session histories of the select personalities, and/or extra inferencing steps that use different prompts using data from different past co-watch bot conversational data (e.g., from co-watch bot conversation history 326 of FIG. 3). In some embodiments, the system may allow the selection of more than one co-watch bot (e.g., from menu 500). In some embodiments, the system may be configured to invite, include, or suggest additional co-watch bots at the beginning, or at any point during the co-watching session, with the permission of the user. In some embodiments, the system may determine, via feedback or success parameters, poor user interaction with a currently active co-watch bot and offer additional and/or alternative co-watch bots for the session. For example, the system may offer a co-watch bot based on previous user selection, previous successful sessions, and/or success of a co-watch bot for similar users (e.g., based on determining similar user profiles and behaviors) watching the current media content.

FIGS. 6A-D depict flowcharts of processes of the co-watch bot, in accordance with some embodiments of this disclosure. In various embodiments, processes 600, 630, 650 and 670 of FIGS. 6A-D, respectively, may run in parallel as the media content plays. In various embodiments, steps of processes 600, 630, 650 and 670 are corresponding. For example, step 608 of FIG. 6A may generally correspond with steps 634 of FIG. 6B, 654 of FIG. 6C, and 676 of FIG. 6D. Accordingly, upon identical or substantially similar steps, correspondence is indicated (details of identical or substantially similar steps are omitted for brevity).

In various embodiments, the individual steps of processes 600, 630, 650, and 670 may be implemented by one or more components of the devices, systems and methods of FIGS. 1-8 and may be performed in combination with any of the other processes and aspects described herein. Although the present disclosure may describe certain steps of processes 600, 630, 650, and 670 (and of other processes described herein) as being implemented by certain components of the devices, systems and methods of FIGS. 1-8, this is for purposes of illustration only. It should be understood that other components of the devices, systems and methods of FIGS. 1-8 may implement those steps instead.

FIG. 6A depicts a flowchart of a process 600 of the co-watch bot when a user initiates conversation, in accordance with some embodiments of this disclosure.

In some embodiments, at A of process 600, control circuitry (e.g., 904 of FIGS. 9, and 1011 of FIG. 10), running the media application plays the user-selected content (e.g., 404 of FIG. 4). The media application may display the media content (e.g., 142 of FIG. 1), co-watch bot (e.g., 144 of FIG. 1) and a co-watch text discourse (e.g., 146 of FIG. 1) in any suitable manner. For example, all components may be displayed simultaneously, only the media and the co-watch bot are displayed simultaneously, only the media and the co-watch text discourse are displayed simultaneously, or only the media is displayed and the co-watch bot and/or co-watch text discourse are displayed intermittently upon the system detection of a user engagement or opportunity to engage the user (e.g., low complexity area of content or location in content based on previous user engagement). In some embodiments, at A, control circuitry running the media application may also initialize a sliding context window, discussed in detail in relation to FIG. 8.

In some embodiments, at 604, control circuitry detects if a user initiates a conversation. For example, the system may detect if a user initiates a conversation by detecting user discourse, which may include the user's voice (e.g., using microphone 916 of FIG. 9), a text input (e.g., from chat box 146 of FIG. 1), or a user gesture (e.g., hand, head, or body movement, or the like). In some embodiments, when the system detects that a user initiates a conversation, the system may proceed to step 606. In some embodiments, the system may not detect a user initiating a conversation and procced to B of process 630 of FIG. 6B.

In some embodiments, the system may be configured to pause the media content play upon receiving a user discourse input. In some embodiments, the system may analyze media complexity data to determine if there is an adequate window of low complexity content duration for response without pausing the media (e.g., step 632 of FIG. 6B). In some embodiments, the system may be configured not to pause regardless of discourse with the co-watch bot. In embodiments where the system does not automatically pause the media play, the system may delay the co-watch bot inference output until the next adequate window of time for response. The system may locally cache (e.g., in storage circuitry 908 of FIG. 9, storage circuitry 1014 of FIG. 10, or any other suitable storage) or timely transmit the co-watch bot inference for playback at the determined window of time for response.

In some embodiments, the system may receive a user discourse requesting or referring to a portion (e.g., particular frame, scene, section, or the like) of the media content (not shown). For example, the co-watch bot may tokenize the user discourse or engagement and determine that the user has requested or referred to a portion of the media content. For example, the co-watch bot may have received a request to display a portion of the media content. Also, for example, the request to display the portion of the media content may be based at least in part on content associated with a user account and a relatively high metric of user enjoyment (i.e., e.g., user enjoyment). Further, for example, the request to display the portion of the media content may be based at least in part on a determination that a relatively high likelihood exists that clarifying information about the content is desired (i.e., e.g., clarification desired). In addition, for example, the request to display the portion of the media content may be based at least in part on information determined to have been missed in a first viewing of the content (i.e., e.g., missed information). Moreover, for example, the request to display the portion of the media content may be based at least in part on a determination that a relatively high likelihood exists of a desire to share the content associated with a user account (i.e., e.g., desire to share). In some embodiments, the co-watch bot may search the token embedding metadata of the media content (e.g., a frame identifier, a timestamp, complexity of the content area of the token embeddings, actors, characters, objects, locations, soundtracks, media dialogue, or the like) against the tokenized user discourse or engagement for a timeframe of the portion of the media content corresponding to the reference or request. Upon determining a match, the co-watch bot may perform an inference (e.g., at 608) and retrieve the corresponding portion of the media content. In some embodiments, the co-watch bot generates for output the inference and the portion of the media content. In some embodiments, the co-watch bot generates for output the inference incorporating the metadata matching the request. For example, when output, the co-watch bot inference may provide to the user the frame, timestamp, scene, or other metadata references applicable to support the inference validity.

In some embodiments, at 606, control circuitry records a user interaction timestamp. The system may store user interaction timestamps to generate co-watch bot conversation history (e.g., 326 and 346 of FIG. 3) and to create metadata tags to fine-tune model automatic inference output timing.

In some embodiments, the system may create one or more global metadata tags that the system may use to fine-tune or retrain (e.g., per process 700 of FIG. 7) across all co-watch bot models. For example, the system may analyze global metadata tags to determine general conversation timing (e.g., beginning, middle, or end of the media content), determine conversational timing with respect to the determined low and high complexity content areas, determine conversation timings/preferences related to actors, characters, objects, locations, soundtracks, and/or media dialogue, determine conversation timings/preferences related to user input discourse (e.g., system receiving feedback that users like or dislike co-watch bot inferences made based on user reactions, predictions, comments, or the like). In some embodiments, the system may feed the analyzed data into one or more of the co-watch bots on the media platform. For example, the system may feed the analyzed data into all co-watch bots, or the system may selectively feed the analyzed data to co-watch bots based on criteria (e.g., co-watch bot with matching genre, actor, character, rating, language, audience profile, co-watch bot popularity, or the like). The system's ability to fine-tune or retrain globally reduces co-watch bot conversational latency by providing predicted timeframes in which inferences may be pre-executed.

In some embodiments, the system may create one or more personalized metadata for the specific user. For example, the system may collect, and store data recorded by available sensor devices (e.g., cameras, biometric sensors, or the like)

that measure user behavior and/or reactions throughout the media play, or during/surrounding a co-watch bot conversation. The system may encode and store biometric/behavioral data as part of the user's co-watch bot conversation history (e.g., 326 of FIG. 3). For example, the system may determine, using user-specific collected data, a distribution range for the user's normal (non-conversational) behavior and/or reactions and, upon detecting a measurement beyond the distribution range (e.g., increase in heart rate), perform a co-watch bot inference for output. In another example, the system may mark latent token embeddings (e.g., representing character, actor, object, location, or the like) determined to be related to the user discourse and store these with the user's co-watch bot conversation history. For example, the system may use the user's co-watch bot conversation history metadata as input for the co-watch bot to utilize for determination of conversation initiation timing (e.g., process 650 of FIG. 6C and/or process 670 of FIG. 6D).

In some embodiments, at 608, control circuitry causes the co-watch bot to perform a model inference. In some embodiments, the co-watch bot generates inferences producing discourse that feels natural (e.g., personalized) to the user (e.g., via the user device). For example, the system may employ a personalization step for each title model based on available user-specific data (e.g., from user profile 320 of FIG. 3). This method is an improvement over using hyperparameter tuning the base model per each user. Also, for example, the model saves the system high-cost computational resources and prevents corruption of inferences for users with different personal preferences. In some embodiments, the system performs an extra inference step after the media content model generates the initial inference. For example, the system may input a subsequent prompt including specific data about the user (watch history, co-watch bot conversation history, or the like) into the media content model. In another embodiment, the system may monitor an in-watch session conversation history and collect and/or solicit feedback (e.g., thumbs up/down) of how the media content model responses are being received by the user. For example, the system may input the received feedback into the media content model to customize subsequent inferences for the user during that session.

In some embodiments, the system may apply one or more personalization layers to style the inference prior to output. For example, the system may input the selected co-watch bot personality data into the co-watch bot to style the inference in a manner that represents the selected co-watch bot. For example, the system may input data from the user co-watch bot conversation history (e.g., 326 of FIG. 3) to update the inference based on the system determining user-preferred words or jargon. For example, the system may mark (or tag) and store preferred words or jargon in the user profile (e.g., 320 of FIG. 3). The co-watch bot may use a lookup function during inference rendering to replace comparable words or phrases generated by the inferencing.

In some embodiments, the co-watch bot may receive a user input that requires an inference beyond what may be generated by the initial model training and default RAG and/or CAG datasets. For example, the co-watch bot may receive a query regarding other media content in which an actor in the media content performs a similar action (e.g., "In what other James Bond movies does Daniel Craig ride a motorbike?"). In some embodiments, the co-watch bot may cross-query (e.g., via searching, mapping, or the like) the corresponding token embeddings of the model with other co-watch bot models on the media platform. For example, upon receiving a match, the co-watch bot pulls the found/mapped token embeddings from other co-watch bot models using the RAG process to expand data sources to process the query and generate an inference. In another example, upon receiving a match, the co-watch bot will incorporate the found/mapped token embeddings from other co-watch bot models into the CAG dataset.

In some embodiments, during the rendering of the inference or generation for output, the co-watch bot may transfer embeddings generated by the audio model to apply a prosodic structure to an inference. For example, the embeddings generated by the audio model comprise one or more prosodic characteristics, such as tone, pitch, volume, or the like, and may use such characteristics during the model's conversation structuring. In some embodiments, the co-watch bot may receive indication that certain words or phrases have been popular from the media content (such as "Hakuna matata"; "Hasta la vista, baby"; "Here's looking at you, kid"; or the like) through the dynamic RAG process or the CAG preloading of information. For example, the co-watch bot may follow this indication to insert the popular phrases into the inferences. Prosodic characteristics include at least one of intonation, stress, rhythm, tempo, pauses, loudness, voice quality, pitch range, speech rate, articulation, combinations of the same, or the like. Intonation refers to the variation of pitch in speech. For example, a rising intonation at the end of a sentence can indicate a question, while falling intonation often signals the end of a statement. Stress is the emphasis placed on certain syllables or words. For example, stressing the first syllable in "record" makes the term "record" a noun, while stressing the second syllable makes the term "record" a verb. Emphasizing different words in "I didn't say she stole the money" can change the meaning entirely. Rhythm is the pattern of sounds and silences in speech. For example, a rhythmic pattern can make a speech more engaging and easier to follow, and poetry often relies on rhythm to create a musical quality. Tempo is the speed at which someone speaks. For example, speaking quickly can convey excitement or urgency, while a slower tempo can indicate thoughtfulness or seriousness. Pauses are breaks in speech that can indicate hesitation, thoughtfulness, or emphasis. For example, a pause before an identified plot point can create suspense, and pauses can give the listener time to absorb information. Loudness refers to the overall volume level of speech. For example, speaking loudly can show enthusiasm or anger, while a softer volume can convey intimacy or sadness. Voice quality describes the characteristics of a person's voice, such as breathiness, nasality, or hoarseness. For example, a breathy voice can sound soft and gentle, while a nasal voice can be perceived as whiny or annoying. Pitch range is the span between the highest and lowest pitches used in speech. For example, a wide pitch range can make speech more dynamic and expressive, while a narrow pitch range might make speech sound monotonous. Speech rate is the number of words spoken per minute. For example, some listeners may have difficulty keeping up with a conversation having a relatively fast speech rate, while clarity and comprehension may be enhanced when the conversation has a relatively slow speech rate. Articulation is the clarity and precision of speech sounds. For example, clear articulation helps ensure that speech is understood, while poor articulation can lead to misunderstandings.

In some embodiments, at 610, control circuitry causes the co-watch bot to output the model inference. The system may output the model inference according to the user input detected in step 604 (e.g., audio, visual, and/or text) using output devices such as audio output equipment 914 of FIG. 9, display 912 of FIG. 9, user input interface 910 of FIG. 9, or the like. In some embodiments, these output devices may be integrated into a remote, paired with the media playing device (e.g., in-ear/over-ear audio devices), or through a companion application running on a separate device (e.g., user equipment devices 1006, 1007, 1008, or 1010 of FIG. 10).

In some embodiments, the system may use an algorithm to measure the response time of the user after a generated inference is output by the co-watch bot. For example, normal human-to-human conversation latency is approximately 300 msec in terms of fluency. However, recognizing that not every person speaks at the same fluency rate (e.g., some people are very fast talkers/thinkers versus others who take more time), the media content model may collect this response time data and establish a pattern or average response time for each user in terms of the user' latency and/or pace of participating in the discourse (e.g., via user device). For example, the system may save this as a parameter in the user profile (e.g., 320 of FIG. 3) for input across media content models. For example, the co-watch bot inference generation output speed and/or the speed at which each word of the inference output is delivered may be adjusted according to this parameter.

In some embodiments, at 612, control circuitry detects if a user engages in the conversation. For example, the system may use an encoder to tokenize the user engagement for input into the model to determine if the user engagement requires further model inference. For example, if the system detects that the user responded to the model inference, the system may proceed to step 614 and may, simultaneously or sequentially, proceed to D of process 670 of FIG. 6D. In another example, the system may not detect a user input for a threshold amount of time (e.g., one second) and determine that the user is disengaged ("No" at 612). In this example, the system may proceed to step 618.

In some embodiments, the system may receive a user discourse requesting or referring to a portion (e.g., particular frame, scene, section, or the like) of the media content. For example, the co-watch bot may tokenize the user discourse or engagement and determine that the user has requested or referred to a portion of the media content. For example, the co-watch bot may have received a request to display a portion of the media content that corresponds with a determination of user enjoyment, clarification desired, missed information, desire to share, or the like. In some embodiments, the co-watch bot may search the token embedding metadata of the media content (e.g., a frame identifier, a timestamp, complexity of the content area of the token embeddings, actors, characters, objects, locations, soundtracks, media dialogue, or the like) against the tokenized user discourse or engagement for a timeframe of the portion of the media content corresponding to the reference or request. Upon determining a match, the co-watch bot may perform an inference and retrieve the corresponding portion of the media content. In some embodiments, the co-watch bot generates for output the inference and the portion of the media content. In some embodiments, the co-watch bot generates for output the inference incorporating the metadata matching the request. For example, when output, the co-watch bot inference may provide to the user the frame, timestamp, scene, or other metadata references applicable to support the inference validity.

In some embodiments, the system may receive user feedback and/or determine, based on user interaction, success of inferences generated from user-initiated conversations and may create one or more global metadata tags that the system may use to fine-tune or retrain (e.g., per process 700 of FIG. 7) across all co-watch bot models. In some embodiments, the system may collect feedback passively and compare against success parameters. For example, the system may detect the speed at which a user is engaged in the conversation, the specific language the user is using, or the length of the conversation. For example, the system may determine that a longer conversation is an indication that the user has been enjoying the current conversation. For example, the system may determine that an abrupt conclusion of discourse (e.g., silence or conversation-ending commands such as "End chat," "Close," "Not now," "Shhh," "Quiet," or the like) is an indication that the most recent inference output by the co-watch bot has not been received well by the user. For example, success parameters may include threshold criteria for at least one of: confidence score of an inference (e.g., higher confidence score indicates better performance), level of engagement with the co-watch bot (e.g., higher level of engagement in terms of duration of a dialog or number of interaction indicates better performance), frequency of error handling (e.g., lower frequency indicates better performance), frequency of real time RAG retrieval success (e.g., higher frequency indicates better performance), frequency of CAG data usage success (e.g., higher frequency indicates better performance), latency of user interaction (e.g., low latency indicates better performance), frequency of user abruptly ending a discourse (e.g., lower frequency indicates better performance), or the like.

In some embodiments, at 614, control circuitry records a user interaction timestamp. Step 614 generally corresponds with step 606.

In some embodiments, at 616, control circuitry determines whether the received user input from step 612 requires further inference. Examples in which the system may determine no further inference is required include the system receiving natural conversation-ending phrases or shortened replies (e.g., "Thank you," "That's all," "Okay," "Interesting," or the like), the system receiving conversation-ending commands (e.g., "End chat," "Close," "Not now," "Shhh," "Quiet," or the like), or the system receiving a response that reaches a logical conclusion (e.g., agreement, disagreement, rhetorical statement, emotional expression, reaction, nostalgic or personal references, general commentary, any indication of a person thinking out loud, or the like). The system may also use available sensor inputs (e.g., camera, biometric sensors, or the like) to detect user body language and/or facial expressions and respective changes to user body language and/or facial expressions, particularly during inference output and user response, to determine a level of engagement, disengagement, and/or satisfaction with the inference output. Examples in which the system may determine further inference is required include the system receiving and determining questions or statements seeking clarification, confirmation, opinion, validation, or prediction. For example, the system may determine no further inference is required and proceed to step 618. For example, the system may determine further inference is required and revert to step 608.

In some embodiments, at 618, control circuitry determines if more content is available. For example, the system may determine there is additional content to be played and revert to A of process 600. For example, the system may determine there is no additional content to be played and end the co-watch session.

FIG. 6B depicts a flowchart of a process 630 of the co-watch bot when the model performs an inference during a low complexity area of content, in accordance with some embodiments of this disclosure.

In some embodiments, at B of process 630, control circuitry (e.g., 904 of FIGS. 9, and 1011 of FIG. 10) is playing the content, has not detected user discourse to initiate the conversation and proceeds to step 632. For example, the system determines the best timepoints to generate inferences in advance to reduce latency.

In some embodiments, at 632, control circuitry detects a low complexity area of content approaching in the media content. In some embodiments, step 632 is continuously occurring to determine the timestamp for inference generation. For example, the system may determine areas of low and high complexity during training of the co-watch bot model. The system may encode these timepoints to determine the best windows to output a model inference (e.g., timepoints that do not disrupt the user's enjoyment of the media content). For example, the encoding configures the system to analyze peaks, valleys, and respective durations of the peaks and valleys to determine an adequate window for conversation. For example, the system may determine a valley, or low complexity region of media content, which has a sustained low complexity for a threshold of time (e.g., 30 seconds or more) for generating and outputting an inference. For example, the co-watch bot may generate the inference based on the sliding context window up to the low complexity timestamp. For example, the system may locally cache (e.g., storage circuitry 908 of FIG. 9, storage circuitry 1014 of FIG. 10, or any other suitable storage) or timely transmit the co-watch bot inference output for playback at the determined timestamp. For example, the system may determine an adequate area of low complexity media content is approaching and proceed to step 634. For example, the system may determine there is no adequate area of low complexity media content approaching and revert to A of process 600 of FIG. 6A.

In some embodiments, at 632, control circuitry may, alternatively or additionally, detect areas of content where a user is most likely to initiate conversation based on co-watch metadata. For example, the system may analyze the stored (e.g., co-watch bot conversation histories 326 and 346 of FIG. 3) user interaction timestamps recorded (e.g., in steps 606 and 614 of FIG. 6A, 640 of FIG. 6B, 660 of FIG. 6C, and 682 of FIG. 6D) across all viewings of a media content (e.g., user profile 1 320 through user profile N 340 of FIG. 3) to determine one or more favorable timepoints to generate and output an inference. In another example, the system may analyze the co-watch bot conversation history of a particular user profile to determine conversational behaviors of the particular user to determine one or more favorable timepoints to initiate and output an inference. In some embodiments, the inference is based on the sliding context window. In some embodiments, the inference is retrieved, generated, and/or adjusted based on the system-marked successful inferences of the user interaction timestamps used to select the inference output timing. For example, the system may locally cache (e.g., in storage circuitry 908 of FIG. 9, storage circuitry 1014 of FIG. 10, or any other suitable storage) or timely transmit the co-watch bot inference output for playback at the determined timestamp. For example, the system may determine a favorable timepoint in the playing media to initiate and output an inference and proceed to step 634. For example, the system may determine there is not a favorable timepoint in the playing media to initiate and output an inference and revert to A of process 600 of FIG. 6A.

In some embodiments, at 634, control circuitry causes the co-watch bot to perform a model inference. Step 634 generally corresponds with step 608 of FIG. 6A.

In some embodiments, at 636, control circuitry causes the co-watch bot to output the model inference. Step 636 generally corresponds with step 610 of FIG. 6A. In some embodiments, the system may receive user feedback and/or determine, based on user interaction, success of inferences generated for low complexity areas of content and may create one or more global metadata tags that the system may use to fine-tune or retrain (e.g., per process 700 of FIG. 7) across all co-watch bot models. In some embodiments, the system may receive user feedback and/or determine, based on user interaction, success of inferences generated for timepoints to initiate conversation based on co-watch metadata and may create one or more global metadata tags that the system may use to fine-tune or retrain (e.g., per process 700 of FIG. 7) across all co-watch bot models.

In some embodiments, at 638, control circuitry detects if a user engages in the conversation. Step 638 generally corresponds with step 612 of FIG. 6A.

In some embodiments, at 640, control circuitry records a user interaction timestamp. Step 640 generally corresponds with step 606 FIG. 6A.

In some embodiments, at 642, control circuitry determines whether the received user input from step 638 requires further inference. Step 642 generally corresponds with step 616 FIG. 6A.

In some embodiments, at 644, control circuitry determines if more content is available. Step 644 generally corresponds with step 618 FIG. 6A.

FIG. 6C depicts a flowchart of a process 650 of the co-watch bot when the model performs an inference based on a biometric response, in accordance with some embodiments of this disclosure.

In some embodiments, at 652, control circuitry (e.g., 904 of FIGS. 9, and 1011 of FIG. 10) is playing the media content and may determine if the user has had a biometric response while watching the media content. For example, the system may collect and store data recorded by available sensor devices (e.g., cameras, biometric sensors, or the like) that measure user behavior and/or reactions throughout the media play, or during/surrounding a co-watch bot conversation. The system may encode and store biometric/behavioral data as part of the user's co-watch bot conversation history (e.g., 326 of FIG. 3). For example, the system may analyze sensor data to detect an increase in heart rate, change in posture, perspiration, change of facial expression, movement of eye gaze toward the location of the co-watch bot representative UI or other direction of interest, a change in a shape of a pupil (e.g., pupil dilation), audible gasping or expressions, increased body temperature, hand gestures and/or the user falling asleep or being unconscious. In some embodiments, if the biometric response is the user falling asleep, the co-watch bot may save the progress point and co-watch session in the user profile (e.g., 320 of FIG. 3) and end the media content play. In some embodiments, the system may determine, using user-specific collected data, a distribution range for the user's normal (non-conversational) behavior and/or reactions. For example, the system may determine a sensor measurement beyond the distribution range is indicative of a biometric response while watching the media content. In some embodiments, the system may compound utilizing biometric responses determined at step 652 and a determined window of low complexity media content of step 632 of FIG. 6B to output a model inference based on the biometric response at a timestamp based on a determined window of low complexity media content, thus metering the output based on the biometric response such that the system does not disturb the viewing experience of the user. For example, the system may locally cache (e.g., storage circuitry 908 of FIG. 9, storage circuitry 1014 of FIG. 10, or any other suitable storage) or timely transmit the co-watch bot inference output for playback at the determined timestamp. In some embodiments, the system may determine a sensor measurement beyond the distribution range and proceed to step 654. In some embodiments, the system may not determine sensor measurement beyond the distribution range and revert to A of process 600 of FIG. 6A.

In some embodiments, at 654, control circuitry causes the co-watch bot to perform a model inference. Step 654 generally corresponds with step 608 of FIG. 6A.

In some embodiments, at 656, control circuitry causes the co-watch bot to output the model inference. Step 656 generally corresponds with step 610 of FIG. 6A. In some embodiments, the system may receive user feedback and/or determine, based on user interaction, success of inferences generated based on biometric responses and may create one or more global metadata tags that the system may use to fine-tune or retrain (e.g., per process 700 of FIG. 7) across all co-watch bot models.

In some embodiments, at 658, control circuitry detects if a user engages in the conversation. Step 658 generally corresponds with step 612 of FIG. 6A.

In some embodiments, at 660, control circuitry records a user interaction timestamp. Step 660 generally corresponds with step 606 FIG. 6A.

In some embodiments, at 662, control circuitry determines whether the received user input from step 658 requires further inference. Step 662 generally corresponds with step 616 FIG. 6A.

In some embodiments, at 664, control circuitry determines if more content is available. Step 664 generally corresponds with step 618 FIG. 6A.

FIG. 6D depicts a flowchart of a process 670 of the co-watch bot when the model performs an inference based on previous user input, in accordance with some embodiments of this disclosure.

In some embodiments, at D of process 670, control circuitry (e.g., 904 of FIGS. 9, and 1011 of FIG. 10) has detected a user engaging in a conversation with the co-watch bot at step 612 of FIG. 6A and proceeds to step 672 to configure the system to determine the best timepoints to generate inferences in advance to reduce latency.

In some embodiments, at 672, control circuitry searches a plurality of token embeddings for embeddings relevant to the user input discourse (e.g., of 604 of FIG. 6A and/or 612 of FIG. 6A). For example, the plurality of token embeddings may be "forward" token embeddings, meaning token embeddings with a future timestamp in the media content with respect to the current timepoint of the media content play. Also, for example, the system may analyze the user input discourse by encoding the words of the user input discourse and comparing the encoding to the latent token embeddings (e.g., representing character, actor, object, location, or the like) of the media content remaining. For example, the system may search for token embeddings related to a video frame, object, person, character, face, sound, or location to determine probable timings of future discourse opportunities, thus reducing the latency or increasing the discourse window duration for inferencing step 676 to occur.

In some embodiments, at 674, control circuitry determines whether one or more matches of the encoded user discourse input and latent token embeddings have been identified. For example, the system may mark matching latent token embeddings as relevant and store these with the user's co-watch bot conversation history (e.g., 326 of FIG. 3). For example, the system may use the matching latent token embedding to determine the timestamp for inference generation. The system may locally cache (e.g., in storage circuitry 908 of FIG. 9, storage circuitry 1014 of FIG. 10, or any other suitable storage) or timely transmit the co-watch bot inference output for playback at the determined timestamp. In some embodiments, the system determines that one or more matches of the encoded user discourse input and a latent token embedding has been identified and the system may proceed to step 676. In some embodiments, the system determines that there is no match of the encoded user discourse input and a latent token embedding and the system may proceed to A of process 600 of FIG. 6A.

In some embodiments, at 676, control circuitry causes the co-watch bot to perform a model inference. Step 676 generally corresponds with step 608 of FIG. 6A.

In some embodiments, at 678, control circuitry causes the co-watch bot to output the model inference. Step 678 generally corresponds with step 610 of FIG. 6A. In some embodiments, the system may receive user feedback and/or determine, based on user interaction, success of inferences generated from searching (e.g., forward) token embeddings and may create one or more global metadata tags that the system may use to fine-tune or retrain (e.g., per process 700 of FIG. 7) across all co-watch bot models.

In some embodiments, at 680, control circuitry detects if a user engages in the conversation. Step 680 generally corresponds with step 612 of FIG. 6A.

In some embodiments, at 682, control circuitry records a user interaction timestamp. Step 682 generally corresponds with step 606 FIG. 6A.

In some embodiments, at 684, control circuitry determines whether the received user input from step 680 requires further inference. Step 684 generally corresponds with step 616 FIG. 6A.

In some embodiments, at 686, control circuitry determines if more content is available. Step 686 generally corresponds with step 618 FIG. 6A.

Figure 7:
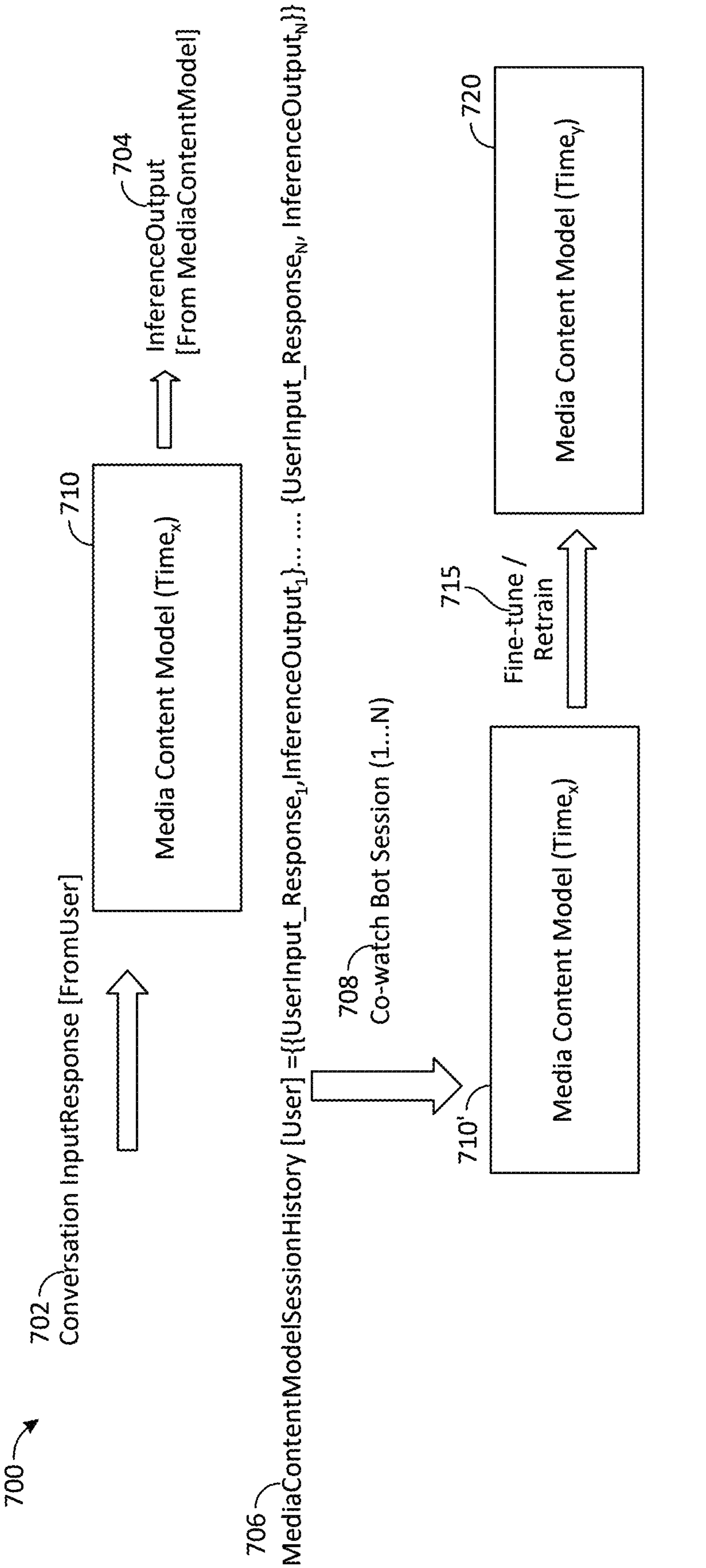
FIG. 7 depicts a schematic illustration of fine-tuning or retraining model for co-watching media content, in accordance with some embodiments of the disclosure.

FIG. 7 depicts a schematic illustration of fine-tuning or retraining model 700 for co-watching media content, in accordance with some embodiments of this disclosure.

In some embodiments, the co-watch bot improves inferencing based on co-watch bot conversation history. In an embodiment, the media content model 710 of the co-watch bot may store a history of the discourse (e.g., conversation input response 702 and inference output 704) that has already happened during a viewing session to improve an inference as more token embedding become available through media play. For example, the co-watch bot may output a first inference during a co-watch session based on a specific context window. As the context window expands throughout media content play, the co-watch bot media content model may determine opportunities (e.g., conversation windows) to present an improved inference result based on additional tokens, relevant to the past inference, that have become available in the adjusted context window.

In some embodiments, the system may store and utilize session history data of many users to fine-tune or retrain a co-watch bot model by enhancing the token embeddings. For example, the co-watch bot at an initial time (e.g., media content model (timex) 710') may be fine-tuned or retrained using media content model session history 706. The media content model session history 706 may include user and co-watch bot discourse entries and any feedback or success parameters that may be used as conversational context. For example, the co-watch bot may store these contexts at a URL and may preserve inference results in terms of the path that the neural network had traversed. For example, success parameters may include threshold criteria for at least one of: confidence score of an inference (e.g., higher confidence score indicates better performance), level of engagement with the co-watch bot (e.g., higher level of engagement in terms of duration of a dialog or number of interaction indicates better performance), frequency of error handling (e.g., lower frequency indicates better performance), frequency of real time RAG retrieval success (e.g., higher frequency indicates better performance), frequency of CAG data usage success (e.g., higher frequency indicates better performance), latency of user interaction (e.g., low latency indicates better performance), frequency of user abruptly ending a discourse (e.g., lower frequency indicates better performance), or the like. In some embodiments, the co-watch bot at a subsequent time (e.g., media content model (timey) 720) may generate a richer subsequent experience for a user re-watching the media content. In some embodiments, the retraining or fine-tuning process may adjust the weights of the corresponding token embeddings for sections of the media content where heavy discourse between the co-watch bot and user occurred.

In some embodiments, the fine-tuning or retraining process 700 may occur periodically based on the media content and performance of the co-watch bot. For example, the system may implement the fine-tuning or retraining process for media content items that are popular and that have a rich co-watch bot history. For example, the system may allocate more computational resources for fine-tuning or retraining a co-watch bot based on the popularity of corresponding media content increasing (e.g., based on view count). For example, the system may reduce computational resources for fine-tuning or retraining a co-watch bot based on the popularity of corresponding media content decreasing.

In some embodiments, the co-watch bot may improve generated inferences iteratively by adjusting gradient descent parameters based on user feedback and/or success parameters. For example, the co-watch bot may adjust gradient descent parameters to minimize the difference between predicted outputs and desired outcomes (e.g., a user's intended conversation context) by moving in the direction of the "steepest descent" on a loss function, thus leading to more accurate and relevant conversational interactions.

In some embodiments, the co-watch bot may collect and/or solicit feedback (e.g., thumbs up/down) of how the media content model responses are being received by the user. For example, the co-watch bot is configured for human-guided reinforcement learning feedback. In some embodiments, the co-watch bot may determine that an abrupt conclusion of discourse (e.g., silence or conversation ending commands such as "End chat," "Close," "Not now," "Shhh," "Quiet," or the like) is an indication that the most recent inference output by the co-watch bot has either not been received well by the user or has been output at a non-preferred moment. For example, specific commands may be received to determine whether the inference was bad or mistimed. In some embodiments, the co-watch bot may provide a prompt (e.g., visually, verbally, or both) to solicit user feedback about an inference or the overall performance of the co-watch bot. For example, the co-watch bot may receive a "Thumbs up," "Thumbs down," "Neutral," or open-ended response via the prompt. In another embodiment, the co-watch bot may passively determine success of inferences based on user reaction to an inference. For example, the co-watch bot may detect the speed at which a user is engaged in the conversation, the specific language the user is using, or the length of the conversation. For example, the system may determine that a longer conversation is an indication that the user has been enjoying the current conversation. In another embodiment, the co-watch bot may utilize sensor data (e.g., from camera, biometric sensors, or the like) to determine success of inferences based on user reaction to an inference. For example, the co-watch bot may determine a level of engagement, disengagement, and/or satisfaction with the inference output by analyzing sensor data to detect a change in heart rate, a change in posture or body language, perspiration, a change in facial expression, movement of eye gaze toward the location of the co-watch bot representative UI or other direction of interest, pupil dilation, audible gasping or expressions, an increased body temperature, hand gestures and/or the user falling asleep or being unconscious. In some embodiments, the co-watch bot may use the received feedback to customize subsequent inferences for the user during that session. In some embodiments, the system may store the received feedback (e.g., as media content model session history 706) across multiple co-watch bot sessions 708 and create one or more global metadata tags that the system may use to fine-tune or retrain 715 across one or all co-watch bot models.

Figure 8:
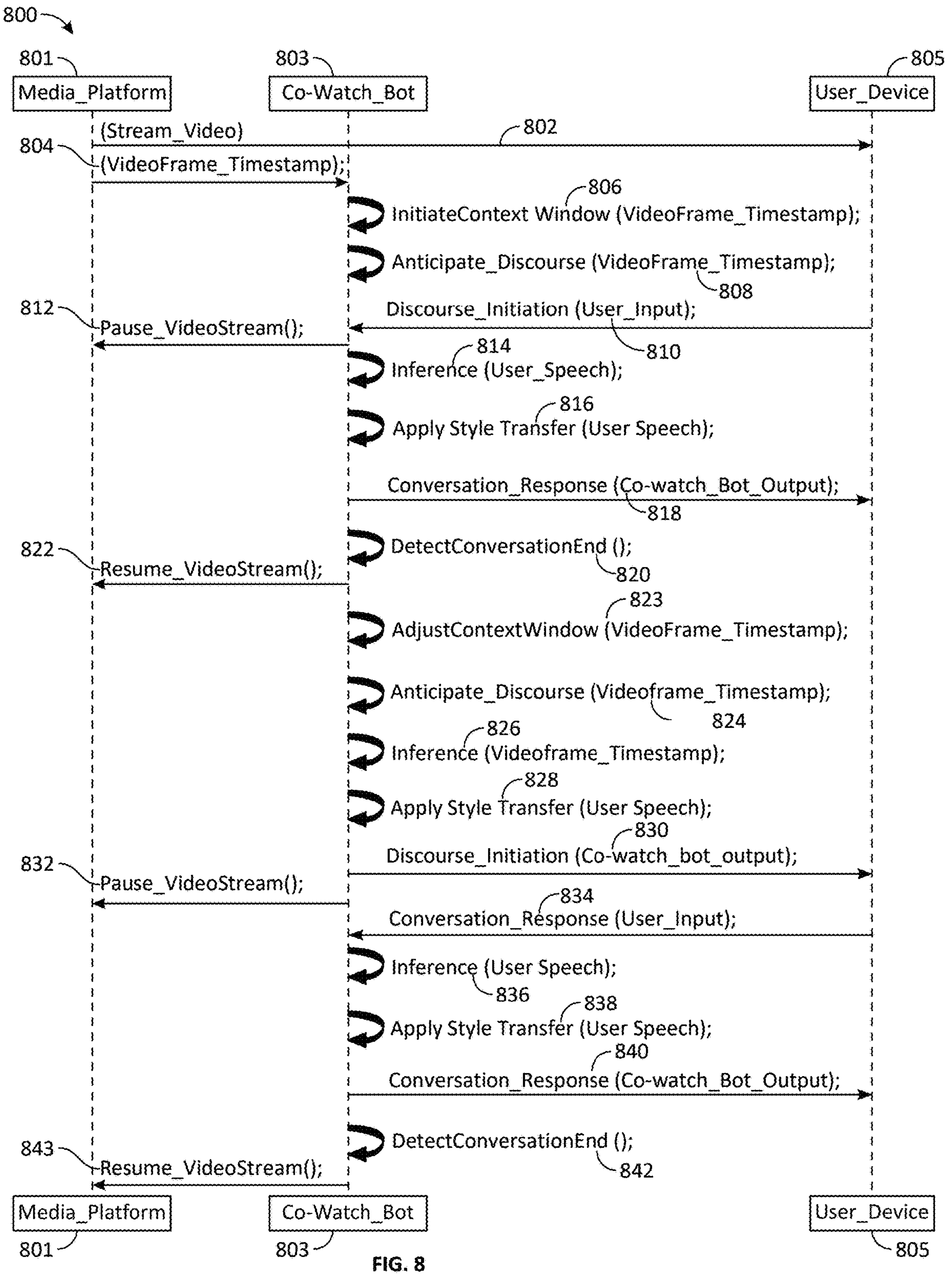
FIG. 8 depicts a sequence diagram for co-watch bot operation, in accordance with some embodiments of the disclosure.

FIG. 8 depicts a sequence diagram for co-watch bot operation, in accordance with some embodiments of this disclosure. In some embodiments, the co-watch bot 803 is integrated with a media platform 801. In another embodiment, the co-watch bot 803 may be offered as a third-party service. In various embodiments, steps of process 800 correspond with steps of processes 600, 630, 650 and 670. For example, step 810 may generally correspond with 604 of FIG. 6A. Accordingly, upon identical or substantially similar steps, correspondence is indicated (details of identical or substantially similar steps are omitted for brevity).

In some embodiments, process 800 shows the operation details of the co-watch bot 803, the media platform 801, and the user device 805 during a co-watching session. In some embodiments, at 802, control circuitry (e.g., 904 of FIGS. 9, and 1011 of FIG. 10) running the media application plays or streams the user-selected content. As the media content is streamed, media platform 801 provides, at 804, the co-watch bot with the media content timestamp, frame number, other any other suitable progress point information.

In some embodiments, at 806, the co-watch bot 803 initiates a sliding context window. For example, the sliding context window is the range of token embeddings made available for the co-watch bot to make an inference. The range of the sliding context window is based on the play position of the media content. In some embodiments, the co-watch bot may implement a sliding context window to limit access to token embeddings based on the progress of the media content, thus making inferences based on only the portion of the media content played. The context window serves as the "memory" of the co-watch bot. For example, by utilizing the context window, the co-watch bot may emulate a human co-watcher and prevent inferences from spoiling the movie. For example, the co-watch bot implements the sliding context window for inference generation based on the media content play position provided in step 804 as play occurs. For example, at the beginning of the media play, the context window for the co-watch bot comprises only the frames that were rendered on the user device. As the media content progresses, the context window expands from the start of the media content (referred to as "title" below for brevity) to the latest player position provided by the media platform 801:

$$\text{ContextWindow}=[\text{TitleStart}-\text{TitleLastPlayedPosition}]$$

In some embodiments, the co-watch bot may adjust the context window or implement a secondary context window based on the media platform receiving play commands (e.g., fast-forward, rewind, or the like). For example, when a rewind command is received that places the media content play position behind the last known player position, the co-watch bot may assign a focus window:

FocusContextWindow=[TitleRewindPosition−Title-LastPlayedPosition]

For example, when a fast-forward command is received, the co-watch bot may maintain the context window from the start of the media content to the last played position to prevent the co-watch bot from generating an inference based on media content that the user has not watched. The co-watch bot may, however, adjust the context window from the start of the media content to the fast-forward play position if the user watch history (e.g., 322 of FIG. 3) indicates that the user has previously watched the content of the section that was skipped.

In some embodiments, at 808, the co-watch bot may use attention layers in addition to the context window to anticipate discourse with the user. For example, anticipating discourse with the user may include determining an initiation point at which to output an inference. In some embodiments, the co-watch bot may improve latency of an inference by reducing the "time to first token." For example, the co-watch bot may use default fast-forward/rewind ranges (e.g., 15-30 seconds) as an attention layer or window to generate an inference. In some embodiments, the co-watch bot may gradually expand the attention layer to reduce "time between tokens" prior to utilizing the full context window. In some embodiments, the co-watch bot may implement multiple parallel attention layers to reduce inferencing latency.

In some embodiments, at 808, the co-watch bot may have several algorithms for anticipating discourse with the user. In some embodiments, the co-watch bot discourse may be anticipated by the co-watch bot detecting a low complexity area of content approaching in the media content (e.g., process 630 of FIG. 6B). In some embodiments, the co-watch bot discourse may be anticipated by the co-watch bot detecting areas of content where a user is mostly probable to initiate conversation based on co-watch metadata. In some embodiments, the co-watch bot discourse may be anticipated by the co-watch bot detecting a biometric response while watching the media content (e.g., process 650 of FIG. 6C). In some embodiments, the co-watch bot discourse may be anticipated by the co-watch bot based on previous user discourse (e.g., process 670 of FIG. 6D).

In some embodiments, at 810, the co-watch bot 803 may receive a user discourse initiation (e.g., speaking, typing/texting, gestures, or the like). For example, the co-watch bot may detect a user discourse initiation via the process described for step 604 of FIG. 6A. In some embodiments, the co-watch bot may record a user interaction timestamp base on receiving the user discourse initiation.

In some embodiments, at 812, the co-watch bot may send a command to the media platform 801 to pause the media content play during the discourse between the co-watch bot and the user.

In some embodiments, at 814, the co-watch bot 803 may generate an inference. For example, the co-watch bot may generate an inference via the process described for step 608 of FIG. 6A.

In some embodiments, at 816, the co-watch bot may apply a style transfer to the generated inference. In some embodiments, the system may apply one or more personalization layers to style the inference prior to output. For example, the system may input the selected co-watch bot personality data into the co-watch bot to style the inference in a manner that represents the selected co-watch bot (e.g., 512 of FIG. 5). For example, the system may input data from the user co-watch bot conversation history (e.g., 326 of FIG. 3) to update the inference based on the system determining user-preferred words or jargon. For example, the system may input personalization layers as additional prompts for the model to make an inference.

In some embodiments, at 818, the co-watch bot may output the inference (e.g., conversation response). For example, the co-watch bot may output an inference via the process described for step 610 of FIG. 6A.

In some embodiments, at 820, the co-watch bot may detect a conversation end. For example, the co-watch bot may detect a conversation end via the process described for step 612 of FIG. 6A.

In some embodiments, at 822, the co-watch bot may send a command to the media platform 801 to resume the media content play after the discourse between the co-watch bot and the user is determined to be ended.

In some embodiments, at 823, the co-watch bot may adjust the context window. For example, as the media content is streamed, media platform 801 provides the co-watch bot with the media content timestamp, frame number, or any other suitable progress point information, and the co-watch bot may adjust the context window to access additional token embeddings for inference generation.

In some embodiments, at 824, the co-watch bot may anticipate discourse with the user. For example, anticipating discourse with the user may include determining an initiation point at which to output an inference. Step 824 generally corresponds with step 808.

In some embodiments, at 826, the co-watch bot may generate an inference. Step 826 generally corresponds with step 814 with the distinction that the inference is generated without a user input being received. For example, the inference may be generated based on determining low complexity areas of content, determining likely timings of conversation based on user historical behavior, detecting a biometric response, and/or searching for corresponding token embeddings with a future timestamp in the media content based on current session interactions.

In some embodiments, at 828, the co-watch bot may apply a style transfer to the generated inference. Step 828 generally corresponds with step 816.

In some embodiments, at 830, the co-watch bot may initiate a discourse with the user. For example, the co-watch bot may output an inference via the process described for step 636 of FIG. 6B.

In some embodiments, at 832, the co-watch bot may send a command to the media platform 801 to pause the media content play during the discourse between the co-watch bot and the user.

In some embodiments, at 834, the co-watch bot may detect a conversation response from the user (e.g., speaking, typing/texting, gestures, or the like). For example, the co-watch bot may detect a conversation response from the user via the process described for step 612 of FIG. 6A.

In some embodiments, at 836, upon determining the conversation response requires further inferencing, the co-watch bot may generate an inference. Step 836 generally corresponds with step 814.

In some embodiments, at 838, the co-watch bot may apply a style transfer to the generated inference. Step 838 generally corresponds with step 816.

In some embodiments, at 840, the co-watch bot may output the conversation response (e.g., inference). Step 840 generally corresponds with step 818.

In some embodiments, at 842, the co-watch bot may detect a conversation end. Step 842 generally corresponds with step 820.

In some embodiments, at 843, the co-watch bot may send a command to the media platform 801 to resume the media content play after the discourse between the co-watch bot and the user is determined to be ended.

In some embodiments, the system may make the co-watch bot available offline. For example, primary operation of the base co-watch bot model would occur via communication between the player and the cloud backend storing the media content. In some embodiments, the system may provide for download with the media content a compressed, distilled, and quantized co-watch bot model that can run without network connectivity. For example, this compressed co-watch bot model may operate without the cloud system communication. For example, the downloaded co-watch bot model may be ideal where conversation windows are relatively shorter (e.g., consumed in a public environment limiting conversation). In some embodiments, during compression, the system may prioritize one-way commentary that the co-watch bot may output to maximize the accurate and timely inference from the model. In some embodiments, the compressed model may be updated for future downloads based on storing co-watch bot conversation history and inference failures (e.g., from feedback or detection) locally and, upon restoration of cloud connectivity, transmitting the stored data to the main model for re-training both the main and compressed models.

FIGS. 9-10 describe illustrative devices, systems, servers, and related hardware for training and implementing a model for co-watching media content, in accordance with some embodiments of the present disclosure. FIG. 9 shows generalized embodiments of illustrative user equipment 900 and 901, which may correspond to, e.g., user equipment 140 of FIG. 1 and/or user equipment 400 of FIG. 4. For example, user equipment 900 may be a smartphone device, a tablet, a computer, a near-eye display device, an extended reality (XR) device, or any other suitable device capable of viewing and/or editing media, e.g., locally or over a communication network. In another example, user equipment 901 may be a user television equipment system, a projector, or device. User equipment 901 may include set-top box 915. Set-top box 915 may be communicatively connected to microphone 916, audio output equipment 914 (e.g., speaker or headphones), and display 912. In some embodiments, microphone 916 may receive audio corresponding to a voice of a user and/or ambient audio data. In some embodiments, display 912 may be a television display, a computer display, a smartphone display, or any display and or projection of the aforementioned user equipment. In some embodiments, set-top box 915 may be communicatively connected to user input interface 910. In some embodiments, user input interface 910 may be a remote-control device, sensors that detect user commands (e.g., voice, gestures, or the like), or a touchscreen display. Set-top box 915 may include one or more circuit boards. In some embodiments, the circuit boards may include control circuitry, processing circuitry, and storage (e.g., RAM, ROM, hard disk, removable disk, or the like). In some embodiments, the circuit boards may include an input/output path (e.g., I/O path 902). More specific implementations of user equipment are discussed below in connection with FIG. 10. In some embodiments, user equipment 900 may comprise any suitable number of sensors (e.g., gyroscope or gyrometer, accelerometer, or camera, or the like), and/or a global positioning unit (GPS) module (e.g., in communication with one or more servers and/or cell towers and/or satellites) to ascertain a location of user equipment 900. In some embodiments, user equipment 900 comprises a rechargeable battery that is configured to provide power to the components of the device.

Each one of user equipment 900 and user equipment 901 may receive content and data via input/output (I/O) path 902. I/O path 902 may provide content (e.g., broadcast programming, on-demand programming, internet content, media platform content, downloadable content, content available over a local area network (LAN) or wide area network (WAN), and/or other content) and data to control circuitry 904, which may comprise processing circuitry 906 and storage circuitry 908. Control circuitry 904 may be used to send and receive commands, requests, and other suitable data using I/O path 902, which may comprise I/O circuitry. I/O path 902 may connect control circuitry 904 to one or more communications paths (described below). I/O functions may be provided by one or more of these communications paths but are shown as a single path in FIG. 9 to avoid overcomplicating the drawing. While set-top box 915 is shown in FIG. 9 for illustration, any suitable computing device having processing circuitry, control circuitry, and storage may be used in accordance with the present disclosure. For example, set-top box 915 may be replaced by, or complemented by, a personal computer (e.g., a notebook, a laptop, a desktop, user equipment 140 of FIG. 1, user equipment 1007 of FIG. 10), a smartphone (e.g., user equipment 900, and user equipment 1008 of FIG. 10), a television (e.g., user equipment 440 of FIG. 4, user equipment 1010 of FIG. 10), an XR device (e.g., user equipment 1006 of FIG. 10), a tablet, a network-based server hosting a user-accessible client device, a non-user-owned device, any other suitable device, or any combination thereof.

Control circuitry 904 may be based on any suitable control circuitry such as processing circuitry 906. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), or the like, and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i7 processor and an Intel Core i9 processor). In some embodiments, control circuitry 904 executes instructions for the media application (as described in connection with FIGS. 1-8) stored in memory (e.g., storage circuitry 908). Specifically, control circuitry 904 may be instructed by the media application to perform the functions discussed above and below. In some implementations, processing or actions performed by control circuitry 904 may be based on instructions received from the media application.

In client/server-based embodiments, control circuitry 904 may include communications circuitry suitable for communicating with a server or other networks or servers. The media application may be a stand-alone application implemented on a device or a server. The media application may be implemented as software or a set of executable instructions. The instructions for performing any of the embodiments discussed herein of the media application may be encoded on non-transitory computer-readable media (e.g., a hard drive, random-access memory on a DRAM integrated circuit, read-only memory on a BLU-RAY disk, or the like). For example, in FIG. 9, the instructions may be stored in storage circuitry 908, and executed by control circuitry 904 of a user equipment 900.

In some embodiments, the media application may be a client/server application where only the client application resides on user equipment 900, and a server application resides on an external server (e.g., server 1004 of FIG. 10 and/or media content source 1002 of FIG. 10). For example, the media application may be implemented partially as a client application on control circuitry 904 of user equipment 900 and partially on server 1004 as a server application running on control circuitry 1011. Server 1004 may be a part of a local area network with one or more of user equipment 900, or may be part of a cloud computing environment accessed via the internet. In a cloud computing environment, various types of computing services for performing searches on the internet or informational databases, providing video communication capabilities, providing storage (e.g., for a database) or parsing data are provided by a collection of network-accessible computing and storage resources (e.g., server 1004 and/or an edge computing device), referred to as "the cloud." User equipment 900 may be a cloud client that relies on the cloud computing capabilities from server 1004 to generate action and posed embeddings. The client application may instruct control circuitry 904 to generate video adjustments for better movement matching.

Control circuitry 904 may include communications circuitry suitable for communicating with a server, edge computing systems and devices, a table or database server, or other networks or servers. The instructions for carrying out the above mentioned functionality may be stored on a server (which is described in more detail in connection with FIG. 10). Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the internet or any other suitable communication networks or paths (which is described in more detail in connection with FIG. 10). In addition, communications circuitry may include circuitry configured for peer-to-peer communication of user equipment, or communication of user equipment in locations remote from each other (described in more detail below).

Memory may be an electronic storage device provided as storage circuitry 908 that is part of control circuitry 904. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Storage circuitry 908 may be used to store various types of content described herein as well as media application data described above. Nonvolatile memory may also be used (e.g., to launch a boot-up routine and other instructions). Cloud-based storage, described in relation to FIG. 9, may be used to supplement storage circuitry 908 or instead of storage circuitry 908. Non-transitory memory may store instructions that, when executed by control circuitry, I/O circuitry, any other suitable circuitry or combination thereof, executes functions of a media application as described above.

Control circuitry 904 may include video generating circuitry and tuning circuitry, such as one or more analog tuners, one or more Motion Picture Experts Group (MPEG)-2 decoders or high efficiency video coding (HEVC) decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 904 may also include scaler circuitry for upconverting and downconverting content into the preferred output format of user equipment 900. Control circuitry 904 may also include digital-to-analog converter circuitry and analog-to-digital converter circuitry for converting between digital and analog signals. The tuning and encoding circuitry may be used by user equipment 900 and 901 to receive and to display, to play, or to record content. The tuning and encoding circuitry may also be used to receive video communication session data. The circuitry described herein, including, for example, the tuning, video generating, encoding, decoding, encrypting, decrypting, scaler, and analog/digital circuitry, may be implemented using software running on one or more general purpose or specialized processors. Multiple tuners may be provided to control simultaneous tuning functions (e.g., watch and record functions, picture-in-picture (PIP) functions, multiple-tuner recording, or the like). If storage circuitry 908 is provided as a separate device from user equipment 900, the tuning and encoding circuitry (including multiple tuners) may be associated with storage circuitry 908.

Control circuitry 904 may receive instruction from a user by way of user input interface 910. User input interface 910 may be any suitable user interface, such as a remote control, mouse, trackball, keypad, keyboard, touch screen, touchpad, stylus input, joystick, voice recognition interface, sensor interface (e.g., to track body movement, eye gaze, biometric parameters, or the like), or other user input interfaces. Display 912 may be provided as a stand-alone device or integrated with other elements of each one of user equipment 900 and user equipment 901. For example, display 912 may be a touchscreen or touch-sensitive display. In such circumstances, user input interface 910 may be integrated with or combined with display 912. In some embodiments, user input interface 910 includes a remote-control device having one or more microphones, buttons, keypads, sensors, or any other components configured to receive user input or combinations thereof. For example, user input interface 910 may include a handheld remote-control device having an alphanumeric keypad and option buttons. In a further example, user input interface 910 may include a handheld remote-control device having a microphone and control circuitry configured to receive and identify voice commands and transmit information to set-top box 915.

Audio output equipment 914 may be integrated with or combined with display 912.

Display 912 may be one or more of a monitor, television, liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 912. Audio output equipment 914 may be provided as integrated with other elements of each one of user equipment 900 and user equipment 901 or may be stand-alone units. An audio component of videos and other content displayed on display 912 may be played through speakers (or headphones) of audio output equipment 914. In some embodiments, audio may be distributed to a receiver (not shown), which processes and outputs the audio via speakers of audio output equipment 914. In some embodiments, for example, control circuitry 904 is configured to provide audio cues to a user, or other audio feedback to a user, using speakers of audio output equipment 914. There may be a separate microphone 916 or audio output equipment 914 may include a microphone configured to receive audio input such as voice commands or speech. For example, a user may speak letters or words that are received by the microphone and converted to text by control circuitry 904. In a further example, a user may voice commands that are received by a microphone and recognized by control circuitry 904. Camera 918 may be any suitable video camera integrated with the equipment or externally connected. Camera 918 may be a digital camera comprising a charge-coupled device (CCD) and/or a complementary metal-oxide semiconductor (CMOS) image sensor. Camera 918 may be an analog camera that converts to digital images via a video card.

The media application may be implemented using any suitable architecture. For example, the media application may be a stand-alone application wholly implemented on each one of user equipment 900 and user equipment 901. In such an approach, instructions of the application may be stored locally (e.g., in storage circuitry 908), and data for use by the application is downloaded on a periodic basis (e.g., from an out-of-band feed, from an internet resource, or using another suitable approach). Control circuitry 904 may retrieve instructions of the application from storage circuitry 908 and process the instructions to provide video conferencing functionality and generate any of the displays discussed herein. Based on the processed instructions, control circuitry 904 may determine what action to perform when input is received from user input interface 910. For example, movement of a cursor or selection field on a display up/down may be indicated by the processed instructions when user input interface 910 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, universal serial bus (USB) drive, DVD, CD, media card, register memory, processor cache, random access memory (RAM), flash drives, nonvolatile memory express (NVMe), network-attached storage (NAS), or the like.

Control circuitry 904 may allow a user to provide user profile information or may automatically compile user profile information. For example, control circuitry 904 may access and monitor network data, video data, audio data, processing data, content consumption data, and/or any other suitable data being accessed by a user. Control circuitry 904 may obtain all or part of other user profiles that are related to a particular user (e.g., via social media networks), and/or obtain information about the user from other sources that control circuitry 904 may access. As a result, a user can be provided with a unified experience across the user's different devices.

In some embodiments, the media application is a client/server-based application. Data for use by a thick or thin client implemented on each one of user equipment 900 and user equipment 901 may be retrieved on demand by issuing requests to a server remote to each one of user equipment 900 and user equipment 901. For example, the remote server may store the instructions for the application in a storage device. The remote server may process the stored instructions using circuitry (e.g., control circuitry 904) and generate the displays discussed above and below. The client device may receive the displays generated by the remote server and may display the content of the displays locally on user equipment 900. This way, the processing of the instructions is performed remotely by the server while the resulting displays (e.g., that may include text, a keyboard, or other visuals) are provided locally on user equipment 900. User equipment 900 may receive inputs from the user via user input interface 910 and transmit those inputs to the remote server for processing and generating the corresponding displays. For example, user equipment 900 may transmit a communication to the remote server indicating that an up/down button was selected via user input interface 910. The remote server may process instructions in accordance with that input and generate a display of the application corresponding to the input (e.g., a display that moves a cursor up/down). The generated display is then transmitted to user equipment 900 for presentation to the user.

In some embodiments, the media application may be downloaded and interpreted or otherwise run by an interpreter or virtual machine (e.g., run by control circuitry 904). In some embodiments, the media application may be encoded in the ETV Binary Interchange Format (EBIF), received by control circuitry 904 as part of a suitable feed, and interpreted by a user agent running on control circuitry 904. For example, the media application may be an EBIF application. In some embodiments, the media application may be defined by a series of JAVA-based files that are received and run by a local virtual machine or other suitable middleware executed by control circuitry 904. In some of such embodiments (e.g., those employing MPEG-2, MPEG-4, HEVC or any other suitable digital media encoding schemes), the media application may be, for example, encoded and transmitted in an MPEG-2 object carousel with the MPEG audio and video packets of a program.

As shown in FIG. 10, user equipment 1006, 1007, 1008, and 1010 (which may correspond to user equipment 140 of FIG. 1 or 440 of FIG. 4) may be coupled to communication network 1009. Communication network 1009 may be one or more networks including the internet, a mobile phone network, mobile voice or data network (e.g., a 5G, 4G, or long term evolution (LTE) network), cable network, public switched telephone network, or other types of communication network or combinations of communication networks. Paths (e.g., depicted as arrows connecting the respective devices to the communication network 1009) may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 10 to avoid overcomplicating the drawing.

Although communications paths are not drawn between user equipment, these devices may communicate directly with each other via communications paths as well as other short-range, point-to-point communications paths, such as USB cables, IEEE 1394 cables, wireless paths (e.g., Bluetooth, infrared, IEEE 1002-11x, or the like), or other short-range communication via wired or wireless paths. The user equipment may also communicate with each other directly through an indirect path via communication network 1009.

System 1000 may comprise media content source 1002, one or more servers 1004, and/or one or more edge computing devices. In some embodiments, the media application may be executed at one or more of control circuitry 1011 of server 1004 (and/or control circuitry of user equipment 1006, 1007, 1008, 1010 and/or control circuitry of one or more edge computing devices). In some embodiments, the media content source and/or server 1004 may be configured to host or otherwise facilitate video communication sessions between user equipment 1006, 1007, 1008, 1010 and/or any other suitable user equipment, and/or host or otherwise be in communication (e.g., over communication network 1009) with one or more social network services.

In some embodiments, server 1004 may include control circuitry 1011 and storage circuitry 1014 (e.g., RAM, ROM, Hard Disk, Removable Disk, or the like). Storage circuitry 1014 may store one or more databases. Server 1004 may also include an I/O path 1012. In some embodiments, I/O path 1012 is an I/O circuitry. I/O circuitry may be a network interface card (NIC) card, audio output device, mouse, keyboard card, voice recognition interface, sensor interface, any other suitable I/O circuitry device or combination thereof. I/O path 1012 may provide video conferencing data, device information, or other data, over a local area network (LAN) or wide area network (WAN), and/or other content and data to control circuitry 1011, which may include processing circuitry, and storage circuitry 1014. Control circuitry 1011 may be used to send and receive commands, requests, and other suitable data using I/O path 1012, which may comprise I/O circuitry. I/O path 1012 may connect control circuitry 1011 to one or more communications paths.

Control circuitry 1011 may be based on any suitable control circuitry such as one or more microprocessors, microcontrollers, digital signal processors, programmable logic devices, field-programmable gate arrays (FPGAs), application-specific integrated circuits (ASICs), or the like, and may include a multi-core processor (e.g., dual-core, quad-core, hexa-core, or any suitable number of cores) or supercomputer. In some embodiments, control circuitry 1011 may be distributed across multiple separate processors or processing units, for example, multiple of the same type of processing units (e.g., two Intel Core i7 processors) or multiple different processors (e.g., an Intel Core i7 processor and an Intel Core i9 processor). In some embodiments, control circuitry 1011 executes instructions for an emulation system application stored in memory (e.g., the storage circuitry 1014). Memory may be an electronic storage device provided as storage circuitry 1014 that is part of control circuitry 1011. Memory may store instruction to run the media application.

Figure 11:
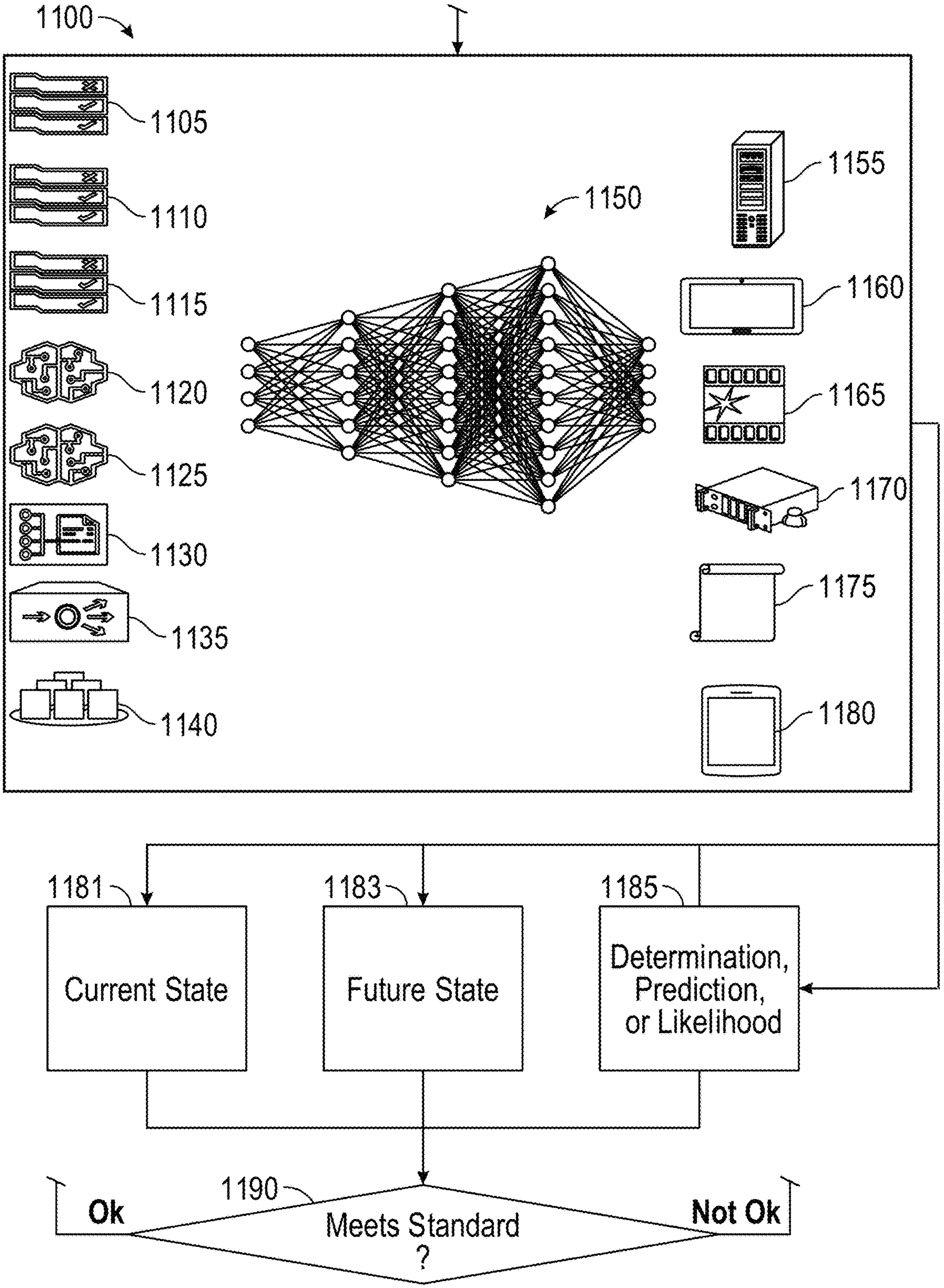
FIG. 11 depicts an illustrative artificial intelligence system, in accordance with some embodiments of the disclosure.

FIG. 11 depicts an illustrative artificial intelligence system, in accordance with some embodiments of the disclosure. In some embodiments, the model ingests diverse forms of data about users, digital content items, devices, and more. This encompasses user interaction data, load-distribution data, and metadata. The model conducts analysis based on deterministic rules, learned rules, deterministic models, learned models, user interaction data, load data, analytics, metadata, user profile information, or combinations thereof. The model generates predictions of a future state of any of the described devices. Load-increasing events are identified by load-distribution processes.

The model is constructed based on inputs including deterministic rules, user-defined rules, rules defined by content providers, deterministic models, learned models, or combinations thereof. The model is trained with data using various data processing methods, analytical processes, and machine learning techniques. The model includes regression and classification analyses. An example of a deep neural network is provided.

The model is built upon data engineering and modeling processes and is operationalized using registration, deployment, monitoring, and retraining processes. The model is designed to output results to one or multiple devices, which can perform various functions. The devices can be a server, tablet, digital display device, network-connected computer, media device, computing device, or combinations thereof.

The model outputs a current state, future state, determination, prediction, or probability. These outputs may be compared to a predetermined or determined benchmark. If the benchmark is met or not met, the predictive process outputs at least one of the current state, future state, determination, prediction, or probability to any device or module disclosed.

For example, FIG. 11 depicts a predictive model. A prediction process 1100 includes a predictive model 1150 in some embodiments. The predictive model 1150 receives as input various forms of data about one, more or all the users, media content items, devices, servers, and data described in the present disclosure. The predictive model 1150 performs analysis based on at least one of hard rules, learning rules, hard models, learning models, usage data, load data, analytics of the same, metadata, profile information, combinations of the same, or the like. The predictive model 1150 outputs one or more predictions of a future state of any of the devices described in the present disclosure. A load-increasing event is determined by load-balancing processes, e.g., least connection, least bandwidth, round robin, server response time, weighted versions of the same, resource-based processes, and address hashing. The predictive model 1150 is based on input including at least one of a hard rule 1105, a user-defined rule 1110, a rule defined by a content provider 1115, a hard model 1120, a learning model 1125, combinations of the same, or the like.

The predictive model 1150 receives as input usage data 1130. The predictive model 1150 is based, in some embodiments, on at least one of a usage pattern of the user or media device, a usage pattern of the requesting media device, a usage pattern of the media content item, a usage pattern of the communication system or network, a usage pattern of the profile, a usage pattern of the media device, combinations of the same, or the like.

The predictive model 1150 receives as input load-balancing data 1135. The predictive model 1150 is based on at least one of load data of the display device, load data of the requesting media device, load data of the media content item, load data of the communication system or network, load data of the profile, load data of the media device, combinations of the same, or the like.

The predictive model 1150 receives as input metadata 1140. The predictive model 1150 is based on at least one of metadata of the streaming service, metadata of the requesting media device, metadata of the media content item, metadata of the communication system or network, metadata of the profile, metadata of the media device, combinations of the same, or the like. The metadata includes information of the type represented in the media device manifest.

The predictive model 1150 is trained with data. The training data is developed in some embodiments using one or more data processes including but not limited to data selection, data sourcing, and data synthesis. The predictive model 1150 is trained in some embodiments with one or more analytical processes including but not limited to classification and regression trees (CART), discrete choice models, linear regression models, logistic regression, logit versus probit, multinomial logistic regression, multivariate adaptive regression splines, probit regression, regression processes, survival or duration analysis, and time series models. The predictive model 1150 is trained in some embodiments with one or more machine learning approaches including but not limited to supervised learning, unsupervised learning, semi-supervised learning, reinforcement learning, and dimensionality reduction. The predictive model 1150 in some embodiments includes regression analysis including analysis of variance (ANOVA), linear regression, logistic regression, ridge regression, and/or time series. The predictive model 1150 in some embodiments includes classification analysis including decision trees and/or neural networks. In FIG. 11, a depiction of a multi-layer neural network is provided as a non-limiting example of a predictive model 1150, the neural network including an input layer (left side), three hidden layers (middle), and an output layer (right side) with 32 neurons and 192 edges, which is intended to be illustrative, not limiting. The predictive model 1150 is based on data engineering and/or modeling processes. The data engineering processes include exploration, cleaning, normalizing, feature engineering, and scaling. The modeling processes include model selection, training, evaluation, and tuning. The predictive model 1150 is operationalized using registration, deployment, monitoring, and/or retraining processes.

The predictive model 1140 is configured to output results to a device or multiple devices. The device includes means for performing one, more, or all the features referenced herein of the systems, methods, processes, and outputs of one or more of FIGS. 1-26, in any suitable combination. The device is at least one of a server 1155, a tablet 1160, a media display device 1165, a network-connected computer 1170, a media device 1175, a computing device 1180, combinations of the same, or the like.

The predictive model 1150 is configured to output a current state 1181, and/or a future state 1183, and/or a determination, a prediction, or a likelihood 1185, and the like. The current state 1181, and/or the future state 1183, and/or the determination, the prediction, or the likelihood 1185, and the like may be compared 1190 to a predetermined or determined standard. In some embodiments, the standard is satisfied (1190=OK) or rejected (1190=NOT OK). If the standard is satisfied or rejected, the predictive process 1100 outputs at least one of the current state, the future state, the determination, the prediction, the likelihood to any device or module disclosed herein, combinations of the same, or the like. In some embodiments, the predictive model 1150 incorporates one or more LLMs.

Figure 12A:
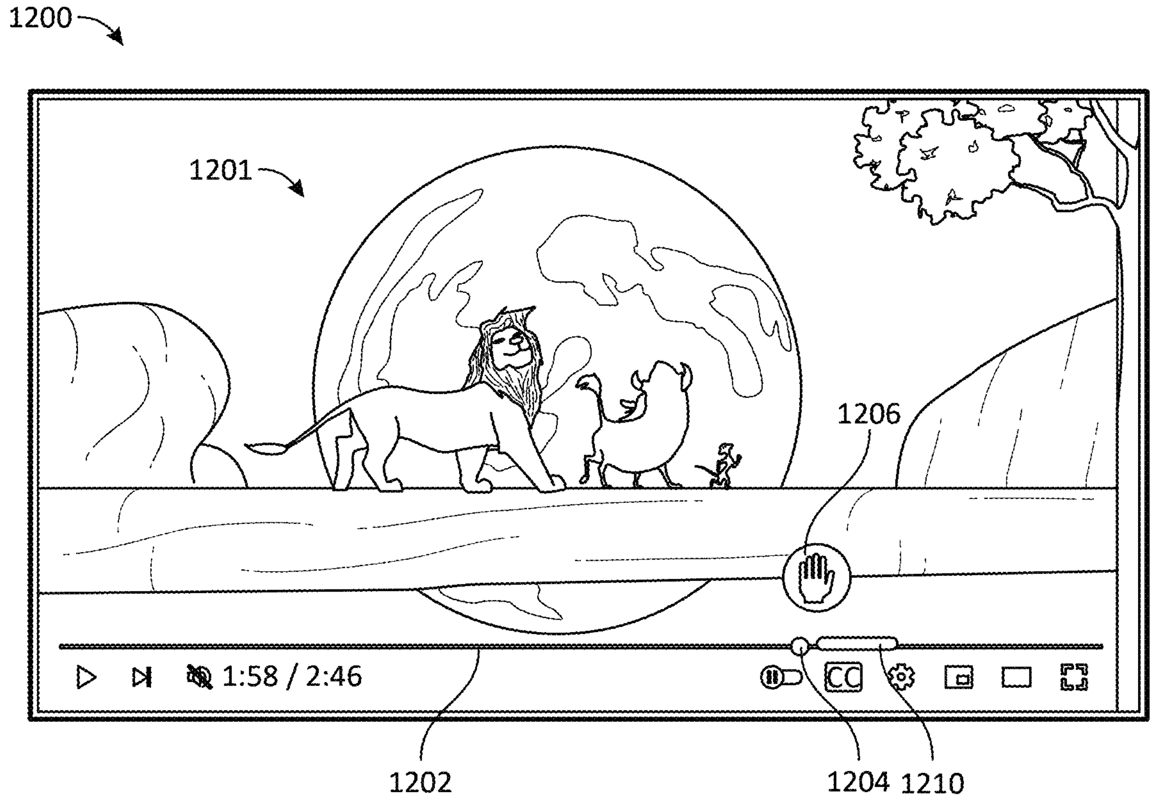
FIG. 12A depicts a schematic illustration of the media platform player displaying an upcoming co-watch bot discourse window and icon of participation intent, in accordance with some embodiments of the disclosure.
Figure 12B:
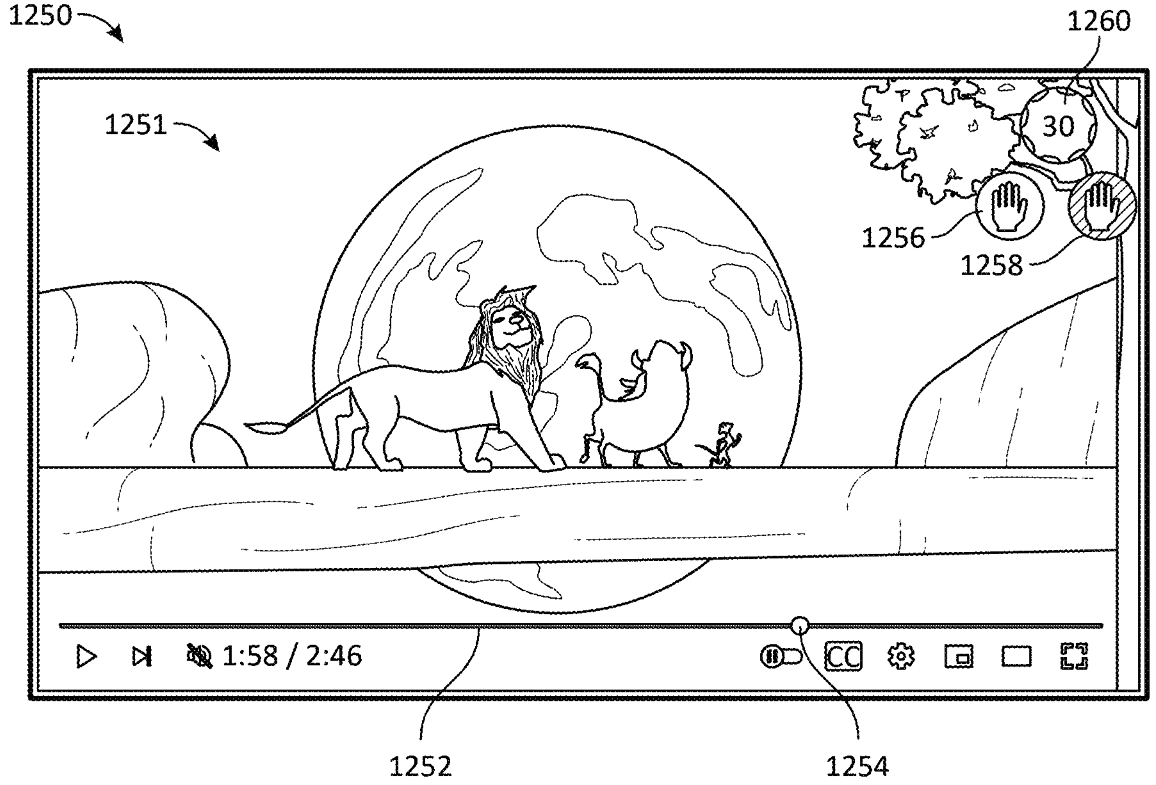
FIG. 12B depicts a schematic illustration of the media platform player displaying an upcoming co-watch bot discourse window and icons of participation intent, in accordance with some embodiments of the disclosure.

FIG. 12A and FIG. 12B depict a schematic illustration of the media platform player (e.g., 1200 and 1250) displaying an upcoming co-watch bot discourse window (e.g., 1210 and 1260) and icon(s) of participation intent (e.g., 1206, 1256, and 1258). In some embodiments, the media platform may provide a co-watch bot UI feature to provide cues for upcoming discourse windows. For example, the media player may display one or more discourse windows of the media content where the user or the co-watch bot may initiate a conversation.

In some embodiments, when the feature is active, during play of media content 1201, a conversation window 1210 may be displayed as a temporal indicator, indicating a point or range of time, of the media content where the user or the co-watch bot may initiate a conversation. For example, conversation window 1210 is displayed as an overlaid range on the media playback progress bar 1202. In another example, conversation window 1210 may be displayed as an overlaid point on the media playback progress bar 1202. In some embodiments, any available conversation window (e.g., 1210) may be displayed when the media playback progress bar 1202 is displayed. In another embodiment, only conversation windows that have yet to occur may be displayed when the media playback progress bar 1202 is displayed.

In some embodiments, when the feature is active, during play of media content 1251, a conversation window countdown clock 1260 may be displayed as a temporal indicator, indicating a point or range of time, of the media content where the user or the co-watch bot may initiate a conversation. For example, the conversation window countdown clock 1260 may represent the time until the conversation initiation point, or the conversation window countdown clock 1260 may represent the time unit at which the conversation window closes. For example, conversation window 1260 is displayed as an overlaid dynamic image on the media content 1251 that represents the time until the conversation window opens. The dynamic image many be any suitable image or the like that provides an indication of time to the conversation window. In some embodiments, the conversation window countdown clock (e.g., 1260) may be temporarily displayed from the start of the duration of the countdown to the conversation window initiation point.

Figure 13:
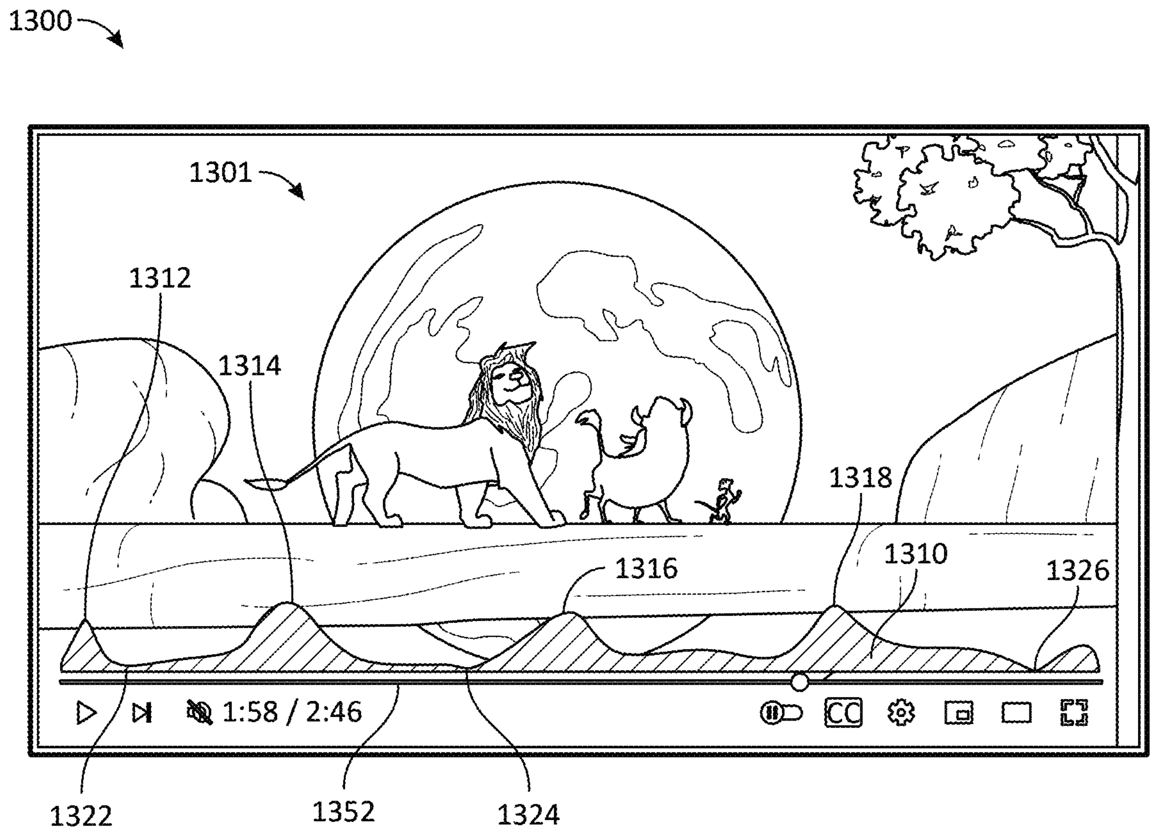
FIG. 13 depicts a schematic illustration of the media platform player displaying past conversation history distribution, in accordance with some embodiments of the disclosure.

In some embodiments, when the feature is active, during play of media content (e.g., 1301 of FIG. 13), the media player 1300 of FIG. 13 may display a co-watch bot conversation history distribution 1310 of FIG. 13 along a media playback progress bar 1352 of FIG. 13. The co-watch bot conversation history distribution shows a pattern of conversation interactions with the co-watch bot corresponding to the time period of the media content and may also serve as a temporal indicator, indicating a point or range of time, of the media content where the user or the co-watch bot may initiate a conversation. For example, the media platform may aggregate data of co-watch bot interactions from the co-watch bot conversation histories (e.g., 326 and 346 of FIG. 3) across user profiles (e.g., 320 and 340 of FIG. 3) that have occurred during viewing of the media content. Additional data such as user personal behaviors may be incorporated to weight the conversation history distribution. In some embodiments, the peaks (e.g., 1312-1318 of FIG. 13) of the conversation history distribution represent areas of the media content where conversations have occurred more frequently and the valleys (e.g., 1322-1326 of FIG. 13) are areas of the media content where conversations have occurred less frequently. In some embodiments, the media player 1300 of FIG. 13 may be configured to display only those points on the media playback progress bar 1352 of FIG. 13 that represent the peaks of the conversation history distribution. In some embodiments, the co-watch bot conversation history distribution may be utilized to fine-tune or retrain the multi-modal generative model by weighting the token embedding corresponding to timepoints of the peaks of the co-watch bot conversation history distribution.

In some embodiments, the temporal location of the indicators for displaying an upcoming co-watch conversation window (e.g., 1210 and 1260) with respect to the media content duration may be determined through a trained multi-modal generative model. For example, the trained multi-modal generative model may determine that the density of token embeddings indicates a low complexity or low intensity area of content in the media content. For example, low intensity may be determined when an action scene subsides, dialogue reduces, music and/or sound effects shifts or fades, character and/or object movement slows, lighting changes, background changes, and/or camera angle changes and movements are reduced. In this embodiment, the low intensity area of content has a sustained low intensity for a threshold of time (e.g., 30 seconds or more) for generating and outputting an inference. For example, the trained multi-modal generative model may determine that the density of token embeddings indicates a high intensity area of content in the media content. For example, the trained multi-modal generative model may determine an upcoming co-watch conversation window or initiation point based on user metadata associated with a subset of the plurality of media content available from the media platform related to and including the media content. For example, the trained multi-modal generative model may determine an upcoming co-watch conversation window or initiation point based on a biometric response. For example, the trained multi-modal generative model may determine an upcoming co-watch conversation window or initiation point through searching (e.g., forward) token embeddings for the media content based on previous user discourse during the playback of the current or other previous media content. For example, these methods may be used to determine the initiation point and the duration of the conversation window indicators.

In some embodiments, the user or the co-watch bot may signal an intent to initiate discourse during the conversation window 1210. For example, the media platform may receive a signal indicating an intent prior to the start of the conversation window (e.g., 1210 and 1260) to initiate a conversation at the conversation initiation point (e.g., earliest timepoint of the conversation window). For example, the media platform player (e.g., 1200 and 1250) may display an indicator of conversation intent (e.g., 1206 and 1256) proximate to the conversation window indicator to show the command was received. For example, an indicator of conversation intent may be any image, icon, profile picture, dynamic image, or the like to represent a user signal. In another example, the media platform may receive a signal indicating an intent (e.g., via a user device; also referred to as "a signal of intent" herein) within the conversation window to initiate a conversation at the present time. For example, the media platform may receive a co-watch bot signal of intent prior to the start of the conversation window (e.g., 1260) to initiate a conversation at the conversation initiation point (e.g., earliest timepoint of the conversation window). For example, the co-watch bot signal of intent may be independent of the user signal of intent or may be in response to the user signal of intent. For example, the media platform player (e.g., 1250) may display a co-watch bot indicator of conversation intent (e.g., 1258) proximate to the conversation window indicator to show the co-watch bot is ready to initiate discourse during the upcoming conversation window. For example, a co-watch bot indicator of conversation intent may be any image, icon, profile picture, dynamic image, or the like. In some embodiments, the co-watch bot indicator of conversation intent may represent the subject associated with the co-watch bot inference (not shown) to be output during the conversation window or at the conversation initiation point. For example, FIG. 12B shows that the media platform has received conversation initiation intent from both the user and the co-watch bot for the conversation window. In some embodiments, the media platform may receive a signal (e.g., from the user via a user device) indicating an acceptance (e.g., or rejection) of the co-watch bot indicator of conversation intent (e.g., 1258). For example, the signal to accept the co-watch bot indicator of conversation intent (e.g., 1258) may be the same as the user signal of intent that results in the display of the user indicator of intent (e.g., 1256). For example, when the media platform receives a user signal to indicate that the user is rejecting the co-watch bot indicator of conversation intent (e.g., 1258), the media platform removes the co-watch bot indicator of conversation intent from display. In some embodiments, the media platform may be configured to either automatically accept or automatically reject the co-watch bot indicator of conversation intent in the case of not receiving a user signal prior to the initiation of the conversation window.

In some embodiments, if the media platform player (e.g., 1200 and 1250) has received a signal indicating conversation content (also referred to as "a signal of intent" herein) from the user and/or the co-watch bot (that has not been subsequently rejected by the user) prior to the indicated conversation window (e.g., 1210 and 1260), the media content (e.g., 1201 and 1251) automatically pauses at the conversation initiation point indicated by the conversation window. In some embodiments, where the media platform has received signals of intent from both the user and the co-watch bot, the media platform gives precedence to the user to start the discourse at the conversation initiation point. In some embodiments, where the media platform has only received a signal of intent from the co-watch bot, the co-watch bot may output an inference at the conversation initiation point. In some embodiments, the media player may provide an indicator (not shown) along the playback backbar to display the temporal location of a previous co-watch bot conversation. For example, a selection of a previous conversation indicator may rewind to the indicated media playback location and may replay the discourse between the user and the co-watch bot.

In some embodiments, the media platform may be configured for a user to override the default conversation window 1210 presented by the media player 1200. For example, this configuration may be available based on user subscription tier. For example, in this configuration, a user may start a discourse at any desired time. The co-watch bot may or may not provide a response for all user-initiated conversations outside of the designated conversation windows. For example, the media platform may indicate a co-watch bot response is not available for the current user unput. In some embodiments, a user request outside of the designated conversation window may set the context window to the range between the start of the movie to the current player position 1204. In some embodiments, in this configuration, the conversation window(s) (e.g., 1210) may not be displayed. In some embodiments, in this configuration, the user and co-watch bot indicators of intent (e.g., 1206, 1256, and 1258) may still be displayed. For example, when the media platform receives an indicator of conversation intent to start a conversation, the system may request and/or receive a user input for a temporal location of the media content where the user intends to start a conversation. The context window would be adjusted based on the received temporal location for generation of the inference.

FIG. 13 depicts a schematic illustration of the media platform player displaying past conversation history distribution. For example, the co-watch bot conversation history distribution 1310 may be generated by the media platform using the co-watch bot conversation histories (e.g., 326 and 346 of FIG. 3) across user profiles (e.g., 320 and 340 of FIG. 3) that have viewed the media content. Additional data such as user personal behaviors may be incorporated to weight the conversation history distribution. In some embodiments, the peaks (e.g., 1312-1318) of the conversation history distribution 1310 represent areas of the media content where conversations have occurred more frequently and the valleys (e.g., 1322-1326) are areas of the media content where conversations have occurred less frequently. In some embodiments, the media player 1300 may be configured to display only those points on the media playback progress bar 1352 that represent the peaks of the conversation history distribution.

In some embodiments, the media platform may have tiers of user access. For example, the media platform may provide limitations of the conversation sessions offered by the media platform (e.g., in total or per period of time). For example, the limitations of use of the co-watch bot may be based on the number of co-watch bot conversation sessions, the total duration of conversations with the co-watch bot, or total duration of media consumed with the co-watch bot. In some embodiments, the limitation balance may be displayed. For example, this limitation may be displayed when selecting the co-watch bot personality (e.g., proximate to 434 of FIG. 4). For example, the media platform may display an interface option to upgrade the user access tier next to the limitation balance. In some embodiments, when the limitations of the conversation sessions offered by the media platform have been reached, the conversation window (s) (e.g., 1210 and 1260) and indicators of intent (e.g., 1206, 1256, and 1258) may not be available. In some embodiments, the media platform may receive a user request to use the co-watch bot after the limitation has been reached. In this embodiment, the media platform may provide an interface to update the user service tier.

Figure 14:
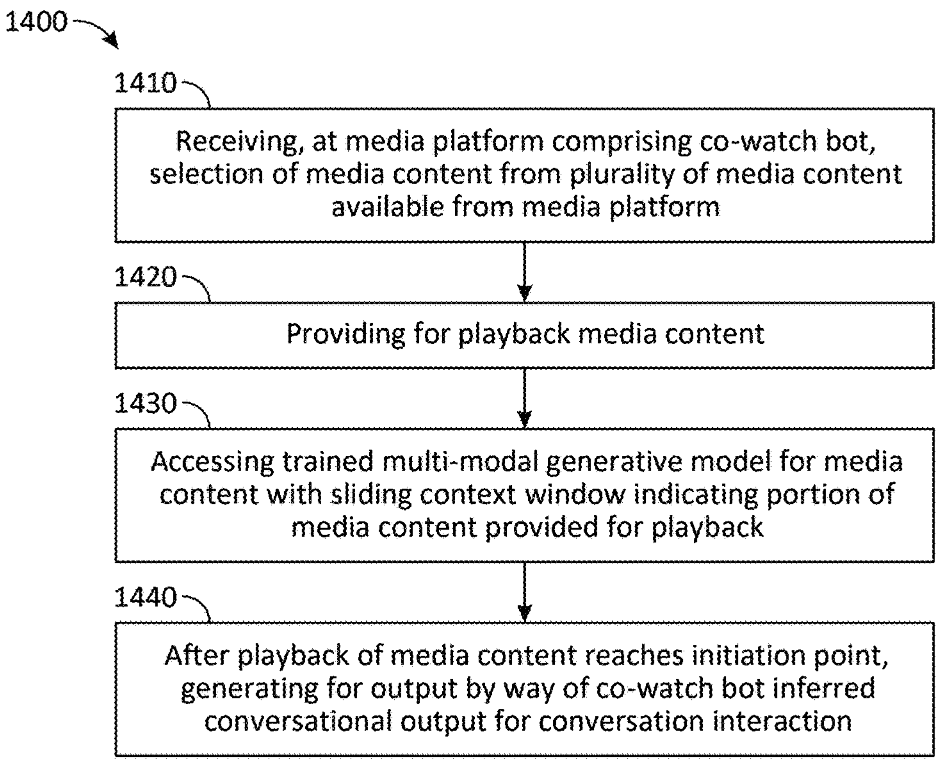
FIG. 14 is a flowchart of a method for generating for output by way of a co-watch bot an inferred conversational output for a conversation interaction at an initiation point, in accordance with some embodiments of the disclosure.

FIG. 14 is a flowchart of a method for generating for output by way of a co-watch bot an inferred conversational output for a conversation interaction at an initiation point, in accordance with some embodiments of the disclosure. In some embodiments, a method 1400 for generating for output by way of a co-watch bot an inferred conversational output for a conversation interaction at an initiation point (e.g., 636 of FIG. 6B, 656 of FIG. 6C, 678 of FIG. 6D, 830 of FIG. 8, or the like) comprises at least one of steps 1410-1440, combinations of the same, or the like. For example, the media platform (e.g., 801 of FIG. 8, or the like) comprising a co-watch bot (e.g., 803 of FIG. 8) may receive a selection of a media content, from a plurality of media content (e.g., 404-422 of FIG. 4, or the like) available from the media platform (e.g., at 1410) via a user device (e.g., 140 of FIG. 1, 440 of FIG. 4, 805 of FIG. 8, or the like). For example, at 1420, the media platform may provide the selected media content for playback (e.g., 142 of FIG. 1). For example, at 1430, the media platform may access a trained multi-modal generative model (e.g., 130 of FIG. 1, 230 of FIG. 2, 330 of FIG. 3, 710 of FIG. 7, 1150 of FIG. 11, or the like) for the media content with a sliding context window to determine an initiation time and to generate an inferred conversational output. For example, the sliding context window is the range of token embeddings made available for the co-watch bot to make an inference. The range of the sliding context window is based on the play position of the media content. In some embodiments, the co-watch bot may implement a sliding context window to limit access to token embeddings based on the progress of the media content, thus making inferences based on only the portion of the media content played. In some embodiments, the trained multi-modal generative model is trained on a plurality of indicators (e.g., token embeddings 112, 114, and 116 mapped to latent space tokens 120 of FIG. 1, or the like) each representing a respective aspect of a respective portion of the media content and each associated with one or more progress markers (e.g., frame identifier, timestamp, or the like) indicating one or more points of progression within the media content to which each indicator corresponds. In some embodiments, the trained multi-modal generative model determines, based at least in part on the plurality of indicators and the one or more progress markers corresponding to each of the plurality of indicators, an initiation point (e.g., step 824 of FIG. 8) for initiating a conversation interaction of the co-watch bot. In some embodiments, the trained multi-modal generative model generates, based at least in part on the sliding context window and the plurality of indicators, an inferred conversational output (e.g., 634 of FIG. 6B, 654 of FIG. 6C, 830 of FIG. 8, or the like) for the conversation interaction at the initiation point. For example, at 1440, after the playback of the media content reaches the initiation point, the media platform generates for output by way of the co-watch bot the inferred conversational output for the conversation interaction.

Figure 15:
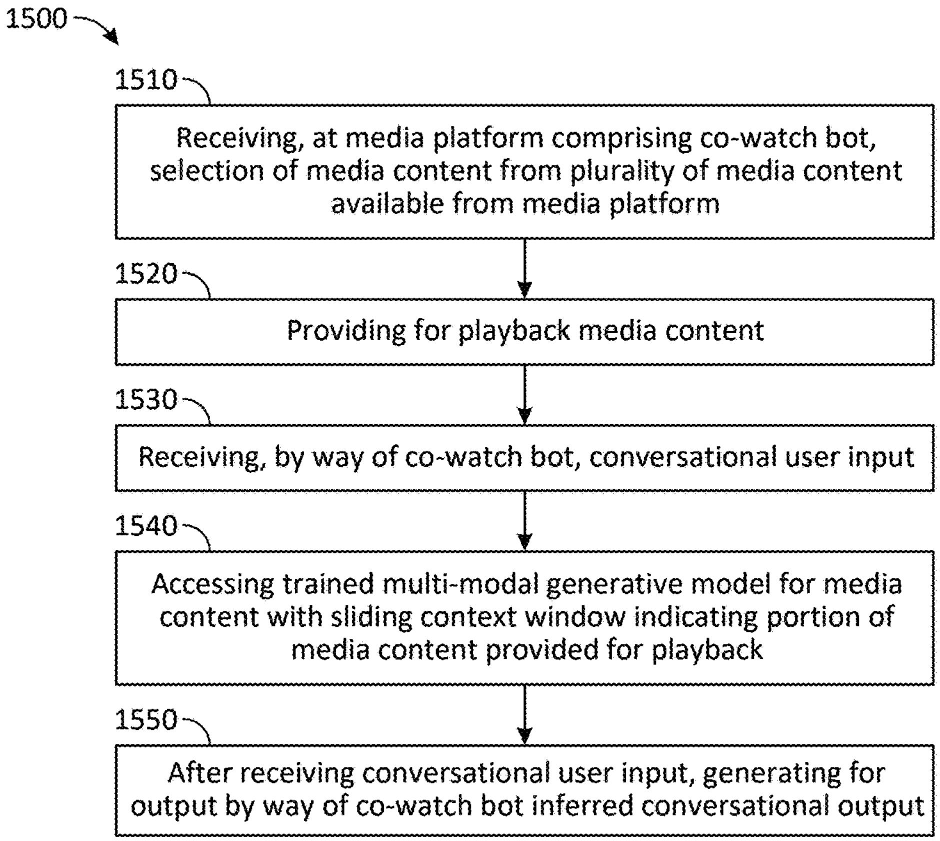
FIG. 15 is a flowchart of a method for generating for output by way of a co-watch bot an inferred conversational output after receiving a conversational user input, in accordance with some embodiments of the disclosure.

FIG. 15 is a flowchart of a method for generating for output by way of a co-watch bot an inferred conversational output after receiving a conversational user input, in accordance with some embodiments of the disclosure; In some embodiments, a method 1500 for generating for output by way of a co-watch bot an inferred conversational output (e.g., 148 of FIG. 1, 610 of FIG. 6A, 810 of FIG. 8, or the like) after receiving a conversational user input (e.g., 138 of FIG. 1, "yes" at 604 of FIG. 6A, 818 of FIG. 8 or the like) comprises at least one of steps 1510-1550, combinations of the same, or the like. For example, the media platform (e.g., 801 of FIG. 8, or the like) comprising a co-watch bot (e.g., 803 of FIG. 8) may receive a selection of a media content, from a plurality of media content (e.g., 404-422 of FIG. 4, or the like) available from the media platform (e.g., at 1510) via a user device (e.g., 140 of FIG. 1, 440 of FIG. 4, 805 of FIG. 8, or the like). For example, at 1520, the media platform may provide the selected media content for playback (e.g., 142 of FIG. 1). For example, at 1530, the media platform may receive a conversational user input (e.g., the user's voice, a text input, a user gesture, or the like). For example, at 1540, the media platform may access a trained multi-modal generative model (e.g., 130 of FIG. 1, 230 of FIG. 2, 330 of FIG. 3, 710 of FIG. 7, 1150 of FIG. 11, or the like) for the media content with a sliding context window. For example, the sliding context window is the range of token embeddings made available for the co-watch bot to make an inference. The range of the sliding context window is based on the play position of the media content. In some embodiments, the co-watch bot may implement a sliding context window to limit access to token embeddings based on the progress of the media content, thus making inferences based on only the portion of the media content played. In some embodiments, the trained multi-modal generative model is trained on a plurality of indicators (e.g., token embeddings 112, 114, and 116 mapped to latent space tokens 120 of FIG. 1, or the like) each representing a respective aspect of a respective portion of the media content and each associated with one or more progress markers (e.g., frame identifier, timestamp, or the like) indicating one or more points of progression within the media content to which each indicator corresponds. In some embodiments, the trained multi-modal generative model generates, based at least in part on the conversational user input, the sliding context window, and the plurality of indicators, an inferred conversational output (e.g., 148 of FIG. 1, 610 of FIG. 6A, 810 of FIG. 8, or the like) in response to the user input. For example, at 1550, after receiving the conversational user input, the media platform generates for output by way of the co-watch bot the inferred conversational output.

Figure 16:
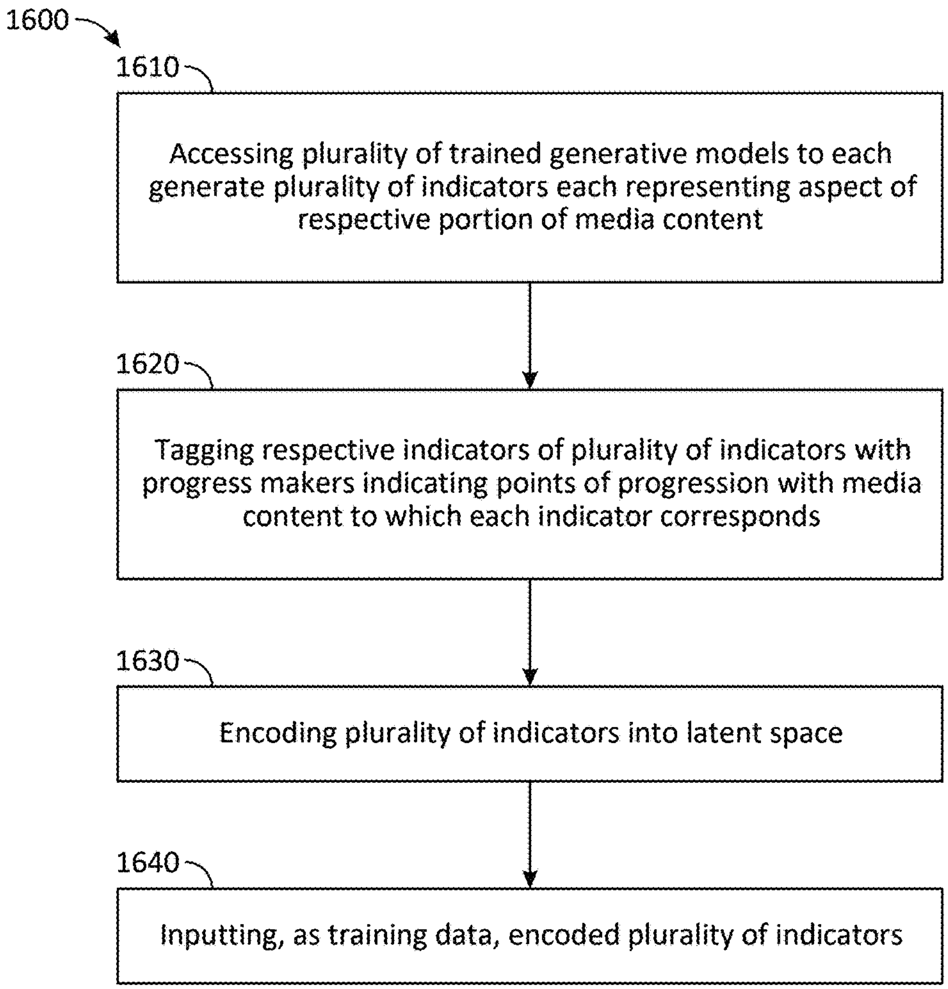
FIG. 16 is a flowchart of a method for preparing data for use in training a multi-modal generative model, of a media platform for co-watching a media content, in accordance with some embodiments of the disclosure.

FIG. 16 is a flowchart of a method for preparing data for use in training a multi-modal generative model, of a media platform for co-watching a media content, in accordance with some embodiments of the disclosure. In some embodiments, a method 1600 for preparing data for use in training (e.g., 100 of FIG. 1, 200 of FIG. 2, or the like) a multi-modal generative model of a media platform for co-watching a media content (e.g., 148 of FIG. 1, 610 of FIG. 6A, 810 of FIG. 8, or the like) that is implementable to generate for output by way of a co-watch bot an inferred conversational output comprises at least one of steps 1610-1640, combinations of the same, or the like. For example, at 1610, a plurality of trained generative models (e.g., 106 108, and 110 of FIGS. 1, 206, 208, and 210 of FIG. 2, or the like) are accessed to each generate a plurality of indicators (e.g., token embeddings 112, 114, and 116 of FIG. 1, 212 of FIG. 12, or the like) each representing an aspect (e.g., character, actor, object, location, tone, pitch, volume lyric, soundtrack, score, closed caption, transcript, or the like) of a respective portion of the media content, wherein the plurality of indicators are generated from a modal input (e.g., visual, audio, text, or the like from the media content, supplemental sources, or the like) of a respective trained generative model. For example, at 1620 the plurality of indicators are tagged with respective progress markers (e.g., frame identifier, timestamp, or the like) indicating points of progression within the media content to which each indicator corresponds. For example, at 1630, the plurality of indicators is encoded (e.g., via encoder 118 of FIG. 1, 218 of FIG. 2, or the like) into a latent space (e.g., to generate latent space tokens 120 of FIG. 1). The latent space mapping transforms data into a lower-dimensional representation of data that allows the model to determine features, patterns, and relationships within and between the modal inputs. For example, at 1640, the plurality of encoded of indicators (e.g., latent space tokens 120 of FIG. 1, or the like) are input into the multi-modal generative model (e.g., 130 of FIG. 1, 230 of FIG. 2, 330 of FIG. 3, 710 of FIG. 7, 1150 of FIG. 11, or the like) for model training.

Figure 17:
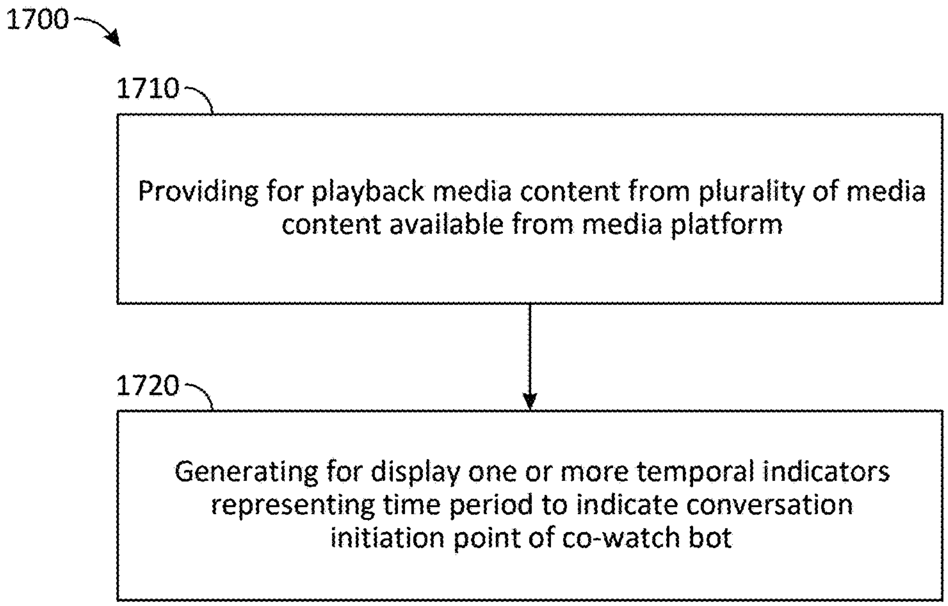
FIG. 17 is a flowchart of a method for generating a temporal indicator to indicate a conversation initiation point of a co-watch bot, in accordance with some embodiments of the disclosure.

FIG. 17 is a flowchart of a method for generating a temporal indicator to indicate a conversation initiation point of a co-watch bot, in accordance with some embodiments of the disclosure. In some embodiments, a method 1700 for generating a temporal indicator (e.g., 1210 and 1260 of FIG. 12, 1310 of FIG. 13, or the like) to indicate a conversation initiation point of a co-watch bot comprises at least one of steps 1710-1720, combinations of the same, or the like. For example, a media platform (e.g., 801 of FIG. 8, or the like) comprising a co-watch bot (e.g., 803 of FIG. 8) may receive a selection of a media content, from a plurality of media content (e.g., 404-422 of FIG. 4, or the like) available from the media platform (e.g., at 1510) via a user device (e.g., 140 of FIG. 1, 440 of FIG. 4, 805 of FIG. 8, or the like). For example, at 1710, the media platform may provide the selected media content for playback (e.g., 142 of FIG. 1). For example, at 1720, the media platform may generate for display one or more temporal indicators, wherein the one or more temporal indicators represents a time period to indicate a conversation initiation point of a co-watch bot.

Figure 18:
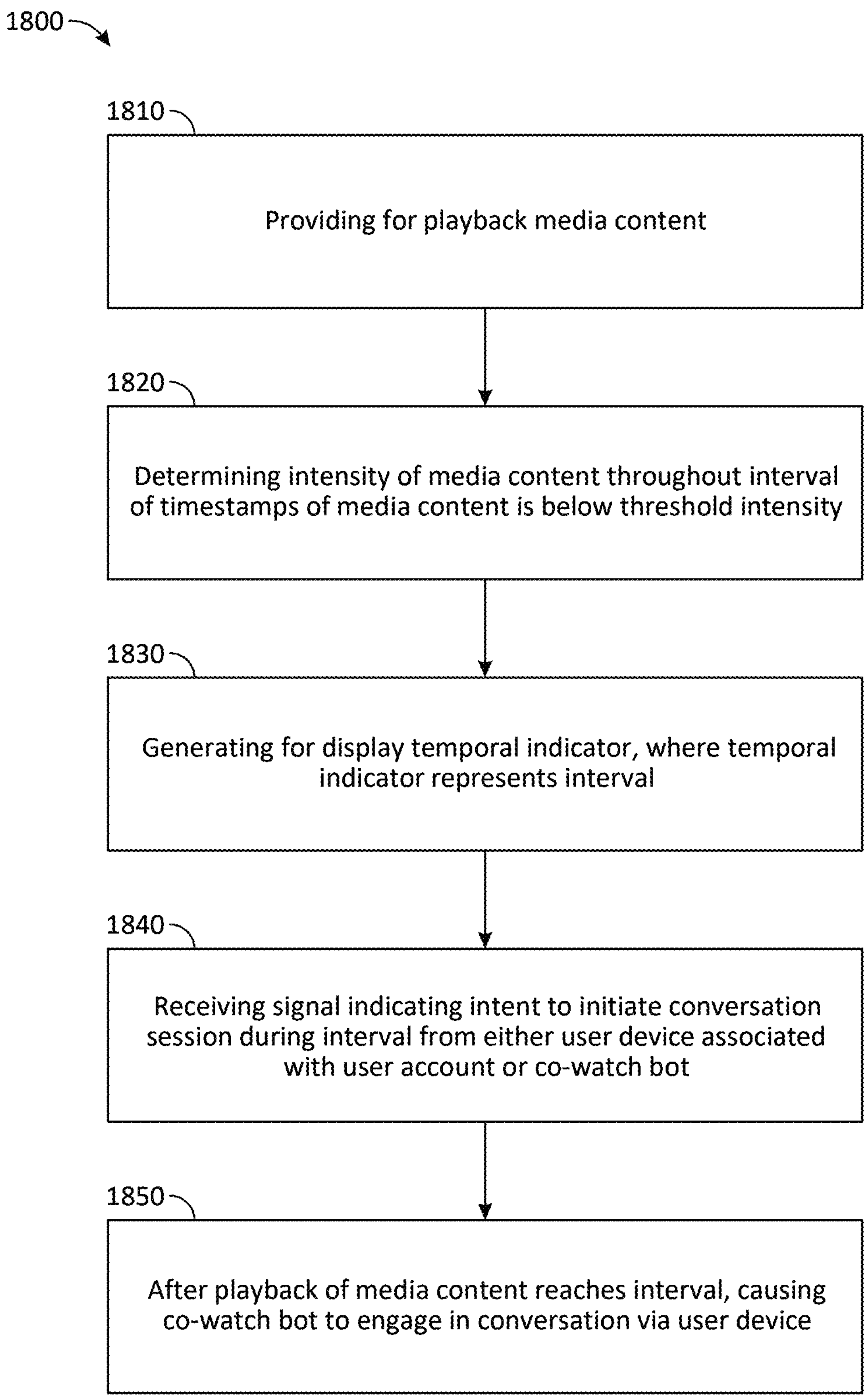
FIG. 18 is a flowchart of a method for initiating a conversation between a user (e.g., via a user device) and a co-watch bot, in accordance with some embodiments of the disclosure.

FIG. 18 is a flowchart of a method for initiating a conversation between a user and a co-watch bot, in accordance with some embodiments of the disclosure. In some embodiments, a method 1800 for initiating a conversation between a user and a co-watch bot comprises at least one of steps 1810-1840, combinations of the same, or the like. For example, a media platform (e.g., 801 of FIG. 8, or the like) comprising a co-watch bot (e.g., 803 of FIG. 8) may receive a selection of a media content, from a plurality of media content (e.g., 404-422 of FIG. 4, or the like) available from the media platform (e.g., at 1510) via a user device (e.g., 140 of FIG. 1, 440 of FIG. 4, 805 of FIG. 8, or the like). For example, at 1810, the media platform may provide the selected media content for playback (e.g., 142 of FIG. 1). For example, at 1820, the media platform may determine an intensity of the media content throughout an interval of timestamps of the media content is below a threshold intensity. For example, each timestamp of the media content may correspond to an intensity score. For example, low intensity scores may be determined when an action scene subsides, dialogue reduces, music and/or sound effects shifts or fades, character and/or object movement slows, lighting changes, background changes, and/or camera angle changes and movements are reduced. The intensity score may have a threshold to indicate a low intensity. In some embodiments, the intensity score threshold may be based on a genre of the content item. For example, the interval of timestamps below a threshold intensity score may correspond to a duration of the media content (e.g., 30 seconds or more). For example, at 1820 the media platform generates for display a temporal indicator, wherein the temporal indicator represents the interval (e.g., conversation window 1210 of FIG. 12). For example, at 1830, the media platform receives a signal indicating an intent to initiate a conversation session during the interval from either a user device associated with a user account or a co-watch bot. In some embodiments, icon(s) of participation intent (e.g., 1206, 156, and 1258) for the user and/or the co-watch bot may be generated for display based on receiving a signal indicating an intent to initiate a conversation session for the respective user or co-watch bot. For example, at 1850, the media platform causes the co-watch bot to engage in the conversation session via the user device after the playback of the media content reaches the interval.

Terminology

The terminology used herein is for the purpose of describing particular embodiments only and is not intended to be limiting of the disclosure.

Throughout the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises." It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification the phrases "in response to" and "based on" shall be understood to have a broad meaning unless context requires otherwise. For example, "in response to" can refer to a step that is in direct or indirect response to a prior step, and "based on" can refer to a step that is based at least in part on a prior step.

As used herein, the terms "real time," "simultaneous," "substantially on-demand," and the like are understood to be nearly instantaneous but may include delay due to practical limits of the system. Such delays may be on the order of milliseconds or microseconds, depending on the application and nature of the processing. Relatively longer delays (e.g., greater than a millisecond) may result due to communication or processing delays, particularly in remote and cloud-computing environments.

As used herein, the singular forms "a," "an," and "the" are intended to include the plural forms as well, unless the context clearly indicates otherwise. As used herein, the term "and/or" includes any and all combinations of one or more of the associated listed items.

Although at least some embodiments are described as using a plurality of units or modules to perform a process or processes, it is understood that the process or processes may also be performed by one unit or module. Additionally, it is understood that the term controller/control unit may refer to a hardware device that includes a memory and a processor. The memory may be configured to store the units or the modules, and the processor may be specifically configured to execute said units or modules to perform one or more processes which are described herein.

Unless specifically stated or obvious from context, as used herein, the term "about" is understood as within a range of normal tolerance in the art, for example within 2 standard deviations of the mean. "About" may be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The use of the terms "first," "second," "third," and so on, herein, are provided to identify structures or operations, without describing an order of structures or operations, and, to the extent the structures or operations are used in an embodiment, the structures may be provided or the operations may be executed in a different order from the stated order unless a specific order is definitely specified in the context.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory (e.g., a non-transitory, computer-readable medium accessible by an application via control or processing circuitry from storage) including, but not limited to, volatile and non-volatile computer memory or storage devices such as a hard disk, floppy disk, USB drive, DVD, CD, media cards, register memory, processor caches, random-access memory (RAM), UltraRAM, cloud-based storage, and the like.

The interfaces, processes, and analysis described may, in some embodiments, be performed by an application. The application may be loaded directly onto each device of any of the systems described or may be stored in a remote server or any memory and processing circuitry accessible to each device in the system. The generation of interfaces and analysis there-behind may be performed at a receiving device, a sending device, or some device or processor therebetween.

Any use of a phrase such as "in some embodiments" or the like with reference to a feature is not intended to link the feature to another feature described using the same or a similar phrase. Any and all embodiments disclosed herein are combinable or separately practiced as appropriate. Absence of the phrase "in some embodiments" does not imply that the feature is necessary. Inclusion of the phrase "in some embodiments" does not imply that the feature is not applicable to other embodiments or even all embodiments.

The systems and processes discussed above are intended to be illustrative and not limiting. One skilled in the art would appreciate that the actions of the processes discussed herein may be omitted, modified, combined and/or rearranged, and any additional actions may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The invention claimed is:

1. A method comprising:

receiving, at a media platform comprising a co-watch bot, a selection of a media content from a plurality of media content available from the media platform;

providing for playback the media content;

accessing a trained multi-modal generative model for the media content with a sliding context window indicating a portion of the media content provided for playback, wherein the trained multi-modal generative model:

(i) is trained on a plurality of indicators each representing a respective aspect of a respective portion of the media content and each associated with one or more progress markers indicating one or more points of progression within the media content to which each indicator corresponds;

(ii) determines, based at least in part on the plurality of indicators and the one or more progress markers corresponding to each of the plurality of indicators, an initiation point for initiating a conversation interaction of the co-watch bot; and (iii) generates, based at least in part on the sliding context window and the plurality of indicators an inferred conversational output for the conversation interaction at the initiation point; and after the playback of the media content reaches the initiation point, generating for output by way of the co-watch bot the inferred conversational output for the conversation interaction.

2. The method of claim 1, wherein the determining of the initiation point for initiating the conversation interaction of the co-watch bot comprises determining that a likelihood of interest in an initiation of the conversation interaction satisfies a predetermined triggering threshold.

3. The method of claim 1, wherein:

the generating of the inferred conversational output further comprises utilizing an attention layer within the sliding context window, and the attention layer reduces a time to a first indicator or a time between indicators to reduce latency and increase accuracy of the inferred conversational output.

4. The method of claim 1, wherein the determining of the initiation point for initiating the conversation interaction of the co-watch bot is based at least in part on the trained multi-modal generative model performing at least one of:

determining that a density of the plurality of indicators of the trained multi-modal generative model indicates a low complexity area of content in the media content;

determining that the density of the plurality of indicators indicates a high complexity area of content in the media content;

determining the initiation point based at least in part on user metadata associated with a subset of the plurality of media content available from the media platform related to and including the media content;

determining the initiation point based at least in part on a biometric response; or searching the plurality of indicators of the trained multi-modal generative model for the media content based at least in part on user discourse during the playback of the media content.

5. The method of claim 1, wherein metadata of the plurality of indicators relate to at least one of a video frame, an object, a person, a character, a face, a sound, or a location.

6. The method of claim 1, wherein the receiving the selection of the media content from the plurality of media content available from the media platform further comprises receiving a selection of at least one personality for the trained multi-modal generative model.

7. The method of claim 6, further comprising generating for output one or more co-watch bot representative user interfaces (UIs) of the trained multi-modal generative model based at least in part on the selection of the at least one personality, wherein the one or more co-watch bot representative UIs comprise at least one of an animated avatar, an image, a chat box, or a voice.

8. The method of claim 6, wherein the generating the inferred conversational output for the conversation interaction at the initiation point further comprises adjusting a conversational style of the inferred conversational output based at least in part on the selection of at least one personality for the trained multi-modal generative model.

9. The method of claim 1, wherein:

the generating of the inferred conversational output for the conversation interaction at the initiation point further comprises applying a style transfer, and the style transfer comprises replacing words of the inferred conversational output with words indicating a user preference based on a user history.

10. The method of claim 1, further comprising storing a conversation history, wherein the conversation history comprises at least one of a media content session recording, user discourse entries, trained multi-modal generative model discourse entries, feedback, or success parameters.

11. The method of claim 1, further comprising:

detecting a user engagement with the inferred conversational output;

tokenizing the user engagement; and accessing the trained multi-modal generative model for:

based at least in part on the tokenization of the user engagement, determining that the user engagement requires a subsequent inferred conversational output;

generating the subsequent inferred conversational output; and generating for output by way of the co-watch bot the subsequent inferred conversational output.

12. The method of claim 11, wherein the determining that the user engagement requires the subsequent inferred conversational output comprises receiving and determining at least one of: a question seeking clarification, a statement seeking clarification, a confirmation, an opinion, a validation, or a prediction.

13. The method of claim 11, further comprising:

determining the user engagement does not require the subsequent inferred conversational output;

adjusting the sliding context window based on a media content play position;

accessing the trained multi-modal generative model to determine a subsequent initiation point and generate the subsequent inferred conversational output; and after the playback of the media content reaches the subsequent initiation point, generating for output by way of the co-watch bot the subsequent inferred conversational output.

14. The method of claim 13, further comprising pausing the media content between generating for output by way of the co-watch bot the inferred conversational output and determining one of: no user engagement or user engagement that does not require the subsequent inferred conversational output.

15. A system comprising:

a memory;

input/output circuitry configured to:

receive, at a media platform comprising a co-watch bot, a selection of a media content from a plurality of media content available from the media platform;

provide for playback the media content; and control circuitry configured to:

access a trained multi-modal generative model for the media content with a sliding context window indicating a portion of the media content provided for playback, wherein the trained multi-modal generative model:

(iv) is trained on a plurality of indicators each representing a respective aspect of a respective portion of the media content and each associated with one or more progress markers indicating one or more points of progression within the media content to which each indicator corresponds;

(v) determines, based at least in part on the plurality of indicators and the one or more progress markers corresponding to each of the plurality of indicators, an initiation point for initiating a conversation interaction of the co-watch bot; and (vi) generates, based at least in part on the sliding context window and the plurality of indicators, an inferred conversational output for the conversation interaction at the initiation point; and after the playback of the media content reaches the initiation point, generate for output by way of the co-watch bot the inferred conversational output for the conversation interaction.

16. The system of claim 15, wherein the determining of the initiation point for initiating the conversation interaction of the co-watch bot comprises determining that a likelihood of interest in an initiation of the conversation interaction satisfies a predetermined triggering threshold.

17. The system of claim 15, wherein:

the generating of the inferred conversational output further comprises utilizing an attention layer within the sliding context window, and the attention layer reduces a time to a first indicator or a time between indicators to reduce latency and increase accuracy of the inferred conversational output.

18. The system of claim 15, wherein the determining of the initiation point for initiating the conversation interaction of the co-watch bot is based at least in part on the trained multi-modal generative model performing at least one of:

determining that a density of the plurality of indicators of the trained multi-modal generative model indicates a low complexity area of content in the media content;

determining that the density of the plurality of indicators indicates a high complexity area of content in the media content;

determining the initiation point based at least in part on user metadata associated with a subset of the plurality of media content available from the media platform related to and including the media content;

determining the initiation point based at least in part on a biometric response; or searching the plurality of indicators of the trained multi-modal generative model for the media content based at least in part on user discourse during the playback of the media content.

19. The system of claim 15, wherein the metadata of the plurality of indicators relate to at least one of a video frame, an object, a person, a character, a face, a sound, or a location.

20. A non-transitory computer readable medium having instructions encoded thereon that, when executed by control circuitry, cause the control circuitry to:

receive, at a media platform comprising a co-watch bot, a selection of a media content from a plurality of media content available from the media platform;

provide for playback the media content; and control circuitry configured to:

access a trained multi-modal generative model for the media content with a sliding context window indicating a portion of the media content provided for playback, wherein the trained multi-modal generative model:

(i) is trained on a plurality of indicators each representing a respective aspect of a respective portion of the media content and each associated with one or more progress markers indicating one or more points of progression within the media content to which each indicator corresponds;

(ii) determines, based at least in part on the plurality of indicators and the one or more progress markers corresponding to each of the plurality of indicators, an initiation point for initiating a conversation interaction of the co-watch bot; and (iii) generates, based at least in part on the sliding context window and the plurality of indicators, an inferred conversational output for the conversation interaction at the initiation point; and after the playback of the media content reaches the initiation point, generate for output by way of the co-watch bot the inferred conversational output for the conversation interaction.

* * * * *